United States Patent
Lautzenhiser et al.

(10) Patent No.: US 6,426,600 B1
(45) Date of Patent: Jul. 30, 2002

(54) PROPORTIONAL ACTUATOR CONTROL OF APPARATUS

(75) Inventors: John L. Lautzenhiser, Hamilton, IN (US); Lloyd L. Lautzenhiser, Nobel (CA)

(73) Assignee: Magitek.com,LLC, Verdi, NV (US)

( * ) Notice: Subject to any disclaimer, the term of this patent is extended or adjusted under 35 U.S.C. 154(b) by 0 days.

(21) Appl. No.: 09/802,823

(22) Filed: Mar. 10, 2001

Related U.S. Application Data

(62) Division of application No. 09/652,395, filed on Aug. 31, 2000.
(60) Provisional application No. 60/188,431, filed on Mar. 10, 2000, provisional application No. 60/166,240, filed on Nov. 18, 1999, and provisional application No. 60/152,826, filed on Sep. 7, 1999.

(51) Int. Cl.[7] .................................................. H02P 1/54
(52) U.S. Cl. ............................ 318/34; 318/625; 318/68; 180/65
(58) Field of Search ........................... 318/625, 34, 68; 180/65

(56) References Cited

U.S. PATENT DOCUMENTS

| | | | |
|---|---|---|---|
| 4,767,940 A | | 8/1988 | Tuttle |
| 4,813,088 A | * | 3/1989 | DiMatteo et al. .............. 180/65 |
| 5,253,724 A | * | 10/1993 | Prior ............................ 180/65 |
| 5,353,042 A | | 10/1994 | Klapman et al. |
| 5,425,378 A | | 6/1995 | Swezey et al. |
| 5,635,807 A | | 6/1997 | Lautzenhiser |

* cited by examiner

Primary Examiner—Karen Masih
(74) Attorney, Agent, or Firm—Wendell E. Miller

(57) ABSTRACT

Apparatus, such as a wheelchair (10) is proportionally controlled by output signals produced by an X-Y input device (26, 58, 90, 100, 110, 360, or 370), which may be attached to head (90), a hand (112) or some other body component, and which may be actuated by tilting. The output signals are conditioned prior to application to the wheelchair (10). Apparatus for conditioning the output signals includes a transistor sensitivity control (180, 382A, 382B), a transducer sensitivity adjustment (344A, 384B, or 436) a signal limiting control (226, 394, 396), a signal limiting adjustment (438), a null offset device, or null-width generator (418, 130A/#?, 150A/#?), a rate-of-change controller (144A/#?), a turn signal conditioner, or steering sensitivity control (160, 170, 398, 400, 416), a steering sensitivity adjustment (434), a nonlinear device (420) that functions as a steering sensitivity control, a nonlinearity adjustment (422) that functions as a steering sensitivity adjustment, and a microprocessor (432) that may be used to perform some, or all, of the aforesaid functions.

32 Claims, 17 Drawing Sheets

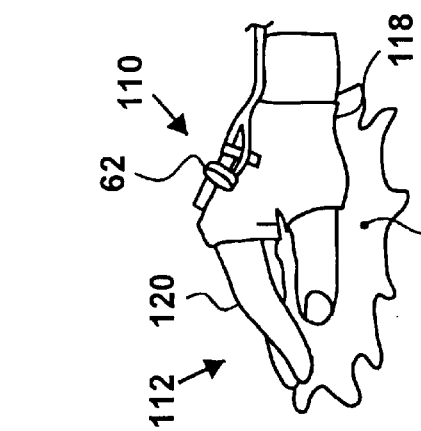
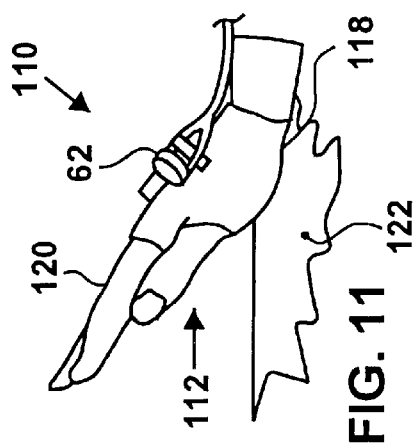
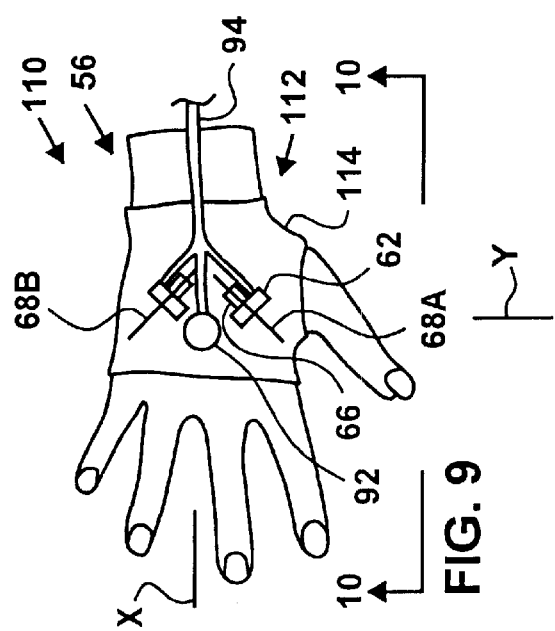
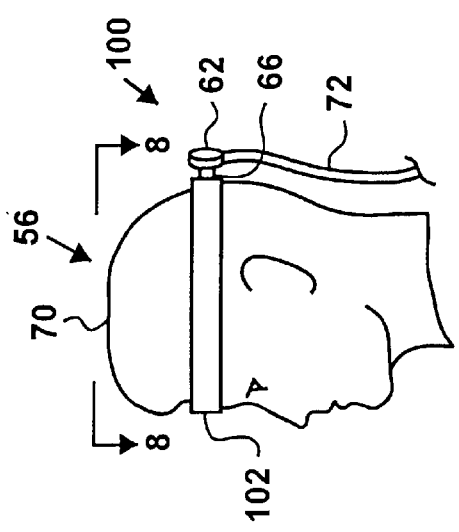
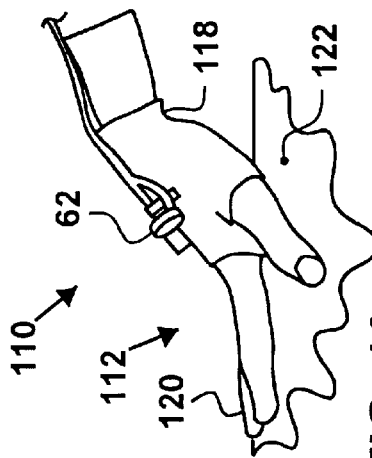
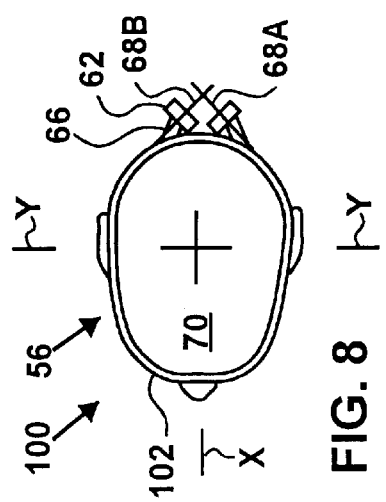

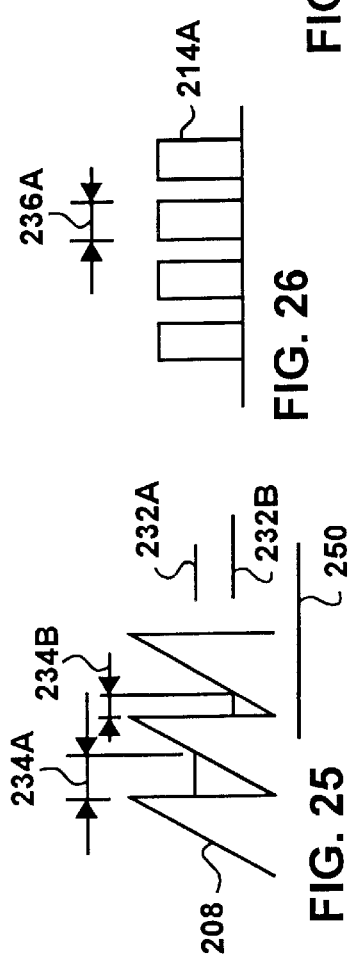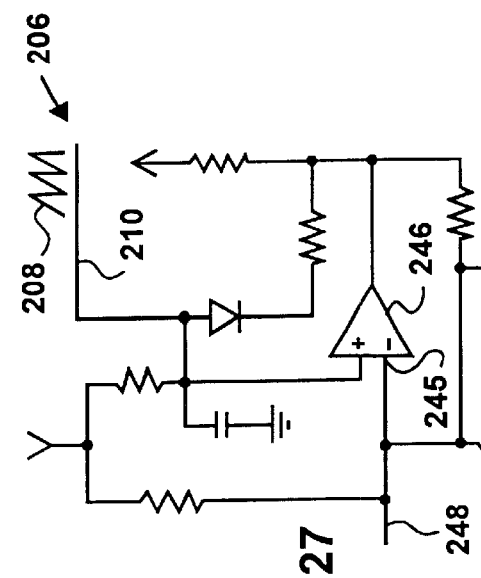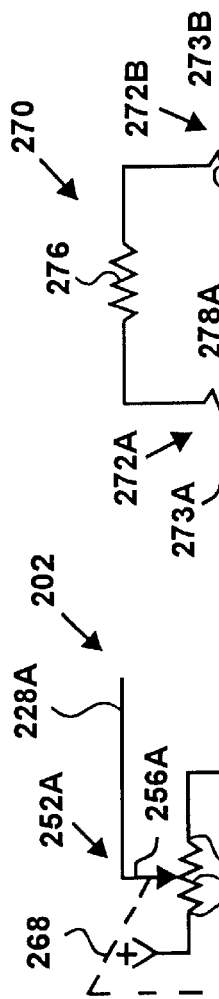

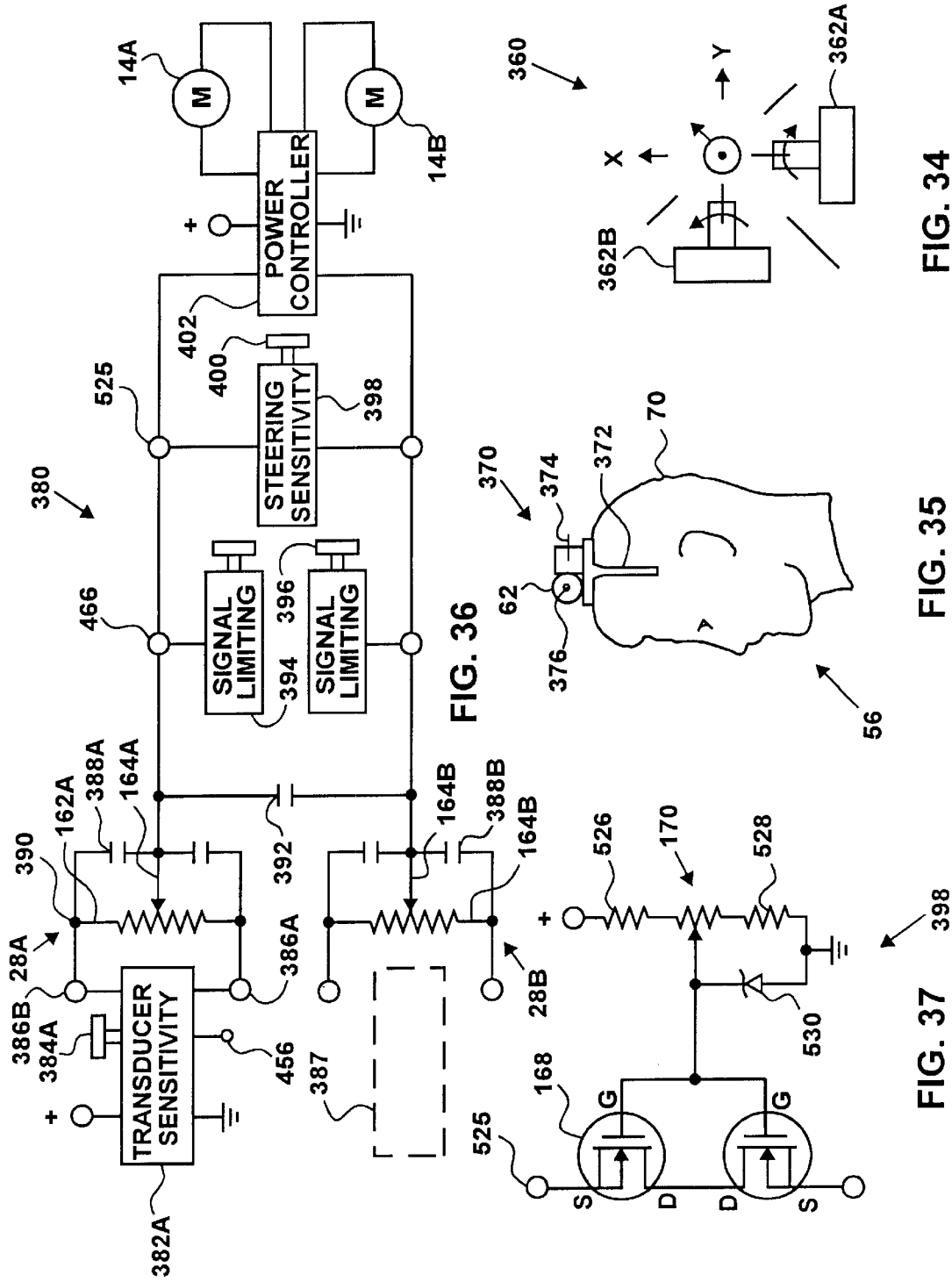

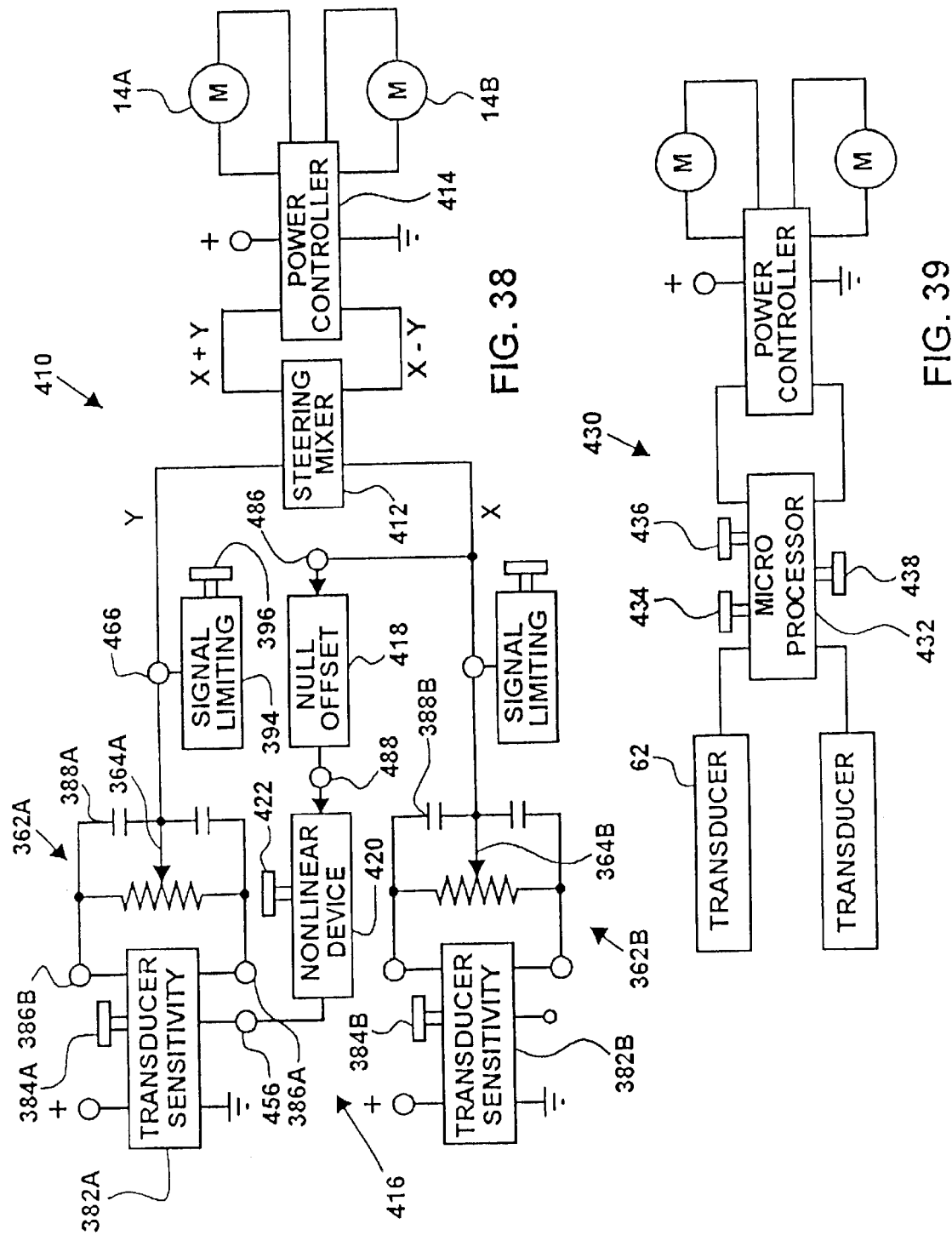

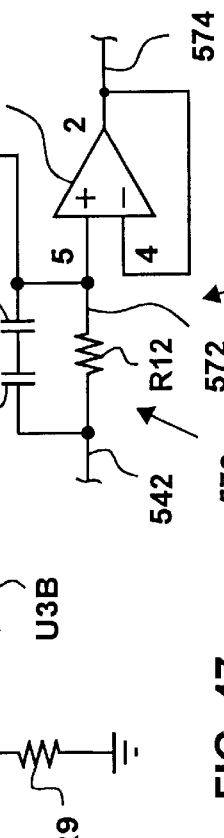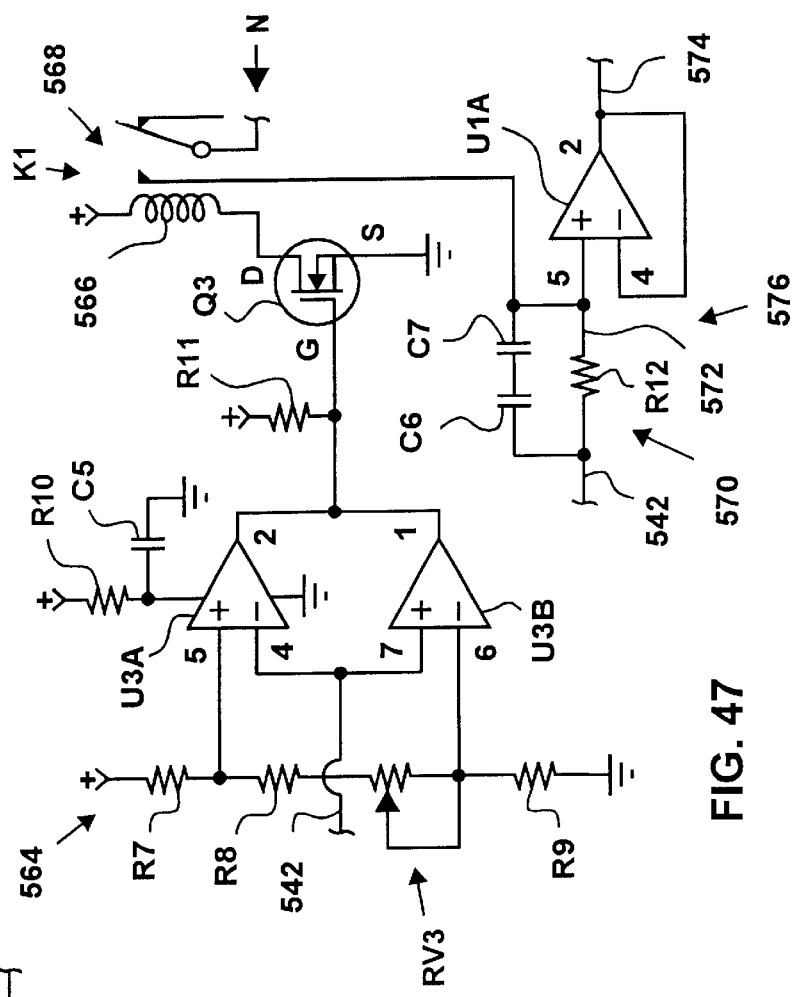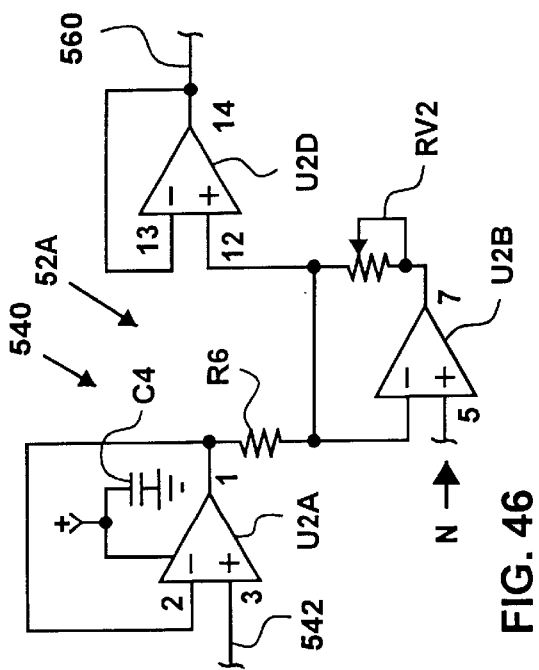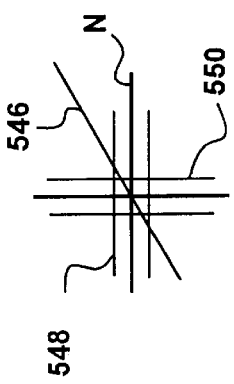
FIG. 47
FIG. 46
FIG. 46A

PROPORTIONAL ACTUATOR CONTROL OF APPARATUS

CROSS-REFERENCE TO RELATED APPLICATION

This nonprovisional patent application claims benefit of U.S. Provisional Patent Application No. 60/188,431, filed Mar. 10, 2000, and a division of U.S. patent application Ser. No. 09/652,395, filed Aug. 31, 2000, Provisional Patent Application No. 60/166,240, filed Nov. 18, 1999, and Provisional Patent Application No. 60/152,826, filed Sep. 7, 1999.

STATEMENT RE FEDERALLY SPONSORED RESEARCH OR DEVELOPMENT

Not Applicable

SEQUENCE LISTING

Not Applicable

BACKGROUND OF THE INVENTION

1. Field of the Invention

The present invention relates generally to user-actuated control of apparatus. More particularly, the present invention relates to proportional control of rotary and/or linear actuators by body-component-actuated transducers.

2. Description of the Related Art

Control of linear and rotary actuators often includes the requirement that rotational speeds of rotary actuators or linear velocities of linear actuators be precisely controlled.

For instance, when both the speed and steering of a vehicle are controlled by controlling speeds and rotational directions of a pair of electric motors, it is important to separately and precisely control their rotational speeds and differences between their rotational speeds.

Conveyances, or electrically-propelled wheelchairs, provide mobility for a multitude of persons ranging in age from children less than three years old who will never walk, to adults who have been injured in accidents or afflicted with a debilitating illness to elderly people who have acquired infirmities as they have aged.

To these people, their freedom of mobility, and to a large extent their ability to be productive citizens in society, depend upon the mobility afforded by a power wheelchair. Included in this large group of people are some who lack either the use of limb or the motor skills to use the kinds of controls common on power wheelchairs.

Typically, power wheelchairs have been propelled by separate electric motors drivingly connected to left and right wheels of the wheelchair.

By controlling both the equivalent voltage and polarity to the motors, control of forward and reverse directions, speeds, and steering have been controlled. This control of steering includes turns in which the wheelchair pivots around one wheel, and pivot turns in which the wheels rotate in opposite directions at the same or unequal speeds.

Typical control of electrically-propelled wheelchairs has been by an X-Y input device in which a joystick is manually positioned with respect to X and Y axes to selectively provide mechanical inputs to transducers.

While some degree of control can be achieved by simple on-off and forward-reverse control of the driving wheel motors, and while a severely handicapped person may be grateful for the freedom and the personal achievement, on-off controls severely limit the speed, maneuverability, and controllability of the wheelchair.

Perhaps more importantly, this type of simplistic control fails in an area that can be more important to a handicapped person. By failing to allow him to control speeds and steering proportionally, it fails to allow him to use his full physical and mental capabilities.

A problem in achieving satisfactory control of a wheelchair by joystick control has been hand tremors of the user. Lautzenhiser et al., in U.S. Pat. No. 5,012,165, solves the problem of hand tremors by integrating signal variations caused by hand tremors, thereby providing an integrated, or averaged, output.

Even for those with good dexterity with at least one hand, skillful control of power wheelchairs by X-Y input devices has not been as easy as would be desired. It has been difficult, even for those with good motor skills, to drive in a straight path and to make minor changes in direction without overcorrecting.

Included in attempts to overcome this steering problem, is Klimo, U.S. Pat. No. 4,634,941, who has provided a diamond-shaped guide to help the user find the joystick position that results in driving a straight path.

Bell, in U.S. Pat. No. 4,667,136, attempted to overcome this steering problem by placing a resistor between the outputs of two potentiometers, to reduce the differences between the two electrical signals, and thereby to reduce steering sensitivity.

While Bell's use of a resistor does achieve a decrease in steering sensitivity, it is important to notice that the decrease in differences between the electrical signals produced by the two potentiometers is linear. That is, a small difference in electrical signals produces a small decrease in the difference between the electrical signals, and larger differences result in proportionally larger decreases in the differences.

When differences between the electrical signals are small, such as when attempting to steer a straight path, a large percentage decrease in the differences in the electrical signals is needed to effectively reduce steering sensitivity, but Bell's resistor provides a relatively small, and therefore insufficient, reduction in the differences between the two electrical signals unless the resistance of Bell's resistor is relatively small.

However, when attempting to make a sharp turn or a pivot turn, and the differences between the electrical signals are large, a relatively low resistance makes a large decrease in the differences in the electrical signals, thereby decreasing steering sensitivity so severely that it is impossible to effect sharp turns and pivot turns.

Therefore, the use of any fixed resistance that adequately reduces sensitivity for steering a straight path, so severely reduces the difference between the two electrical signals when differences between the signals are large that it is impossible to make sharp turns or pivot turns.

Lautzenhiser, in U.S. Pat. No. 5,635,807 solves the problem of difficult steering control. Instead of allowing the high-side signal to be reduced by flowing through a resistor to the low-side, as taught by Bell, differences in the two control signals are reduced as an inverse, nonlinear, and steady-state function of the differences in the two control signals.

Prior to the teaching of Lautzenhiser as discussed in the preceding paragraph, not only has manual control of a joystick been difficult for many handicapped persons, it has been impossible for others. For those lacking the physical capability of using a joystick, various devices have been proposed.

Witney et al., in U.S. Pat. No. 4,323,829, disclose a "waffle board" control. In use, pressing fingers on selective portions of the horizontally-disposed "waffle board" provides control of speed and steering of a wheelchair.

Others have proposed controls that are actuated by body components other than a hand of the user. Glaser et al., in U.S. Pat. No. 4,523,769, teach a wheelchair in which the feet are used to achieve control of speeds and steering of a wheelchair. The footrests are moveable to positions wherein drive pawls are engaged, providing on-off control of the speeds of each motor.

Mogle, in U.S. Pat. No. 3,965,402, teaches a headrest proportional control. Although his device appears to be tedious to use because of constriction of the user by the headrest control, it seems to advance the art to some degree. Miller, III, in U.S. Pat. No. 4,093,037, also teaches a headrest control for wheelchairs.

Brown et al., in U.S. Pat. No. 4,078,627, teach a chin rest, and control of a wheelchair by chin movement. This device appears to be even more constrictive than those of Mogle and Miller, III.

A still more constrictive device is the "sip and puff" device taught by Muller in U.S. Pat. No. 4,865,610. In addition, it is highly impractical for those who depend upon a ventilator for breathing.

Loveless et al., in U.S. Pat. No. 4,260,035, teach chin control in which the transducers may be mechanical or optical, with the optical device being somewhat less constrictive. Fetchko, in U.S. Pat. No. 4,486,630, teaches a device in which the user wears a rather complex and cumbersome headset, and control of various devices is achieved by moving the user's jaw or eyebrows.

Johnston, U.S. Pat. No. 4,281,734, frees the user of the cumbersome headset of Fetchko by teaching the use of light sensors that are attached behind the head of the user. Simmons et al., in U.S. Pat. No. 3,993,154, seem to advance the art by teaching apparatus in which an energy field is directed toward the user's body, and a field pickup element senses changes in positioning of the user's head.

Crawford, Jr., in U.S. Pat. No. 4,158,196, teaches sensing of bioelectric signals by electrodes that may be attached to, or implanted into, a user's skull. Youdin et al., in U.S. Pat. No. 4,207,959, teach a voice-actuated control in which incremental changes in speed and steering may be achieved.

Selwyn, U.S. Pat. No. 3,374,845, teaches the use of a helmet that includes a plurality of on-off switches that are selectively activated by the user tilting his head along a selective one of a plurality of sensing axes. While he provides improved freedom of movement for the user, he fails to provide proportional control of speeds and steering, thereby severely limiting both the controllability and the maximum safe speed of operation.

Kelly et al., in U.S. Pat. No. 4,866,850, teach the use of a conductive-ball wiped potentiometer as a sensor for a digital-readout clinometer. The ball, which they say may be solid or liquid, is gravity positioned with respect to a circular resistance element. Mercury is mentioned as one choice for the ball.

While gravity-actuation of head mounted transducers, or body-component mounted transducers, would provide more freedom for the user than backrest and chin rest actuated transducers, their limitation to on-off control of wheelchair functions, such as taught by Selwyn, falls far short of being desirable.

While on-off control of speed and steering of a wheelchair by the use of gravity-actuated switches, such as taught by Selwyn, is easily achievable, attempting to achieve proportional control of the wheel motors, or other actuators, by gravity-actuated proportional-output transducers has been fraught with difficulties.

That is, the outputs of some gravity-actuated proportional-output transducers are subject to excessive and wild excursions. Further, because of the high specific gravity of mercury, it is doubtful that there is any other gravity-actuated transducer in which the electrical output is more subject to wild and undamped excursions.

Therefore, while the use of gravity-actuated and mercury-wiped transducers for controlling wheelchairs has been an interesting thought, because of the erratic electrical output, except for on-off control, the uses of these transducers have been limited to digital readout devices in which the transducer output has been time-averaged to produce viable results.

Those who cannot use a joystick need a control that is easier to use and that provides better control than a "waffle board." Even those who are not on a ventilator need a system that is easier to control than a "sip and puff" system. Handicapped persons need more freedom of movement than that provided by a headrest or chin rest system. They need a better control than the on-off head-actuated control of Selwyn.

They need a proportional output system with head-attached, or body-component-attached, proportional-output transducers. And to make this system easy to use, even for those who have poor coordination, they need both the inverse nonlinearity and the personalized sensitivity adjustments as taught in the present patent application and in the patent upon which the present application depends.

BRIEF SUMMARY OF THE INVENTION

The present invention provides proportional control of actuators, whether electric, or hydraulic, or pneumatic, and whether rotary or linear. This proportional control of actuators includes proportional control of the rotational speed of rotary actuators and proportional control of the velocity of linear actuators.

In the present invention, proportional control is achieved by the use of body-component-attached transducers, or transducers of any type that are actuated by any means, even by a gyroscopic device. However, preferably, gravity-actuated sensors, or tilt-axis input devices are used.

If tilt-axis transducers are used, a tilt-axis X-Y input device is head attached, or attached to some other body-component. Tilting of the user's head along a tilt axis to various tilt angles produces electrical outputs that are proportional to the tilt angles. The electrical outputs of the transducers are conditioned to overcome head or other body-component tremors, to selectively decrease the tilt-angle sensitivity of the transducers, and/or to selectively decrease sensitivity of one transducer with respect to an output of another transducer.

The conditioned output is used to achieve proportional control of a single actuator, a plurality of actuators, an augmentative device, a robotics device, or a conveyance for handicapped persons.

As taught herein, the electrical outputs of the transducers may be conditioned by analog circuitry or by digital conversion in a microprocessor.

However, whether conditioning of the electrical outputs of the transducers is by analog circuitry or digital conversion, as taught herein, selectable adjustment of proportionality may be provided for the convenience of the user, caregiver, or therapist.

The signal conditioning of the present invention includes limiting the rate of change of the electrical output of a single transducer, limiting the rate of change in differences in the electrical outputs of two transducers, selectively changing the proportionality of tilt angle to electrical output, and changing the electrical output of one transducer as an inverse and linear or nonlinear function.

This changing of an electrical output of a transducer as an inverse and linear or nonlinear function includes changing the electrical output as a function of the electrical output of another transducer, or as a function of the difference in the electrical outputs of two transducers.

As described in detail herein, the present invention provides body-component-attached transducers and signal conditioning apparatus for controlling computer cursers, for achieving proportional or non-proportional control of an actuator, for controlling augmentative devices, for controlling robotics devices, and for controlling both the speed and steering of an electrically-propelled conveyance of the kind in which the speed and steering are controlled by speeds and relative speeds of first and second electric motors.

If, for example, two transducers are attached to the head of a user, tilting of the user's head with respect to X and Y axes will provide electrical outputs that are used to control both speeds and relative speeds of the electric motors.

If first electrical outputs of a first transducer are used to control the speeds of both motors, and second electrical outputs of a second transducer are used to control differences in motor speeds, then the steering sensitivity control of the present invention decreases the magnitude of one of the electrical outputs as an inverse and linear or nonlinear function of the other electrical outputs.

However, if the transducers are oriented so that the electrical outputs of both transducers are used to control the speeds of both motors, and differences in the electrical outputs are used to control steering, then the sensitivity control of the present invention decreases the difference in the electrical outputs as an inverse and nonlinear function of differences in the electrical outputs of the two motors.

One advantage of the steering sensitivity control is greatly enhanced ease of steering. This ease of steering makes head-actuated controls not only feasible, but also very practical.

In addition, the inverse linear or nonlinear conditioning of the transducer outputs adds to the practicality of using head-attached transducers.

The present invention also provides selective adjustment of transducer sensitivity. When joystick-actuated potentiometers are used for transducers, the transducer sensitivity control selectively adjusts the voltage change per angle of inclination of the joystick, or body-component-attached transducer.

When body-component-attached tilt transducers, or tilt-axis X-Y input devices are used, the transducer sensitivity control taught herein selectively adjusts the voltage change per degree of tilt angle of the transducers.

The present invention also provides adjustable speed limiting while allowing mechanical inputs to the X-Y input device to greatly exceed inputs that would ordinarily produce excessive speeds of the motors.

Finally, the apparatus of the present invention preferably includes circuity for bringing the conveyance to a stop if an attached body-component electronic device is actuated beyond its normal range. This provision stops the conveyance in instances in which the occupant/operator has a seizure, faints, or otherwise suffers a sudden physical, mental or emotional condition that results in a sudden maximum speed signal.

In a first aspect of the present invention, a method for controlling rotational speeds of first and second motors comprises: selectively inputting X and Y transducers; producing X and Y electrical outputs separately proportional to the selective inputting step; proportioning one of the electrical outputs as an inverse function of an other of, the electrical outputs; and rotating one of the electrical motors as a function of the proportioning step.

In a second aspect of the present invention, a method for controlling both speeds and steering of a conveyance comprises: body-component attaching first and second tilt-angle transducers; body-component actuating the transducers to selected tilt angles; producing a first electrical output from the first transducer proportional to the selected tilt angles with respect to a one tilt axis; producing a second electrical output from the second transducer proportional to the selected tilt angles with respect to an other tilt axis; conditioning the first electrical output as an inverse function of the second electrical output; and controlling rotational directions and rotational speeds of first and second motors as a function of the producing and conditioning steps.

In a third aspect of the present invention, apparatus for controlling rotational speeds of first and second motors that are connected to respective ones of left and right wheels comprises: means for producing a first electrical output proportional to a first mechanical input; means for producing a second electrical output proportional to a second mechanical input; and means, being operatively connected to the first and second electrical outputs, for inverse proportioning the first electrical output as a function of one of the second electrical output.

BRIEF DESCRIPTION OF THE SEVERAL VIEWS OF THE DRAWINGS

FIG. 7 is a side view of a head of a person wearing a headband with mercury-wiped potentiometers attached to the headband;

FIG. 8 is a top view of the person of FIG. 7, taken substantially as shown by view line 8—8 of FIG. 7, showing the pivot axes of the mercury-wiped potentiometers rotated: at 45 degrees to X and Y axes, and in which the X axis is the longitudinal axis of both the headband and the person's head;

FIG. 9 is a view of a human hand with a hand-mounted X-Y input device attached, the X-Y input device including an attaching hand covering, two mercury-wiped potentiometers with pivot axes at 45 degrees to a hand axis, and a tilt switch for use as a shut-down sensor;

FIG. 10 is a side elevation of the human hand and hand-mounted X-Y input device of FIG. 9, taken substantially as shown by view line 10—10 of FIG. 9, showing fingers and the hand positioned for forward propulsion;

FIG. 11 is a side elevation of the X-Y input device of FIG. 9, taken substantially as shown by view line 10—10 of FIG. 9, showing the fingers raised and the hand positioned for rearward propulsion;

FIG. 12 is a side elevation of the X-Y input device of FIG. 9, taken substantially as shown by view line 10—10 of FIG. 9, showing fingers pulled toward the wrist as an alternate and preferred method of positioning the hand to achieve rearward propulsion;

FIG. 25 is a diagram of a sawtooth wave showing volts versus time, and also showing an amplified control signal selecting a pulse width;

FIG. 26 is a diagram of a pulse-width-modulated square wave showing a pulse width that has been determined by comparing an amplified control signal with a sawtooth wave;

FIG. 27 is a schematic of a prior-art sawtooth generator which is used in the circuitry of the block diagram of FIG. 24, shown in detail to describe the use of a logic "high" from the limit-switch control of FIG. 31;

FIG. 28 is a schematic drawing of one embodiment of a transducer sensitivity control of FIG. 24 that allows selective adjustment of the sensitivity of transducers used in an X-Y input device, showing conductors for connecting the transducer sensitivity control to transducers of an X-Y input device;

FIG. 29 is a schematic drawing of a voltage selection control that may be used in place of the transducer sensitivity control of FIG. 28, and that may be used as a part of the limit-switch control of FIG. 31;

FIG. 30 is a pictorial representation of forward and reverse voltages produced by the voltage selection control of FIG. 29;

FIG. 34 is a schematic drawing of an X-Y input device of prior-art construction in which potentiometers are used for transducers, and in which the potentiometers are disposed along the X and Y axes, whereas in FIG. 2 the potentiometers are disposed at 45 degrees to the X axis;

FIG. 35 is a head-attached, or body-component-attached, X-Y input device in which a head band is used to attach two mercury-wiped potentiometers to a head of a user, with the mercury-wiped potentiometers oriented along the X and Y axes, as shown in FIG. 34;

FIG. 36 is a block diagram of the present invention for systems in which the transducers of the X-Y input device are disposed at 45 degrees to the X and Y axes, as shown in FIGS. 2, 4, and 5;

FIG. 37 is a schematic drawing of a steering sensitivity control for use with the system of FIG. 36 and the transducer orientation as shown in FIGS. 2, 4, and 5, showing a variation of the steering sensitivity control of FIG. 16, but not showing the transducers of FIG. 16;

FIG. 38 is a block diagram of the present invention for systems in which the transducers of the X-Y input device are disposed on the X and Y axes, as shown in FIGS. 34 and 35, and in which a steering sensitivity control is achieved by cooperation of one transducer sensitivity control with both a null offset circuit and a nonlinear device;

FIG. 39 is a block diagram of the present invention for the system of FIG. 36, or the system of FIG. 38, depending upon whether analog functions of FIG. 36 or analog functions of FIG. 38, are replaced by microprocessor functions;

FIG. 46 is a first of three. embodiments of null-width generators;

FIG. 46A is a graph showing a null width disposed on opposite sides of a null voltage;

FIG. 47 is a second embodiment of a null-width generator;

DETAILED DESCRIPTION OF THE INVENTION

The present invention provides apparatus for controlling linear and rotary actuators by manually-actuated transducers. The transducers may be attached to a body component, such a the head or hand of a user. In the description that follows, the actuators are used to control a power wheelchair.

Figure 1:
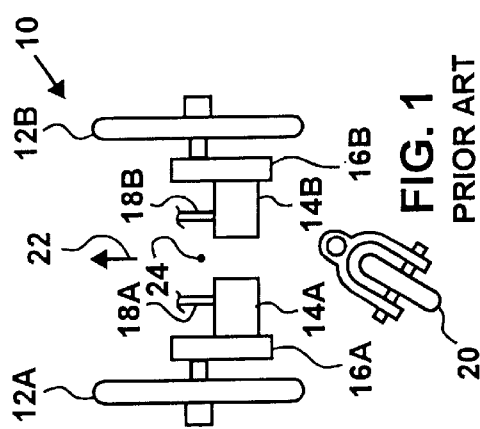
FIG. 1 is a schematic top view of a conveyance of prior-art construction having left and right wheels, and a castering rear wheel, the left and right wheels being driven by left and right electric motors.

A prior-art conveyance, or power wheelchair, 10 of FIG. 1, is shown and described in Lautzenhiser et al., U.S. Pat. No. 4,906,906, issued Mar. 6, 1990.

Briefly, the conveyance 10 includes left and right wheels, 12A and 12B, that are reversibly driven by left and right electric D.C. motors, or first and second rotary actuators, 14A and 14B, that are drivingly connected to respective ones of the wheels, 12A and 12B, by left and right gear boxes, 16A and 16B.

The conveyance 10 is propelled and steered by delivering varying effective driving voltages to power cables, 18A and 18B. The electric motors, 14A and 14B, and a caster wheel 20 cooperate with the wheels, 12A and 12B, to support the conveyance 10 and to allow the wheels, 12A and 12B, to steer the conveyance 10. Prior-art circuitry for providing a pulse-width driving voltage to the motors, 14A and 14B; is described in the aforesaid U.S. Pat. No. 4,906,906.

When the motors, 14A and 14B, are propelling the conveyance 10 in a forward direction 22, either wheel, 12A or 12B, may be slowed to make a turn of selected radii, or either wheel, 12A or 12B, may be stopped to provide a turn that pivots about that wheel, 12A or 12B. Further, either wheel, 12A or 12B, may be reversed to make pivot turns about a pivot axis 24. These changes in the speed of the wheels, 12A and 12B, are accomplished by changing, or reversing the polarity of, effective driving voltages applied to the motors, 14A and 14B, in any suitable manner, such as taught in the aforesaid U.S. Pat. No. 4,906,906.

Figure 2:
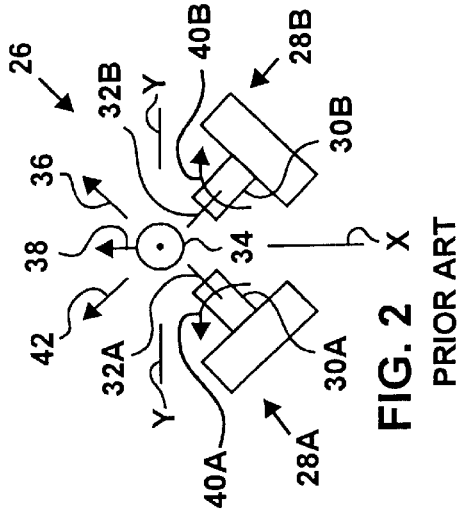
FIG. 2 is a schematic drawing of an X-Y input device of prior-art construction in which potentiometers are used for transducers, and in which the potentiometers are disposed at 45 degrees to the X axis, and at 90 degrees to each other.

A vehicle, such as the conveyance 10 of FIG. 1, is often controlled by an X-Y input device, such as a conventional X-Y input device 26 of FIG. 2. The X-Y input device 26 includes left and right transducers, or first and second mechanically-wiped potentiometers, 28A and 28B, that each include a rotary shaft, 30A or 30B, and the shafts, 30A and 30B, have axes 32A and 32B that are both disposed at 45 degrees to X and Y axes. An X-Y input device 26 of this type is shown as prior art in Lautzenhiser et al., U.S. Pat. No. 5,012,165, issued Apr. 30, 1991.

Continuing to refer to FIG. 2, movement of a joystick 34 in a right-turn direction 36 that is 45 degrees clockwise of a forward direction 38 on the X axis, rotates the shaft 30B of the right transducer 28B in the direction of an arrow 40B, but does not rotate the shaft 30A of the left transducer 28A.

Further, since the movement of the joystick 34 in the direction 36 is at right angles to the axis 32B of the shaft 30B, the joystick 34 has full mechanical advantage on the shaft 30B. Movement of the joystick 34 in the right-turn direction 36 results in high speed rotation of the left wheel 12A of FIG. 1, but the right wheel 12B stops, thereby producing a pivot turn around the right wheel 12B.

If the joystick 34 is moved along the X axis in the forward direction 38, both of the shafts, 30A and 30B, are rotated. The rotational directions of the shafts, 30A and 30B, are as shown by an arrow 40A and the arrow 40B. However, the mechanical advantage of the joystick 34 is reduced by a 45 degree sin-cosine relationship.

That is, both shafts, 30A and 30B, rotate for forward propulsion, but the rotation of both is only 70.7 percent, as related to the distance that the joystick 34 is moved along the X axis in the direction 38.

Therefore, if a desired speed is achieved for forward propulsion with the joystick 34 moved in the direction 38 along the X axis, moving the joystick 34 in the right-turn direction 36, which is disposed clockwise from the X axis by 45 degrees, or moving the joystick 34 in a left-turn direction 42 that is 45 degrees counterclockwise from the X axis, will increase the speed of one motor, 14A or 14B of FIG. 1, by 41 percent, and the other motor, 14B or 14A, will be stopped.

This means that with the conventional X-Y input device 26, when making turns, at the very time when it is highly desirable to slow down, the speed of the wheel, 12A or 12B, on the outside of the turn increases.

Figure 3:
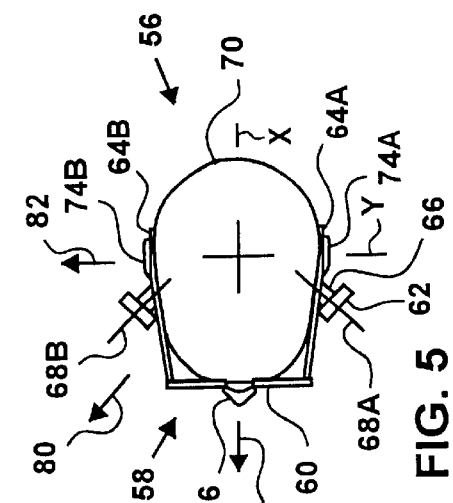
FIG. 3 is a top view of an X-Y input device of prior-art construction showing the joystick in a full forward speed position, and showing, in phantom lines, the joystick in right turn and right pivot turn positions.

Referring now to FIG. 3, a top view of the X-Y input device 26 of FIG. 2 is shown with a cover plate 44 obscuring the potentiometers, 28A and 28B. The joystick 34 is positionable any place in a circular area 46 whose outer boundary is a circular path 48. Positioning the joystick 34 at an intersection 50 of the X axis and the circular path 48 provides forward speed of both motors, 14A and 14B of FIG. 1. Positions of the joystick 34 are defined herein as degrees clockwise or degrees counterclockwise around the circular path 48, as measured from the intersection 50.

A right turn, with the left motor 14A of FIG. 1 operating at maximum speed and with the right motor 14B stopped, normally occurs when the joystick 34 is positioned at 45 degrees clockwise, as indicated by an intersection 52; and a right pivot turn, with the motors, 14A and 14B, operating at maximum speeds in opposite directions, normally occurs when the joystick 34 is positioned at 90 degrees clockwise, as indicated by an intersection 54.

In Lautzenhiser, U.S. Pat. No. 5,129,277, an improved X-Y input device is taught in which the relationship between a Y axis mechanical input and a Y axis electrical output of the potentiometers is mechanically changeable by selectively changing a lever length.

This changeable relationship between the Y axis mechanical input and the Y axis electrical output minimizes the problem of the wheel, 12A or 12B, on the outside of the turn increasing in speed. However, even with this prior-art improved X-Y input device, a steering sensitivity control, or turn signal conditioner 156 or 180, of the present invention provides great benefits, as will be shown.

Figure 4:
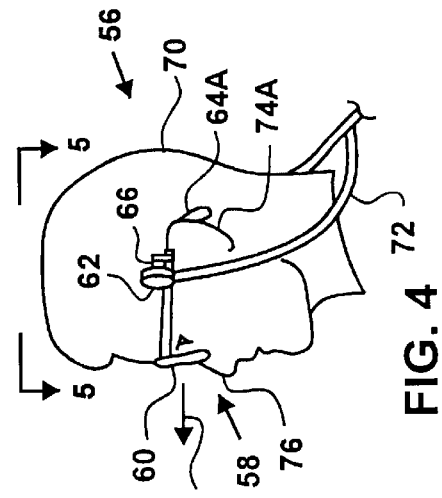
FIG. 4 is a side elevation of a head of a person wearing eyeglasses with a mercury-wiped potentiometer attached to an earpiece of the eyeglasses.
Figure 5:
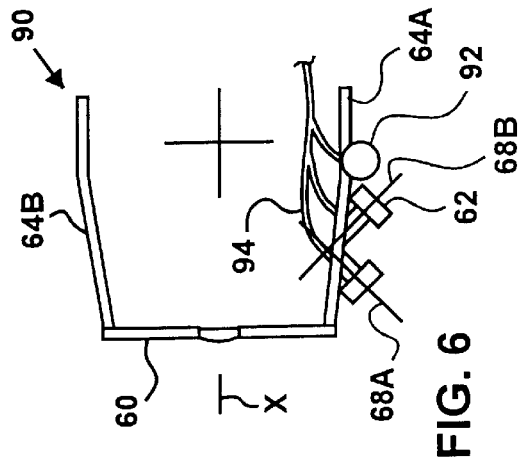
FIG. 5 is a top view of the person of FIG. 4, taken substantially as shown by view line 5—5 of FIG. 4, showing the mercury-wiped potentiometers with their pivot axes rotated at 45 degrees to X and Y axes, in which the X axis is the longitudinal axis of both the eyeglasses and the person's head.

Referring now to FIGS. 4 and 5, a person 56 is wearing an eyeglass X-Y input device 58 that includes eyeglasses, or a nose-and-ear engaging frame, 60 with a mercury-wiped potentiometer, or mercury-wiped transducer, 62 attached to each of earpieces, 64A and 64B, by any suitable means, such as swivel mounts 66.

As seen in FIG. 5, first and second sensing axes, or tilt axes, 68A and 68B, of the mercury-wiped potentiometers 62 are positioned at 45 degrees to an X axis of the eyeglasses 60, which is also the X axis of a human head, or body component, 70 of the person 56.

A cable 72 is attached to the mercury-wiped potentiometers 62, and is used to attach the mercury-wiped potentiometers 62 to any suitable device that will translate resistances of the potentiometers 62 into effective driving voltages. One such device is shown and described in the aforementioned U.S. Pat. No. 4,906,906.

In operation, the eyeglass X-Y input device 58 is placed onto the head 70 of the person 56. The potentiometers 62 are then adjusted in accordance with positioning of the eyeglasses 60 with respect to ears, 74A and 74B, and a nose 76 to provide a zero speed when the head 70 is positioned naturally.

Tilting the head 70 in a forward direction 78, along the X axis of the head 70 and the eyeglasses 60, results in supplying equal effective driving voltages to both of the motors, 14A and 14B, of FIG. 1 proportional to inclination of the head 70, thereby driving the wheels, 12A and 12B, and propelling the conveyance 10 in the forward direction 22 at speeds that are substantially equal, and, at least somewhat, proportional to the driving voltages applied to the motors, 14A and 14B.

In like manner, tilting the head 70 in the direction of an arrow 80 provides a right turn in which the right wheel 12B of FIG. 1 stops, and tilting the head 70 in the direction of an arrow 82 results in a clockwise pivot turn of the conveyance 10 of FIG. 1 around the pivot axis 24. Reverse propulsion is achieved by tilting the head 70 opposite to the forward direction 78, and turns in reverse propulsion are achieved by tilting the head orthogonally to the X axis.

Since the eyeglasses 60 of the eyeglass X-Y input device 58 are positioned on the head 70 of the person 56 by contact with the ears, 74A and 74B, and with the nose 76, mounting the mercury-wiped potentiometers 62 to the eyeglasses 60 provides excellent alignment with the head 70 of the person 56.

Figure 6:
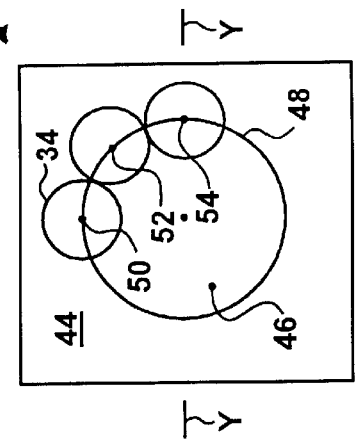
FIG. 6 is a top view of eyeglasses in which two mercury-wiped potentiometers are attached to one earpiece of the eyeglasses, the potentiometers being usable for control of speed and steering, and a mercury-actuated tilt switch is attached to one earpiece for use as a shut-down sensor to sense excessively large angles that may indicate a seizure, fainting, or other physical, mental, or emotional problem of the operator.

Referring now to FIG. 6, an eyeglass X-Y input device, or head-engaging component, or nose-and-ear-engaging frame, 90 includes the eyeglasses or nose-and-ear engaging frame 60 with the mercury-wiped potentiometers 62 attached to the earpiece 64A. In addition, a mercury-actuated tilt switch 92 is attached to one of the earpieces, 64A or 64B.

The tilt switch 92 is connected to the circuitry of the power wheelchair 10 of FIG. 1 in any suitable place that will stop the conveyance 10 whenever the head 70 of the person 56 of FIG. 4 is positioned in a manner that would indicate the possibility of a seizure, fainting, or other problem indicating inability to control the conveyance 10.

A cable 94 is attached to the mercury-wiped potentiometers 62, and is used to attach the mercury-wiped: potentiometers 62 to any suitable device that will translate resistances of the potentiometers 62 into effective driving voltages. The cable 94 is also attached to the tilt switch 92 and to circuitry that controls the power wheelchair 10 of FIG. 1, as will be shown subsequently.

As seen in FIG. 6, the sensing axes, 68A and 68B, of the potentiometers 62 of the eyeglass X-Y input device 90 are at 45 degrees to the X axis and at 90 degrees to each other.

Referring now to FIGS. 7 and 8, in addition to likenumbered and like-named parts as in FIGS. 4 and 5, a headband X-Y input device, or head-engaging component, 100 is being worn on the head 70 of the person 56. The headband X-Y input device 100 includes mercury-wiped potentiometers 62 that are attached to a headband 102 by the swivel mounts 66. The sensing axes, 68A and 68B, of the potentiometers 62 are positioned at 45 degree angles to an X axis of the headband X-Y input device 100, which is also the X axis of the head 70 of the person 56, and at a 90 degree angle to each other.

The cable 72 is attached to the mercury-wiped potentiometers 62, and is used to attach the mercury-wiped potentiometers 62 to any suitable device that will translate resistances of the potentiometers 62 into effective driving voltages.

Control of the conveyance 10 of FIG. 1 when using the headband X-Y input device 100 is the same as discussed for using the eyeglass X-Y input device 58 of FIGS. 4 and 5.

Referring now to FIG. 9, a hand-mounted X-Y input device 110 is attached to a human hand, or body component, 112 of the person 56. The hand-mounted X-Y input device 110 includes an attaching hand covering, or hand strap, 114, and two mercury-wiped potentiometers 62 that are attached to the hand strap 114 by swivel mounts 66 with the axes 68A and 68B of the potentiometers 62 disposed at 45 degrees to X and Y axes of the hand 112 and at 90 degrees to each other.

Optionally, as shown in FIG. 9, the hand-mounted X-Y input device 110 includes the tilt switch 92 of FIG. 6. If the tilt switch 92 is included, the cable 94 is attached to the mercury-wiped potentiometers 62, and is used to attach the mercury-wiped potentiometers 62 to any suitable device that will translate resistances of the potentiometers 62 into effective driving voltages, and the cable 94 is also used to connect the tilt switch 92 to any place in the circuitry that will stop the conveyance 10 of FIG. 1 when the tilt switch 92 is actuated. If the tilt switch 92 is not included, the cable 72 of FIG. 4 is used instead of the cable 94.

In using the hand-mounted X-Y input device 110, forward propulsion is achieved by raising a wrist 118 while resting, or pressing down, fingers 120 against a surface 122, as shown in FIG. 10. Rearward propulsion is achieved by raising fingers 120 while resting, or pressing down, the wrist 118 against the surface 122, as shown in FIG. 11.

Not only alternately, but preferably, reverse propulsion is achieved by pulling the fingers 120 toward the wrist 118 while resting, or pressing, both the fingers 120 and the wrist 118 on the surface 122, as shown in FIG. 12. Turns are achieved by rotating the hand 112 about the axis of FIG. 9.

Since some part of the hand 112, the fingers 120 and/or the wrist 118, is resting on, or pressing down onto, the surface 122, erroneous signals produced by hand tremors are minimized.

Figure 13:
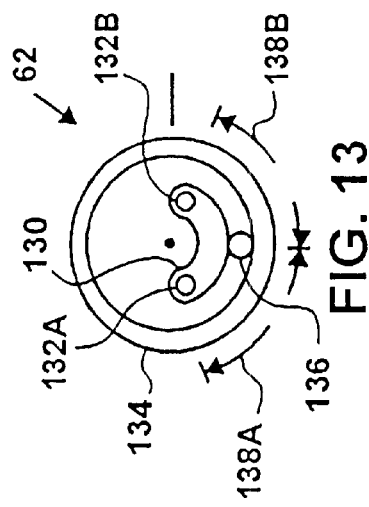
FIG. 13 is a schematic cross-sectional drawing of a mercury-wiped potentiometer that may be used in the tilt-axis X-Y input devices of FIGS. 4–12 and 35.
Figure 14:
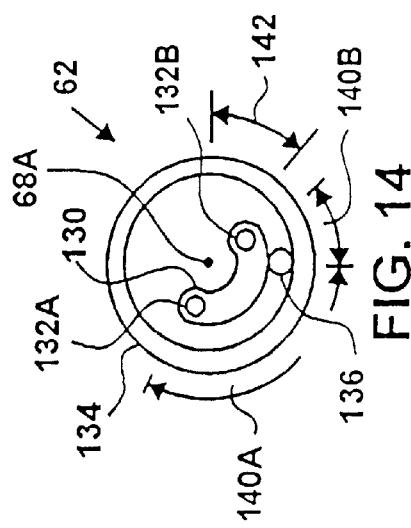
FIG. 14 is schematic cross-sectional drawing of the mercury-wiped potentiometer of FIG. 13 rotated, or tilted, at an angle about the pivot axis, showing the mercury wiper gravity positioned.

Referring now to FIGS. 13 and 14, the mercury-wiped potentiometer 62 includes a horseshoe-shaped resistance 130, end terminals 132A and 132B, a metal case 134 that hermetically encloses the horseshoe-shaped resistance 130, and a mercury ball 136 that serves as a wiper for the mercury-wiped potentiometer 62 by making contact between the metal case 134 and selectible portions, 138A and 138B, of the horseshoe-shaped resistance 130.

As shown in FIG. 14, when the mercury-wiped potentiometer 62 is rotated or tilted about the sensing axes, 68A and 68B, gravity maintains the mercury ball 136 at the lowest point in the metal case 134, thereby dividing the resistance 130 into unequal portions, 140A and 140B, in accordance with a tilt angle 142.

Tilt transducers that have been used with the present system include: a fluid-capacitance type clinometer, part number 02753-01, manufactured by Lucas Control Systems of Pennsauken, N.J.; and a mercury-wiped potentiometer manufactured by Comus International of Nutley, N.J., as part number VRS 2710K sensor.

Figure 15:
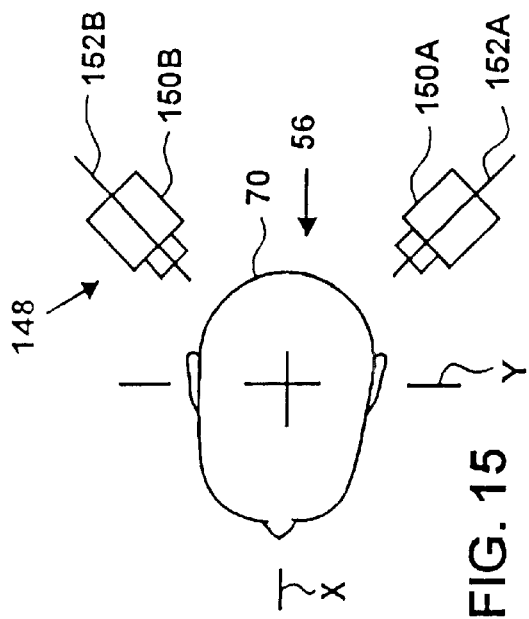
FIG. 15 is a top view of two proximity sensors positioned at 45 degrees behind an operator's head.

Referring now to FIG. 15, a proximity X-Y input device 148 includes proximity sensors, or proximity transducers, 150A and 150B, which are positioned behind the head 70 of the person 56 with first and second sensing axes, 152A and 152B, thereof positioned at 45 degrees to an X axis of the head 70. The proximity sensors, 150A and 150B, are of any suitable type, such as infrared, magnetic field, or ultrasonic, not an inventive part of the present invention.

While it is difficult, or even impossible, for many users to control steering and maneuverability of a vehicle or conveyance, such as the power wheelchair 10 of FIG. 1, when using various types of X-Y input devices, such as the X-Y input devices of FIGS. 2–12, 15, 34, and 35, the use of all of these X-Y input devices becomes highly practical when used in conjunction with a steering sensitivity control apparatus of the present invention, such as shown in FIGS. 16, 17, and 36–38.

Figure 16:
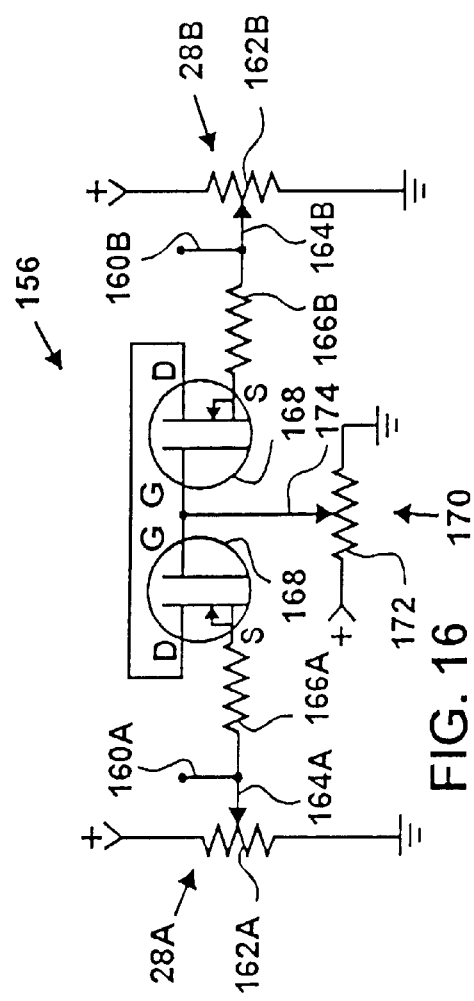
FIG. 16 is a schematic drawing of an embodiment of the steering sensitivity control of the present invention for use with transducers that are disposed as shown in FIG. 2.

Referring now to FIG. 16, the steering sensitivity control 156 includes all of the components shown, except for the left and right transducers, 28A and 28B, and except for output signal conductors, 160A and 160B. The output signal conductors, 160A and 160B, provide a signal that, when connected to any suitable electric control circuit, such as the circuit taught in Lautzenhiser et al., U.S. Pat. No. 4,906,906, controls power provided to the left and right motors, 14A and 14B, of FIG. 1.

It should be understood that the mercury-wiped potentiometers 62 of FIGS. 13 and 14, the proximity transducers 150A and 150B of FIG. 15, and various other types of potentiometers or transducers used in various types of X-Y input devices, such as the prior-art X-Y input device of Lautzenhiser, U.S. Pat. No. 5,129,277 and the aforereferenced capacitance tilt transducers, may be used.

The potentiometers, 28A and 28B, each include a resistor, 162A or 162B, and each include a wiper, 164A or 164B. The wipers, 164A and 164B, are positioned by respective ones of the shafts, 30A or 30B, of FIG. 2. Both of the potentiometers, 28A and 28B, are connected to a positive voltage and to ground, as shown in FIG. 16.

The steering sensitivity control 156 includes a pair of resistors, 166A and 166B, each resistor, 166A or 166B, being connected to a respective one of the wipers, 164A or 164B, and a pair of N-Channel metal oxide semiconductor field effect transistors, or N-Channel MOSFETs, 168 that are connected to each other and to respective ones of the resistors, 166A and 166B.

Figure 17:
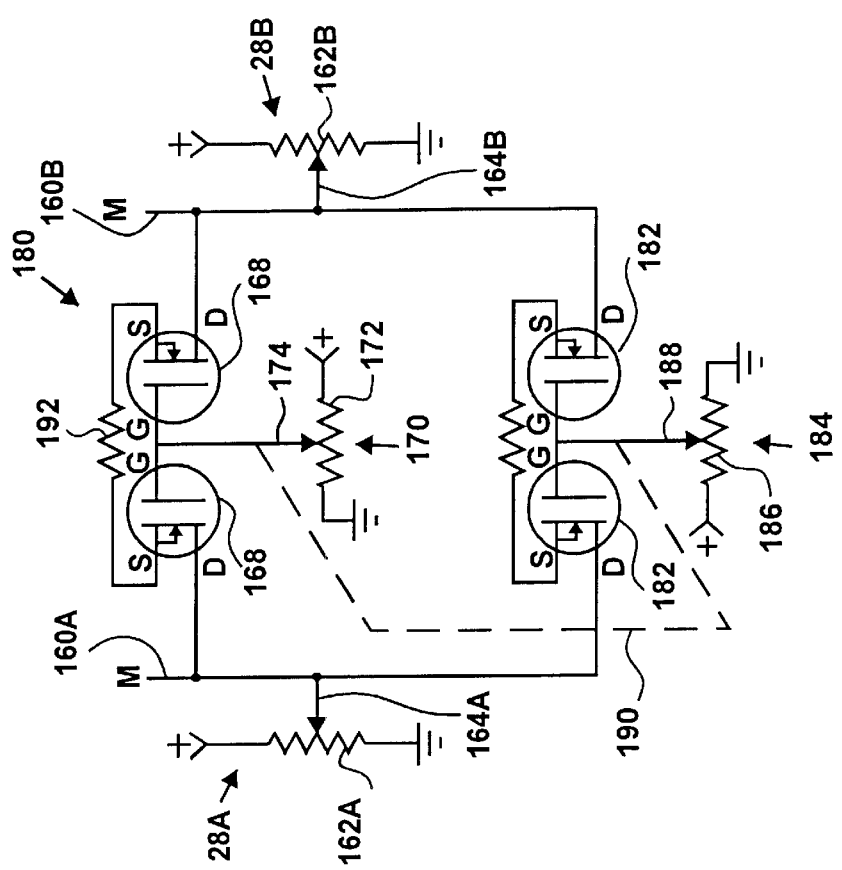
FIG. 17 is a schematic drawing of an embodiment of a steering sensitivity control of the present invention, for use with transducers that are disposed as shown in FIG. 2, that provides steering sensitivity control for both forward and reverse speeds.

In FIG. 16, and also in FIG. 17, source terminals of the MOSFETs 168 are marked "S," drain terminals are marked "D," and gate terminals are marked "G."

As shown in FIG. 16, the MOSFETs 168 are connected in a common-drain terminal D configuration, and a selectively-variable gate voltage is supplied by a potentiometer 170 that includes a variable resistor 172 and a wiper 174. The resistor 172 is connected to both an 8 volt source, not shown, not an inventive part of the present invention, and to ground. The wiper 174 is connected to both gate terminals G.

An 8 volt source, not shown, not an inventive part of the present invention, is connected to the resistors, 162A and 162B, of both potentiometers, 28A and 28B, and the resistors, 162A and 162B, are both connected to ground.

In a typical design, the potentiometers 28A and 28B, have resistances of 10,000 ohms, the resistors, 166A and 166B, each have a resistance of 300 ohms, the variable resistor 172 has a resistance of 10,000 ohms, and the N-Channel MOSFETs 168 are sold by Supertex, Inc., of Sunnyvale, Calif., as part number TN0 104 N3.

Referring now to FIG. 17, in addition to like-numbered and like-named parts as in FIG. 16, steering sensitivity control 180 includes a pair of P-Channel field effect transistors, or P-Channel MOSFETs, 182, and a potentiometer 184 having both a resistor 186 and a wiper 188. The resistor 186 is connected to an 8 volt source and to ground, and the wiper 188 is connected to both gate terminals G of the P-channel MOSFETs 182. Optionally, as indicated by a dash line 190, the potentiometers 170 and 184 are mechanically ganged.

As shown in FIG. 17, both the N-Channel MOSFETs 168 and the P-Channel MOSFETs 182 are connected in common-source terminal S configuration. Further, instead of using the two resistors 166A and 166B, of FIG. 16, a single resistor 192 is used that has a resistance equal to the two resistors, 166A and 166B.

It makes very little difference in performance whether the MOSFETs, 168 and 182, are connected in the common-drain terminal D configuration of FIG. 16 or the common-source terminal S configuration of FIG. 17.

That is, considering only the N-Channel MOSFETs 168 of FIGS. 16 and 17, without regard to which configuration is used, one of the MOSFETs 168 operates as a diode before and during initial turn-on of that one MOSFET 168, so that the conductance between the wipers, 164A and 164B, is a function of the gate voltage of one MOSFET 168 as it turns on, combined with the diode action of the other MOSFET 168. Then, as both MOSFETs 168 turn on, the conductance is a function of the gate voltage applied to both MOSFETs 168 and the combined conductances of the MOSFETs 168.

Further, as can be seen by inspection, whether the MOSFETs 168 are connected in common-source terminal S configuration, or in common-drain terminal D configuration, current flows from the source terminal S to the drain terminal D through one MOSFET 168, and current flows from the drain terminal D to the source terminal S of the other MOSFET 168.

In like manner, whether one resistor 192 is used between the MOSFETs 168 as shown in FIG. 17, or two resistors, 166A and 166B, are used as shown in FIG. 16, is of no consequence. The resistors, 166A and 166B, or 192, are used to limit coupling of the wipers, 164A and 164B, by the MOSFETs 168 by providing a minimum resistance therebetween.

Preferably the N-Channel MOSFETS 168 shown in the schematic drawings herein are part number TNO104N3, manufactured by Supertex, Inc., Sunnyvale, Calif., and the P-Channel MOSFETS 182 and 318 are part number TPO104N3 manufactured by the same company.

Figure 18:
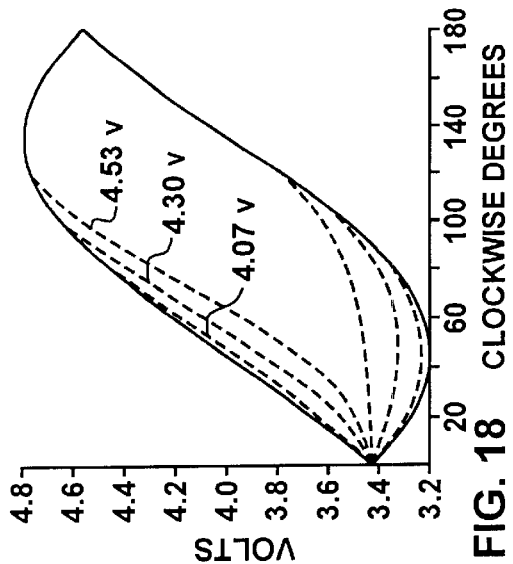
FIG. 18 is a graph of voltage versus joystick positions for the X-Y input device of FIG. 2, showing resultant voltages versus joystick positions when used with the steering sensitivity control of FIG. 16.

Referring now to FIGS. 16 and 18, solid lines on the graph of FIG. 18 show voltages produced at the wipers, 164A and 164B, when the potentiometers, 28A and 28B, are connected to an 8 volt source, and when the steering sensitivity control 156 is either omitted or rendered inoperative by reduction of the voltage applied to the gate terminals G of the MOSFETs 168.

For instance, when the joystick 34 of the X-Y input device 26 of FIGS. 2 and 3 is positioned at the intersection 50 of the X axis and the circular path 48 of FIG. 3, each of the wipers, 164A and 164B, of FIG. 16 produces 3.434 volts. When the joystick 34 is positioned 45 degrees clockwise at the intersection 52, the wiper 164B produces 3.2 volts and the wiper 164A produces 4.0 volts.

If the voltages of the wipers, 164A and 164B, as indicated by the solid lines of FIG. 18, are used to control the motors, 14A and 14B, of the conveyance 10 of FIG. 1 through the electronics taught in U.S. Pat. No. 4,906,906, a wiper voltage of 4.0 volts results in 0 volts applied to one of the motors, 14A or 14B.

As a wiper voltage reduces from 4.0 to 3.2 volts, an effective driving voltage is applied to one of the motors, 14A or 14B, of FIG. 1 that increases from zero to 12.0 volts, resulting in the maximum speed of one motor, 14A or 14B, and the respective wheel, 12A or 12B.

And as a wiper voltage increases from 4.0 to 4.8 volts, an effective driving voltage of the opposite polarity increases from 0 to 12.0 volts, and is applied to one of the motors, 14A or 14B, of FIG. 1 thereby providing maximum-speed reverse rotation of that motor, 14A or 14B, and maximum-speed reverse rotation of the respective wheel, 12A or 12B.

Continuing to refer to FIGS. 16 and 18, three dashed line curves of FIG. 18 show control signal voltages that are supplied to the output signal conductors, 160A and 160B, versus degrees of clockwise rotation of the joystick 34 of FIG. 3 when the steering sensitivity control 156 is used, and when three different gate voltages are used.

That is, the solid lines of FIG. 18 show the wiper voltages that are developed by the potentiometers, 28A and 28B, and the dash lines show the control signal voltages that result when the steering sensitivity control 156 is used, and when three different gate voltages are applied to the MOSFETs 168.

As clearly seen by inspection of FIGS. 16 and 18, at smaller angles of rotation of the joystick 34 of FIG. 3, wherein the difference between the voltages produced by the wipers, 164A and 164B, are relatively small, the steering sensitivity control 156 produces control signal voltages that are greatly reduced from the voltages produced by the wipers, 164A and 164B.

That is, the larger of the wiper voltages is reduced by a large percentage of the difference between the two wiper voltages. And the smaller of the wiper voltages is increased by a large percentage of the difference between the two wiper voltages.

However, as the differences between the voltages produced by the wipers, 164A and 164B, increase, the steering sensitivity control 156 produces control signal voltages that vary from the wiper voltages by smaller percentages. And, at some angle of rotation of the joystick 34 of FIG. 3, the percentage of reduction reduces to zero.

For instance, as shown in FIG. 18, with 4.53 volts applied to the gate terminals G of the MOSFETs 168 of FIG. 16, the steering sensitivity control 156 ceases to reduce the voltages developed by the wipers, 164A and 164B, when the joystick 34 is positioned at 120 degrees clockwise.

Thus the MOSFETs 168 of FIG. 16 combine with the resistors, 166A and 166B, to reduce the difference in the voltages at the wipers, 164A and 164B, by an inverse and nonlinear function. The nonlinearity of the present invention can be seen in the fact that the steering sensitivity control 156 functions as 600 ohm resistor at 0 degrees rotation of the joystick 34 of FIG. 3, and progressively functions as resistors of higher resistances as the joystick 34 is positioned at larger angles.

As shown in FIGS. 16 and 18, with the three different gate voltages of FIG. 18, there are three different angles of rotation of the joystick 34 of FIG. 3 at which current ceases to flow through the paired MOSFETs 168. Thus, for all practical purposes, the steering sensitivity control 156 functions as a resistor that automatically increases from 600 ohms to infinity as the joystick 34 is positioned farther clockwise or counterclockwise from the intersection 50.

This nonlinearity provides a selectively variable decrease in steering sensitivity. With a gate voltage of 4.53 volts, the decrease in sensitivity is more than 90 percent when the joystick 34 of FIG. 3 is positioned 15 degrees clockwise or counter clockwise. Obviously, this dramatic reduction in sensitivity makes it possible for severely handicapped persons to operate the power wheelchair 10 of FIG. 1 with the joystick 34.

By adjusting the gate voltage, the steering sensitivity control 156 can be adjusted for those with very poor motor skills, can be readjusted as motor skills improve, and can be adjusted for those with excellent motor skills.

Greatly reduced steering sensitivity, as provided by the present invention, also makes practical body-component-attached X-Y input devices, such as the head-attached X-Y input devices of FIGS. 4–8 and 35 and the hand-attached X-Y input devices of FIGS. 9–12.

As noted previously, when 90 percent reduction in steering sensitivity is achieved, the steering sensitivity control 156 is functioning as a 600 ohm resistor. If the steering sensitivity control 156 continued to operate as a 600 ohm resistor, there would be no problem in achieving maximum conveyance speeds, because both wipers, 164A and 164B, would produce the same voltages and the 600 ohm resistance would make no difference in the wiper voltages.

However, if the steering sensitivity control 156 continued to operate as a 600 ohm resistor when attempting to make a pivot turn with the wheels, 12A and 12B, of FIG. 1 rotating in opposite directions, instead of the voltage of the wipers, 164A and 164B, being 3.2 and 4.8 volts, these voltages would be 3.90 and 4.10 volts. Clearly, if the steering sensitivity control 156 functioned as a fixed resistance, it would be impossible to obtain 90 percent reduction in steering sensitivity and still be able to sharply maneuver the conveyance, or power wheelchair, 10 of FIG. 1.

In fact, there is no resistance small enough to produce a significant decrease in steering sensitivity that will not also degrade steering performance far beyond acceptable limits.

For instance, instead of a 90 percent reduction in steering sensitivity that occurs when the joystick 34 of FIG. 3 is positioned at 15 degrees, when the joystick 34 is positioned at 90 degrees clockwise for pivoting about the pivot axis 24 of FIG. 1, there is a reduction in voltage difference between the wipers, 164A and 164B, of only 24 percent. When the reduction in voltage difference is 24 percent, the steering sensitivity control 156 is operating as a 15,000 ohm resistor.

Or, with the gate voltage reduced from 4.53 volts to 4.30 volts, there is a reduction of steering sensitivity of 55 percent when the joystick 34 of FIG. 3 is positioned at 15 degrees, but there is a reduction of voltage difference between the wipers, 164A and 164B, of only 5.5 percent when the joystick 34 is positioned at 90 degrees. When the reduction in voltage is only 5.5 percent, the steering sensitivity control 156 is operating as an 98,000 ohm resistor.

Therefore, by setting the potentiometer 170 to provide gate voltages to the N-Channel MOSFETs 168 between 4.07 and 4.53 volts, a reduction in steering sensitivity of up to 90 percent can be selectively chosen. Even higher percentages can be achieved by changing parameters used in the steering sensitivity control 156, and especially by reducing the resistances of the resistors, 166A and 166B.

Figure 19:
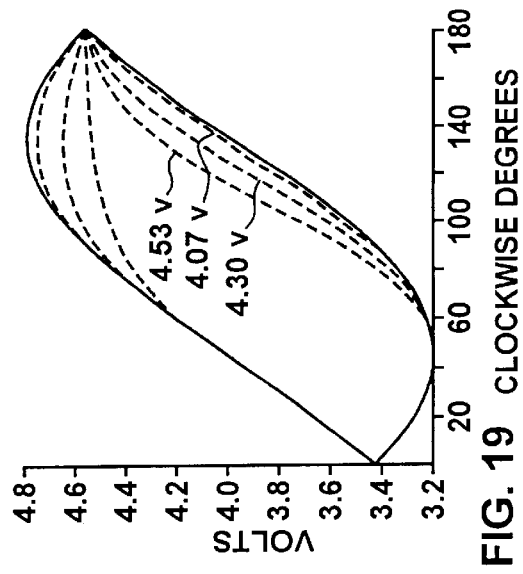
FIG. 19 is a graph of voltage versus joystick positions for the X-Y input device of FIG. 2, showing resultant voltages versus joystick positions when used with a portion of the steering sensitivity control of FIG. 17 that includes P-Channel MOSFETS.

Referring now to FIG. 19 and to the steering sensitivity control 180 of FIG. 17 in which both the N-Channel 168 and the P-Channel 182 MOSFETs are shown, if the N-Channel MOSFETs 168 are omitted, and only the P-Channel MOSFETs 182 are included, the dash lines of FIG. 19 show the resultant control signal voltages versus degrees of rotation of the joystick 34 of FIG. 3 for three different gate voltages.

Comparing the curves of FIGS. 18 and 19, it can be seen that the use of the P-Channel MOSFETs 182 produces results similar to that of the N-Channel MOSFETs 168 of FIG. 16, but that the resultant curves are a mirror image of the N-Channel MOSFETs 168 of FIG. 16.

Figure 20:
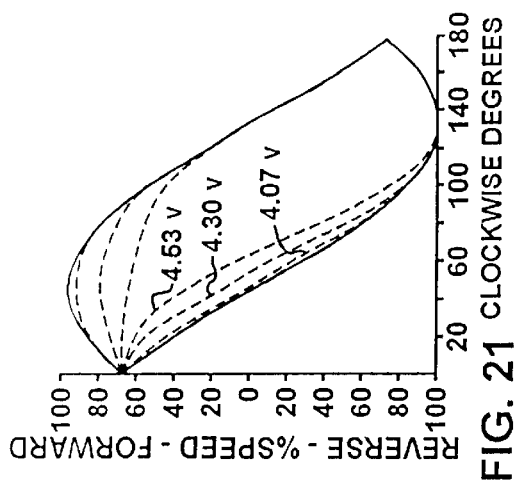
FIG. 20 is a graph of voltage versus joystick positions for the X-Y input device of FIG. 2, showing resultant voltages versus joystick positions when used with the entire circuitry of FIG. 17.

Referring now both to FIG. 20 and the steering sensitivity control 180 of FIG. 17, if both the N-Channel MOSFETs 168 and the P-Channel MOSFETs 182 are included, the dash lines of FIG. 20 show the resultant control signal voltages that are produced by three different gate voltages applied to the N-Channel MOSFETs 168 and another three gate voltages applied to the P-Channel MOSFETs 182.

Referring now to FIGS. 18–20 and 22, all of which show control signal voltages versus position of the joystick 34 in clockwise degrees, it can be seen that if a system is designed in which a reduction in control signal voltage produces an increase in forward speed, the N-Channel MOSFETs 168 should be used, if a system is designed in which an increase in control signal voltage produces an increase in forward speed, the P-Channel MOSFETs 182 should be used, and if steering sensitivity control is desired for both forward and reverse propulsion, both the N-Channel 168 and the P-Channel 182 MOSFETs should be used.

Figure 21:
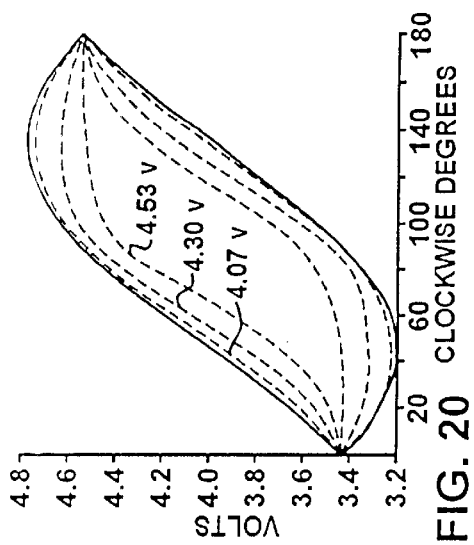
FIG. 21 is a graph of conveyance speed versus joystick positions for the conventional X-Y input device of FIG. 2, showing resultant conveyance speeds versus joystick positions when the steering sensitivity control of FIG. 16 is used.

Referring now to FIGS. 16 and 21, the solid line on the graph of FIG. 21 shows percentage of speed versus degrees of clockwise rotation of the joystick 34 of FIG. 3 for the left and right motors, 14A and 14B, of FIG. 1 when the steering sensitivity control 156 is either omitted or the gate voltages are adjusted to make the control 156 inoperative. The three curves in dash lines show percentages of maximum speed for the left and right motors, 14A and 14B, when the steering sensitivity control 156 of FIG. 16 is used, and when gate voltages of 4.53, 4.30, and 4.07 are used.

As shown by the solid lines in FIG. 21, and as previously mentioned, when the joystick 34 of FIG. 3 is positioned at the intersection 50 of the X axis and the circular path 48, the motors, 14A and 14B, of FIG. 1, both receive effective driving voltages that are 70.7 percent of maximum, so both motors, 14A and 14B, operate at roughly 70.7 percent of maximum speed, dependent, of course, upon loads placed on the motors, 14A and 14B, and also dependent upon the use of a feedback system to modify the usual curve of speed versus load for the D.C. motor, 14A or 14B.

A feedback system for selectively changing the curve of speed versus load for the D.C. motor, 14A or 14B, is shown in Lautzenhiser, U.S. Pat. No. 5,270,624.

But when the joystick 34 of FIG. 3 is positioned 45 degrees clockwise, with a gate voltage of 4.07 volts applied to the MOSFET 168, instead of being given 70.7 percent of the maximum effective driving voltage, the effective driving voltage, and thus also the speed of the left motor 14A of FIG. 1 increases to 100 percent, and the speed of the right motor 14B decreases to zero. Thus, as a natural function of the construction of X-Y input devices, such as the X-Y input device 26 of FIG. 2, the speed of the wheelchair 10 of FIG. 1 will increase by 41 percent when making turns. At the very time when a reduction of speed would add to both ease of control and safety, the speed increases.

However, continuing to refer to FIGS. 16 and 21, with a gate voltage of 4.30 volts applied to the MOSFETs 168, instead of a 41 percent increase in speed with the joystick 34 of FIG. 3 positioned at 45 degrees, the increase in speed is only 16 percent. And with a gate voltage increased to 4.53 volts, instead of a 41 percent increase in speed, the speed of the outside motor, 14A or 14B, of FIG. 1 decreases by 9 percent, providing not only ease of control but also safety of operation.

Figure 22:
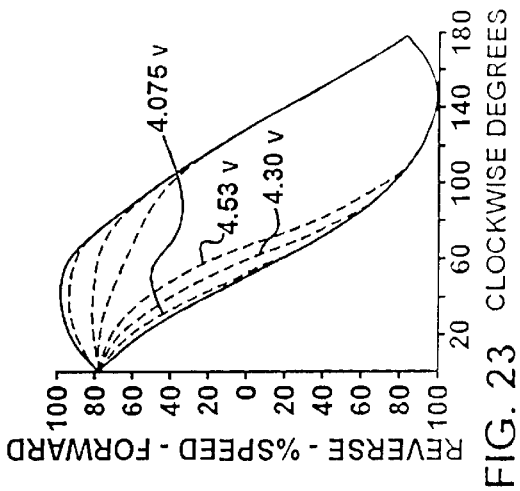
FIG. 22 is a graph of voltage versus joystick positions for an improved X-Y input device of Lautzenhiser et al., U.S. Pat. No. 5,012,165, showing resultant voltages versus joystick positions when used with the steering sensitivity control of FIG. 16.

Referring now to FIG. 22, the curves in solid lines show voltages produced at the wipers of the potentiometer of the improved prior-art X-Y input device of U.S. Pat. No. 5,012, 165. In this improved prior-art X-Y input device, the mechanical mechanism can be selectively changed to provide three different selected ratios of movement of the joystick 34 to Y axis output.

The solid line curves of FIG. 22 show wiper volts for this improved X-Y input device when the mechanical mechanism is adjusted to produce the higher of two reduced Y axis outputs.

Referring now to FIGS. 18 and 22, the differences between the voltages produced at the wipers of this improved prior-art X-Y input device change more slowly, at rotations of the joystick 34 near the X axis, than the conventional prior-art X-Y input device of FIG. 18. Therefore, this improved prior-art X-Y input device significantly reduces steering sensitivity, and significantly increases ease of steering control, even when used without using the steering sensitivity control, 156 or 180, of FIGS. 16 and 17 of the present invention.

Continuing to refer to FIG. 22, three sets of dash lined curves show two control signal voltages, one for control of the left motor 14A of FIG. 1, and the other for control of the right motor 14B, that are produced by three different gate voltages.

Figure 23:
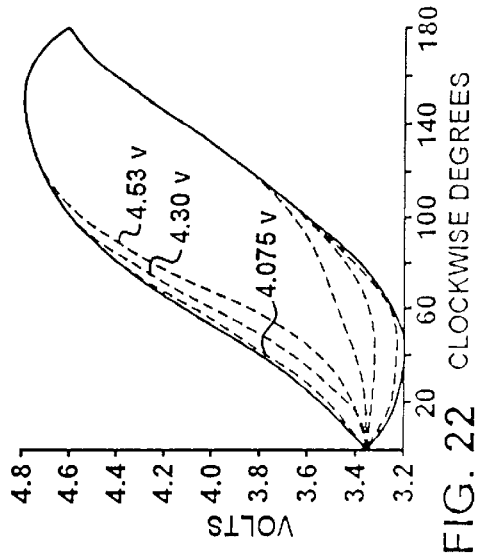
FIG. 23 is a graph of conveyance speed versus joystick positions for the improved prior-art X-Y input device of Lautzenhiser, showing, in dash lines, resultant conveyance speeds versus joystick positions when used with the steering sensitivity control of FIG. 16.

Referring now to FIG. 23, the solid line curves show percentage of maximum speed versus position of the joystick 34 in clockwise degrees for the improved X-Y input device used to produce the voltages of FIG. 22.

Referring to FIGS. 21 and 23, the percentage of speed versus the position of the joystick 34 of the improved prior-art X-Y input device changes more slowly for rotations of the joystick 34 near the X axis than it does when a conventional X-Y input device is used, thereby showing again that this improved prior-art X-Y input device significantly reduces steering sensitivity, even when used without the steering sensitivity control, 156 or 180, of FIGS. 16 and 17 of the present invention.

Continuing to refer to FIG. 23, the three pairs of dashed lines show the control signal voltages that result from using three different gate voltages. With a gate voltage of 4.30, the speed of the motor, 14A or 14B, of FIG. 1 on the outside of the turn increases only 6.4 percent, from 78 to 83 percent of maximum speed as the position of the joystick 34 is rotated from 0 to 45 degrees. With a gate voltage of 4.53, the speed of the motor, 14A or 14B, on the outside of the turn reduces by 14.7 percent, from 78 percent of maximum speed to 68 percent.

However, the improvement in performance is even greater than shown above. As pointed out previously, the conveyance 10 of FIG. 1 pivots around one wheel, 12A or 12B, when the speed of one motor, 14A or 14B, is zero, and zero speed occurs when the control signal voltage controlling that motor, 14A or 14B, is 4.0 volts. And the conveyance 10 pivots around the pivot axis 24 when the voltages applied to the motors, 14A and 14B, are equal.

Referring now to FIG. 18 and to the three sets of dash lines, it can be seen that, instead of a control signal voltage of 4.0 volts occurring at 45 degrees, as does the wiper voltage of a conventional X-Y input device, a 4.0 volt control signal occurs at 47 degrees, 54 degrees, or 64 degrees, at gate voltages of 4.07, 4.30, or 4.53, respectively, when the steering sensitivity control 156 of FIG. 16 is used.

Therefore, a turn in which one wheel, 12A or 12B, pivots around the other wheel, 12B or 12A, that is stopped, occurs at angles up to 64 degrees, as opposed to 45 degrees with the prior-art wheelchair 10. This means that steering control is distributed over as much as 42 percent more of the circular path 48, thereby providing greater ease of control.

And, referring now to FIG. 19, with a gate voltage of 4.53 volts, as the 4.0 control signal voltage of FIG. 18 occurs at 64 degrees rotation of the joystick 34, the speed of the motor, 14A or 14B, of FIG. 1 that is on the outside of the turn decreases 14 percent.

A pivot turn about the pivot axis 24 of FIG. 1 occurs when the voltages applied to the motors, 14A and 14B, are equal in magnitude but opposite in direction. These equal but opposite polarity voltages occur when the control signal voltages vary equally from 4.0 volts. Thus, it can be seen by inspection of FIG. 19 that when the joystick 34 of FIG. 3 of conventional prior-art construction is used, wiper voltages are equidistant from 4.0 volts when the joystick 34 is positioned at 90 degrees.

By inspection of FIG. 18, it can be seen that when a gate voltage of 4.53 is used for the steering sensitivity control 156 of FIG. 16, the conveyance 10 of FIG. 1 will pivot about the pivot axis 24 when the joystick 34 of FIG. 3 is positioned at 90 degrees, as it also did without the use of the steering sensitivity control 156.

However, as can be seen by inspection of FIG. 18, with a gate voltage of 4.53, and with the joystick 34 of FIG. 3 positioned at 90 degrees, both of the motors, 14A and 14B, of FIG. 1 will rotate at 53 percent of maximum speed, thereby automatically providing safe pivot turns.

Figure 24:
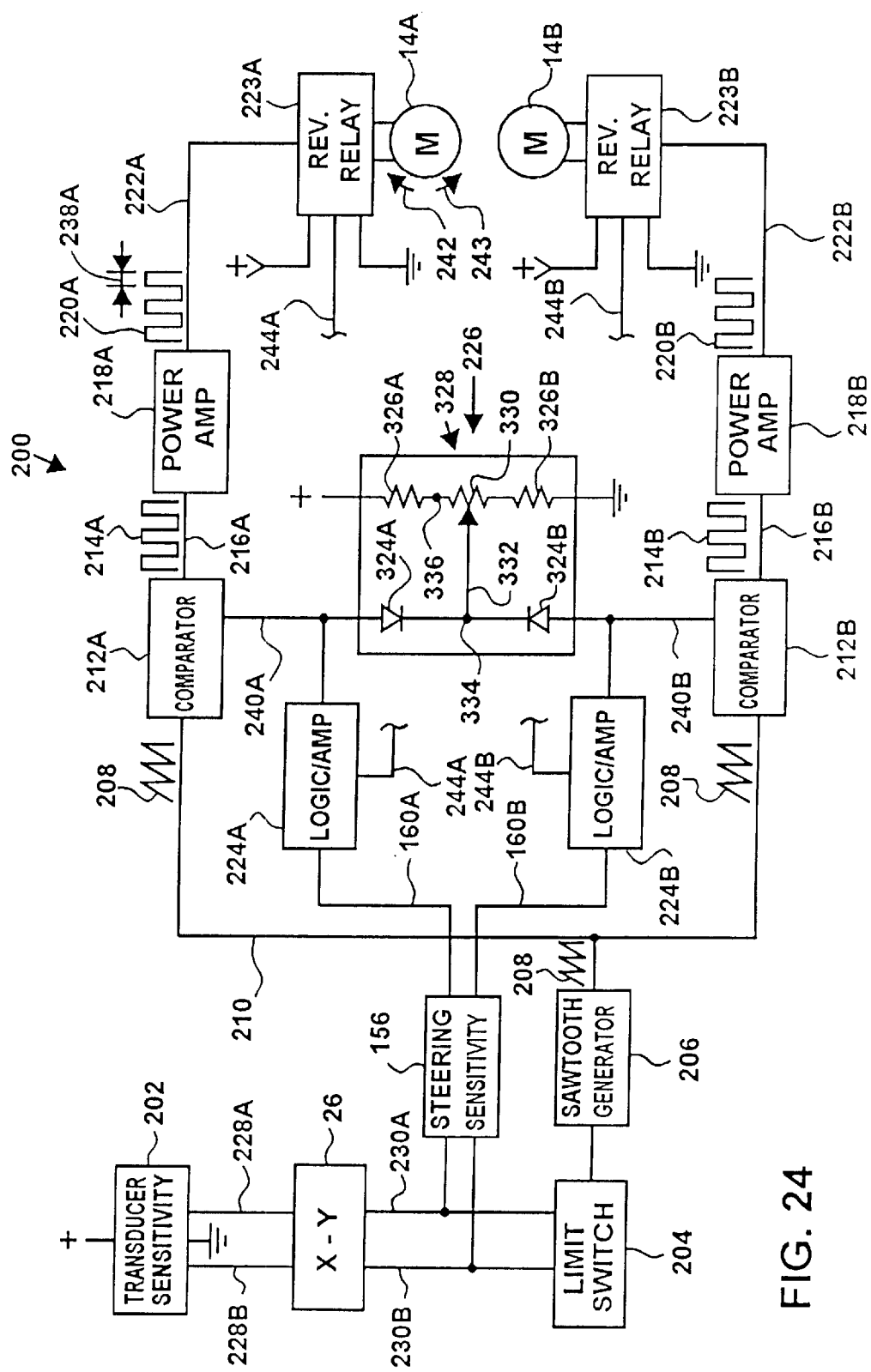
FIG. 24 is a block diagram showing portions of the present invention including the steering sensitivity control, the transducer sensitivity control, the limit-switch control, and the signal limiting control that provides adjustable speed-limiting being shown as a schematic drawing.
Figure 31:
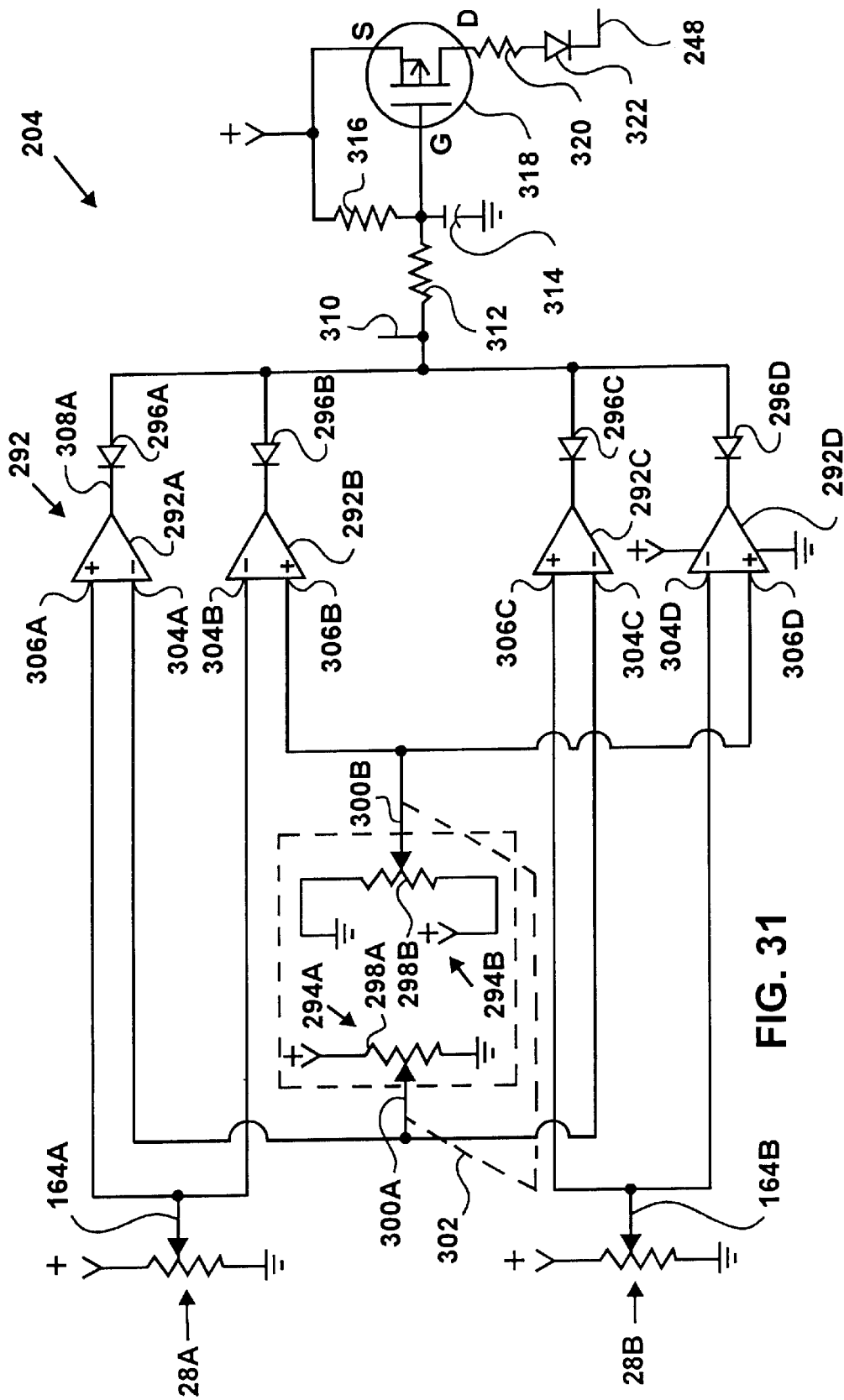
FIG. 31 is a schematic drawing of a limit-switch control of the present invention in which either a logic "low" or a logic "high" can be used to stop a conveyance when an output of an X-Y input device indicates, by an abnormally high output, the possibility of fainting, stroke, or other impairment that would prevent safe control of a conveyance.

Referring now to FIG. 24, a control system 200, shown as a block diagram, includes a transducer sensitivity control 202, the X-Y input device 26 of FIG. 2, a limit switch 204 of FIG. 31, a sawtooth generator 206 that produces a sawtooth wave 208 of FIG. 25, and a conductor 210 that delivers the sawtooth wave 208 to comparators 212A and 212B.

The sawtooth generator 206 is a standard relaxation circuit that can be found, and that is fully described, in both electronic textbooks and electronic handbooks, therefore a detailed description is unnecessary.

The comparators, 212A and 212B, produce pulse-width-modulated square waves, or control signals, 214A and 214B of FIG. 26, conductors, 216A and 216B, deliver the pulse-width-modulated waves 214A and 214B, and power amplifiers, 218A and 218B, reproduce the pulse-width-modulated waves, 214A and 214B, with greater power as pulse-width-modulated driving voltages, or effective driving voltages, 220A and 220B.

Although not a part of the system 200, the motors, 14A and 14B of FIG. 1, are shown connected to the pulse-width-modulated driving voltages, 220A and 220B, of the power amplifiers, 218A and 218B, by conductors, 222A and 222B, and by reversing relays, 223A and 223B.

The control system 200 also includes the steering sensitivity control 156 of FIG. 16, logic/amplifiers, 224A and 224B, and a signal limiting control 226.

Operation of the control system 200 of FIG. 24 is as follows: the transducer sensitivity control 202 is connected to an 8.0 volt source and to ground. The transducer sensitivity control 202 produces two voltages. One of these voltages is lower than the source voltage by an adjustably selectible value, and the other is higher than ground by the same value.

These higher and lower voltages are delivered to the X-Y input device 26 by conductors, 228A and 228B, respectively, and these two voltages are used across the transducers, such as the potentiometers, 28A and 28B of FIG. 17 of the X-Y input device 26.

By providing selectively decreasing voltage differentials across the potentiometers, 28A and 28B of FIG. 17, the transducer sensitivity control 202 provides means for selectively reducing the sensitivity of the potentiometers in an X-Y input device, such as the potentiometers, 28A and 28B of FIG. 17 of the X-Y input device 26 of FIG. 2, or the mercury-wiped potentiometer 62 of the eyeglass X-Y input device 58 of FIGS. 4 and 5.

Stated another way, when a voltage is placed across the potentiometer 62 of FIG. 5, the transducer sensitivity control 202 reduces the voltage per degree of the tilt angle 142 of FIG. 14.

When used with the mercury-wiped potentiometer 62 of FIG. 5, the transducer sensitivity control 202 reduces tilt-angle sensitivity of the potentiometers 62. That is, it reduces the change in volts per degree of the tilt angle 142 of FIG. 14.

Both outputs of the X-Y input device 26 of FIG. 2 are delivered by conductors, 230A and 230B, to both the steering sensitivity control 156 and the limit switch 204.

The steering sensitivity control 156 develops control signals in the output signal conductors, 160A and 160B, as taught in conjunction with FIG. 16. That is, the steering sensitivity control 156 decreases differences between the signals received from the X-Y input device 26.

As shown in FIGS. 24 and 25, the comparator 212A compares an amplified control signal 232A with the sawtooth wave 208, and selects a pulse width 234A proportional to the magnitude of the amplified control signal 232A, so that the output of the comparator 212A is the pulse-width-modulated square wave 214A that has a pulse width 236, as shown in FIG. 26.

The pulse-width-modulated square wave 214A of FIG. 26 is power amplified by the power amplifier 218A and delivered to the motor 14A of FIG. 1 as the pulse-width-modulated driving voltage 220A and a pulse width 238 of FIG. 24 that is identical to the pulse width 236 of FIG. 26.

More particularly, the control signals, 214A and 214B, from the transducer sensitivity control 202 are delivered to the logic/amplifiers, 224A and 224B, by the conductors, 160A and 160B, and the logic/amplifiers, 224A and 224B, develop the amplified control signal 232A and an amplified control signal 232B as shown in FIG. 25., The amplified control signals, 232A and 232B, in conductors, 240A and 240B, are delivered to the comparators, 212A and 212B.

The logic/amplifiers, 224A and 224B, perform two functions. One function is to amplify the power of the output received from the steering sensitivity control 156 of FIG. 16. The other function is to provide a subtraction and logic step.

In the subtraction and logic step, the logic/amplifiers, 224A and 224B, provide a subtraction function, so that the amplified control signals, 232A and 232B, in the conductors, 240A and 240B, are the absolute difference between the outputs received from the steering sensitivity control 156 of FIG. 16 and 4.0 volts.

That is, if the steering sensitivity control 156 of FIG. 16 delivers 3.8 volts to the logic/amplifier 224A, the logic/amplifier 224A supplies a control signal 232A of 0.2 volts to the comparator 212A. And, if the steering sensitivity control 156 delivers 4.2 volts to the logic/amplifier 224A, the logic/amplifier 224A again delivers a control signal 232A of 0.2 volts to the comparator 212A. In both instances, the 0.2 volt control signal 232A determines the pulse width 234A or a pulse width 234B of FIG. 25 and the speed of the motor 14A. However, in these two examples, even though the speed of the motor 14A is the same, the direction of rotation of the motor 14A is different.

More particularly, when the steering sensitivity control 156 of FIG. 16 delivers an output of 3.8 volts and the logic/amplifier 224A produces a control signal 232A of 0.2 volts, the motor 14A runs in a forward-rotation direction 242. When the steering sensitivity control 156 delivers an output of 4.2 volts and the logic/amplifier 224A again produces a control signal 232A of 0.2 volts, the motor 14A runs in a reverse-rotation direction 243.

Control of the direction of rotation of the motors, 14A and 14B, is accomplished by the logic/amplifiers, 224A and 224B and by the reversing relays, 223A and 223B.

That is, depending upon whether an output from the steering sensitivity control 156 of FIG. 16 is above or below 4.0 volts, a rotation-direction signal is produced by one of the logic/amplifiers, 224A or 224B, in a reversing conductor, 244A or 244B, that is attached to a respective one of the reversing relays, 223A or 223B. As shown, the reversing relays, 223A or 223B, receive power by connection to a voltage source and to ground, and the reversing relays, 223A and 223B, are controlled by signals received in the respective ones of the reversing conductors, 244A and 244B, from the logic/amplifiers 224A and 224B. The function of the reversing relays, 223A and 223B, is to reverse the polarity of the pulse-width-modulated driving voltages, 220A and 220B, as applied to the motors, 14A and 14B.

The particular manner in which the logic/amplifiers, 224A and 224B, function is not an inventive portion of the present invention, and so a detailed description is unnecessary. However, for those interested, a detailed description is included in U.S. Pat. No. 4,906,906.

This condition of developing the pulse-width-modulated square wave 214A of FIG. 26 whose widths 236 are proportional to the magnitudes of the amplified control signal 232A continues until an overrange condition is signaled by the limit switch 204.

When the limit switch 204 senses an overrange condition of a transducer, such as the potentiometer 62 of FIGS. 4 and 5, a logic "high" is delivered from the limit switch 204 to a negative input 245 of an operational amplifier 246 of the sawtooth generator 206 of FIG. 27, which shows the conductor 210 of FIG. 24, by a conductor 248. The raising of the potential at the negative input 245 raises the sawtooth wave 208 with respect to a reference voltage 250 of FIG. 25.

As can be seen by inspection of FIG. 25, raising the sawtooth wave 208 of FIG. 27 with respect to the reference voltage 250 decreases the pulse width 234A, thereby also reducing the pulse width 236 of FIG. 26.

The logic "high" of the limit switch 204 of FIG. 24 raises the sawtooth wave 208 sufficiently to decrease the pulse width 234A to zero, thereby also decreasing the pulse width 236 of FIG. 26 to zero, so that a driving voltage is no longer delivered to the. motor 14A.

Referring now to FIG. 28, the transducer sensitivity control 202 includes ganged potentiometers, 252A and 252B, having resistors, 254A and 254B, mechanically-ganged wipers, 256A and 256B, and the conductors, 228A and 228B, of FIG. 24. The resistors, 254A and 254B, have first ends, 258A and 258B, that are connected respectively to an 8 volt positive potential and to ground.

The resistors, 254A and 254B, also include second ends, 260A and 260B, that are connected to a resistor 262 of a trim potentiometer 264. A wiper 266 of the trim potentiometer 264 is also connected to the second end 260A of the resistor 254A so that the trim potentiometer 264 functions as a variable resistance between the ends, 260A and 260B. As shown by a phantom line 268, the wipers, 256A and 256B, of the potentiometers, 252A and 252B, are mechanically ganged.

Resistances of the resistors, 254A and 254B, are equal and linear, so that movement of the mechanically-ganged wipers, 256A and 256B, result in equally changed voltages at the wipers, 256A and 256B.

In operation, as can be seen by inspection, if the wipers, 256A and 256B, move toward the trim potentiometer 264, voltages at the wipers, 256A and 256B, move closer to each other. Conversely, if the wipers, 256A and 256B, move farther away from the trim potentiometer 264, the voltages at the wipers, 256A and 256B, are more nearly equal to the source and ground voltages, respectively.

Thus, it can be seen that at any positioning of the wipers, 256A and 256B, voltages selected by the wipers, 256A and 256B, are always equidistant from the source and ground voltages respectively.

When voltages of the wipers, 256A and 256B, are applied to the potentiometers, 28A and 28B of FIG. 16, by the conductors, 228A and 228B of FIG. 24, in place of the source and ground potentials shown in FIG. 16, and if the wipers, 164A and 164B, are positioned to deliver 4 volts to the steering sensitivity control 156 of FIG. 16, this voltage at the wipers, 164A and 164B, will remain constant with any adjustment of the wipers, 256A and 256B of FIG. 28.

Thus, by equally decreasing and increasing the voltages applied to the resistor 162A of FIG. 16, the sensitivity of an X-Y input device, such as the X-Y input devices, 26 or 58 of FIGS. 2 or 5, can be adjustably selected without changing a zero speed or null position of the X-Y input devices, 26 or 58.

Therefore, the transducer sensitivity control 202 provides means for electrically changing proportionality of output versus input of transducers, such as the transducers, 28A, 28B, or 62 of FIG. 2 or 5, without changing either the X or Y zero-speed inputs.

Further, when the mercury-wiped potentiometers 62 of FIG. 14 are used in an X-Y input device, such as the eyeglass X-Y input device 58 of FIGS. 4 and 5, the transducer sensitivity control 202 provides means for electrically changing the proportionality of output versus tilt angle 142 of transducers, such as the mercury-wiped transducers 62, without changing tilt angles 142.

Referring now to FIG. 29, a voltage selection control 270 includes mechanically-ganged potentiometers, 272A and 272B, mechanically-ganged wipers, 273A and 273B, resistors, 274A and 274B, and a resistor 276. The potentiometers, 272A and 272B, are mechanically ganged, as shown by a phantom line 277. As shown, the resistor 274B is connected to a positive source and to a resistor 278B of the potentiometer 272B, the resistor 278B is connected to the resistor 276, the resistor 276 is connected to a resistor 278A of the potentiometer 272A, the resistor 278A is connected to the resistor 274A, and the resistor 274A is connected to ground.

FIG. 30 shows a graph of wiper voltages versus positioning of wipers, 273A and 273B of FIG. 29 of the mechanically-ganged potentiometers, 272A and 272B, when the resistors, 274B, 278B, 276, 278A, and 274A have resistances of 22,000 ohms, 10,000 ohms, 5,200 ohms, 10,000 ohms, and 22,000 ohms, respectively.

More particularly, the wiper 273A produces voltages that vary from 3.7 to 2.5 volts, and the wiper 273B produces voltages that vary from 4.3 volts to 5.5 volts. It can be seen both graphically and mathematically that, at all positions of the mechanically-ganged wipers, 273A and 273B, the voltages of the wipers, 273A and 273B, are equidistant from 4.0 volts.

The voltage selection control 270 may be used in place of a portion of the limit switch 204 of FIG. 31, as will become evident.

Referring now to FIG. 31, the limit switch 204 includes a quad comparator 292, potentiometers, 294A and 294B, and four diodes, 296A, 296B, 296C, and 296D. The quad comparator 292 includes four comparators, numbered 292A, 292B, 292C, and 292D. The quad comparator 292 is sold as LM 339 by Motorola, Inc. of Phoenix, Ariz. The potentiometers, 294A and 294B, include resistors, 298A and 298B, and wipers, 300A and 300B. Preferably, as indicated by a phantom line 302, the wipers, 300A and 300B, are mechanically ganged for simultaneous adjustment.

The schematic drawing of FIG. 31 includes parts that function with, but are not a part of, the limit switch 204. The potentiometers, 28A and 28B of FIG. 16, are a part of an X-Y input device, such as the X-Y input device 26 of FIG. 2, and the respective output signal conductors, 160A and 160B, are included in FIG. 16.

As shown in FIG. 31, both of the resistors, 298A and 298B, of the potentiometers, 294A and 294B, are connected to a voltage source and to ground, and they are connected so that movement of the wipers, 300A and 300B, in the same direction results in one of the wipers, 300A or 300B, selecting a higher voltage and the other of the wipers, 300B or 300A, selecting a lower voltage.

When the potentiometers, 294A and 294B, are mechanically ganged as shown by the phantom line 302 and both resistors, 298A and 298B, are connected to an 8.0 volt source, with the resistors, 298A and 298B, being linear, and both wipers, 300A and 300B, are able to select 4.0 volts at the same time, then as the wipers, 300A and 300B, are moved together, voltages selected by the wipers, 300A and 300B, are always equidistant from 4.0 volts.

As now becomes evident, the voltage selection control 270 of FIG. 29 can be substituted for the potentiometers 294A and 294B.

As noted earlier, when voltages selected by wipers, such as the mercury balls 136 of the mercury-wiped potentiometers 62 of FIG. 14, vary from 3.2 to 4.8 volts, both the speed and direction of the motors, 14A and 14B of FIG. 1, are controlled. With 4.0 volts at a wiper, such as the mercury ball 136, one of the motors, 14A or 14B, stops.

If the person 56 of FIG. 4 is using the eyeglass X-Y input device 90 of FIG. 6 with the mercury-wiped potentiometer 62 thereof, tilting of the head 70 can result not only in wiper voltages within the range of 3.2 to 4.8 volts, but also in voltages both smaller than 3.2 volts and larger than 4.8 volts.

The limit switch 204 uses voltages that are beyond those normally used for control of forward and reverse speeds, as selectively set by the signal limiting control 226, to sense the possibility that the person 56 of FIG. 4 operating the conveyance 10 of FIG. 1 is unable to control the conveyance 10 safely because of stroke, seizure, fainting, or other temporary or permanent problem.

Referring now to FIGS. 24 and 31, assume that the wiper 300A of FIG. 31 is positioned to produce 3.0 volts, and assume that the wiper 300B is positioned to produce 5.0 volts.

Negative inputs, 304A and 304C, of the comparators, 292A and 292C, are connected to the 3.0 volts of the wiper 300A, and positive inputs, 306B and 306D, of the comparators, 292B and 292D, are connected to the 5.0 volts of the wiper 300B. The wiper 164A is connected to a positive input 306A and to a negative input 304B of the comparators, 292A and 292B. The wiper 164B is connected to a positive input 306C and to a negative input 304D. The comparator 292 is connected to both a positive voltage source and to ground, as shown.

In operation, if, for instance, the voltage at the wiper 164A drops below the 3.0 volts, then, since 3.0 volts is applied to the positive input 306A of the comparator 292A, an output 308 of the comparator 292A goes low, approaching ground potential. At this time, any voltage in a signal conductor 310 is lowered to a few tenths of a volt by the diode 296A.

In like manner, if either of the wipers, 164A or 164B, produces a voltage that exceeds 5.0 volts, then one of the comparators, 292B or 292D, goes low, then a voltage in the signal conductor 310 is lowered to a few tenths of a volt by the respective diode, 296B or 296D.

Therefore, it can be understood that the signal conductor 310 of the limit switch 204 of FIG. 31 can be connected anywhere in an electronic system in which a low will stop the conveyance 10 of FIG. 1.

The limit switch 204 of FIG. 31 further includes a soft-react resistor, or component, 312, a soft-react capacitor, or component, 314, a pull-up resistor 316, a P-Channel MOSFET 318, a bias resistor 320, and a diode 322.

When a logic "low" occurs in the signal conductor 310, a gate terminal G of the MOSFET 318 goes low, the MOSFET 318 conducts, and the bias resistor 320 and the diode 322 cooperate to bias the conductor 248 high which is also the same-numbered conductor of the sawtooth generator 206 of FIG. 27.

As discussed in conjunction with FIGS. 25 and 27, biasing the conductor 248 of the sawtooth generator 206 results in raising the sawtooth wave 208 with respect to the reference voltage 250.

However, if the conveyance 10 of FIG. 1 were to stop abruptly when the limit switch 204 senses an overrange condition of a transducer, such as the mercury-wiped transducer 62 of FIG. 14, this abrupt stop could be disconcerting, if not dangerous to the person 56 of FIG. 4 operating the conveyance 10.

In like manner, an abrupt start would be equally disconcerting, and perhaps more dangerous, if the person 56 of FIG. 14 inadvertently caused an overrange condition of the transducer 62, the conveyance 10 of FIG. 1 stopped, and then the person 56 corrected the overrange condition.

However, when a logic "low" occurs in the signal conductor 310, the resistor 312 and the capacitor 314 cooperate to provide a "soft" shut-down, because of the time that is required to discharge the capacitor 314 through the resistor 312. Not only do these two components, 312 and 314, cooperate to provide a "soft" shut down, but also the resistors, 312 and 316, cooperate to function as a voltage divider further slowing reaction to the logic "low" in the signal conductor 310.

In like manner, when the signal conductor 310 no longer conducts to ground through one of the diodes 296A–296D, the resistor 316 and the capacitor 314 cooperate to provide a "soft" start because of the time required to charge the capacitor 314 through the resistor 316.

Referring again to FIG. 24, the signal limiting control 226 includes diodes 324A and 324B, resistors 326A and 326B, and a potentiometer 328 with a resistor 330 and a wiper 332. The resistors, 326A, 326B, and 330, are connected in series between a source and ground as shown.

Selective setting of the wiper 332 selectively places a potential at a point 334 between the diodes, 324A and 324B. Whenever an amplified control signal, 232A or 232B of FIG. 25, in one of the conductors, 240A or 240B, attempts to exceed the potential selectively set at the point 334, the voltage of that control signal, 232A or 232B, is limited by action of one of the diodes, 324A or 324B, to only a few tenths higher than the voltage adjustably set at the point 334.

Therefore, the signal limiting control 226 provides means for selectively limiting the speed of the motors, 14A and 14B, and the speed of the conveyance 10 of FIG. 1, irrespective of the magnitude of the amplified control signal, 232A or 232B.

Earlier, a use of the limit switch 204 of FIG. 31 was described in which a logic "high" of the limit switch 204 is used to raise the sawtooth wave 208 with respect to the reference voltage 250 of FIG. 25. Alternately, the logic "low" in the signal conductor 310 of the limit switch 204 may be used to stop the conveyance 10 of FIG. 1.

More particularly, the logic "low" of the limit switch 204 of FIG. 31 in the conductor 310 may be attached to the point 334 between the diodes, 324A and 324B, to bleed down the amplified control signals, 232A and 232B of FIG. 25 developed by the logic/amplifiers, 224A and 224B.

Or, alternately, the logic "low" in the signal conductor 310 of the limit switch 204 of FIG. 31 may be attached to a point 336 between the resistor 326A and the resistor 330 of the potentiometer 328.

Earlier it was mentioned that the tilt switch 92 of the eyeglass X-Y input device 90 of FIG. 6 could be used to stop the conveyance 10 of FIG. 1. Now it can be seen that, instead of using the limit switch 204 of FIG. 31, alternately the tilt switch 92 can be attached by the cable 94 to ground and to either the point 334 or the point 336 of the signal limiting control 226 of FIG. 24 to provide automatic shutdown of the system 200 when an excessive tilt of the head 70 of FIG. 4 indicates the possibility of inability to control the conveyance 10.

However, it is preferable to use the logic "high" in the conductor 248 to raise the sawtooth wave 208 with respect to the reference voltage 250 of FIG. 25, as previously described.

The reason for this can be seen by referring to FIGS. 24 and 25. With the amplified control signal 232A of the logic/amplifier 224A at the magnitude shown, and with the amplified control signal 232B of the logic/amplifier 224B at a lower magnitude as shown, the pulse widths, 234A and 234B, are as shown.

However, when a logic "high" in the conductor 248 of FIG. 27 of the limit switch 204 applies a bias voltage to the negative input 245 of the sawtooth generator 206, the sawtooth wave 208 is raised with respect to the reference voltage 250, and the pulse widths, 234A and 234B of FIG. 25, reduce equally and progressively to zero.

Therefore, if the conveyance 10 of FIG. 1 is in a turn, as indicated by the differences in the pulse widths, 234A and 234B, and the limit switch 204 senses an excessively large signal from the X-Y input device, such as the eyeglass X-Y input device 58 of FIGS. 4 and 5, the pulse widths, 234A and 234B, are reduced equally, and the conveyance 10 continues to turn until stopped as dictated by the person 56 operating the conveyance 10.

However, if the logic "low" is applied to either the point 334 or the point 336, the larger of the amplified control signals, 232A or 232B, reduces first, so that the amplified control signals, 232A and 232B, first become equal, the speeds of the motors, 14A and 14B, become equal, the conveyance 10 of FIG. 1 ceases to make a turn, and the conveyance 10 comes to a stop at a location other than the one dictated by manually-actuated input to an X-Y input device, such as the X-Y input device, 26 or 58 of FIGS. 2 and 5.

Figure 32:
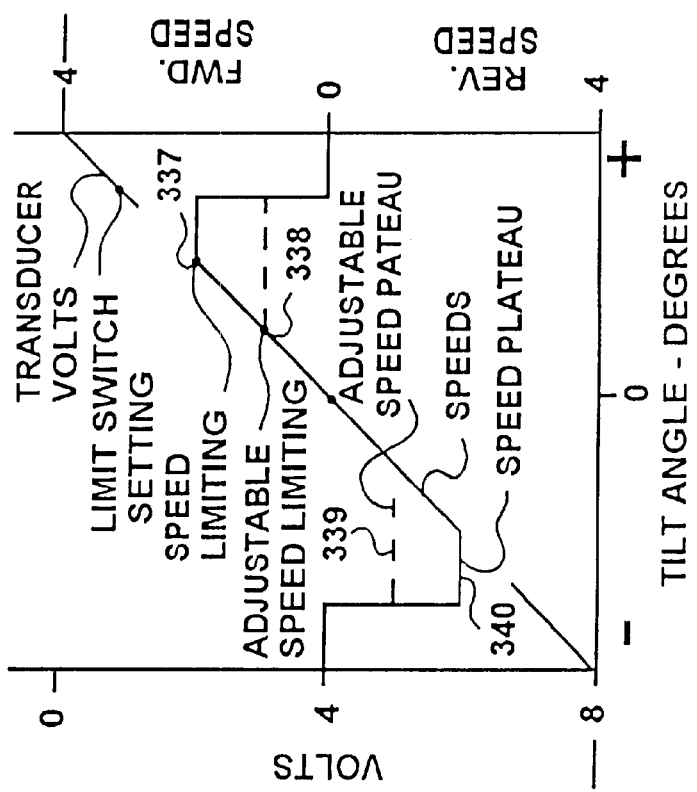
FIG. 32 is a graph of transducer volts and speed versus tilt angle of a tilt-angle transducer, showing tilt angles producing transducer volts that exceed the limit switch setting, showing speeds dropping to zero at a limit switch setting, showing both transducer volts and limit switch settings larger than a speed limit setting, and showing speed plateaus for two different speed limit settings.

Referring now to the graph of FIG. 32, tilt angles 142 of FIG. 14, both positive and negative, are shown on the horizontal axis, volts are shown on the left vertical axis, and both forward and reverse speeds of a motor, 14A or 14B of FIG. 1, or both forward and reverse speeds of the conveyance 10, are shown on the vertical axis on the right.

The axis marked "volts" represents a voltage exiting the steering sensitivity control 156 of FIG. 16 in either the conductor 160A or the conductor 160B. More particularly, the "volts" of the graph in FIG. 32 represent volts produced by one of the transducers, 28A or 28B of FIG. 16 of the X-Y input device 26 of FIG. 2, although the voltage of FIG. 32 may have been increased or decreased in the steering sensitivity control 156 from the volts produced by the transducer, 28A or 28B.

When the limit switch 204 of FIG. 24 is controlled by an X-Y input device that uses tilt transducers, such as the mercury-wiped potentiometers 62 of the eyeglass X-Y input device 58 of FIGS. 4 and 5, tilt angles 142 of FIG. 14 of the head 70 of FIGS. 4 and 5 may exceed tilt angles 142 that produce voltages used for controlling speeds and rotations of the motors, 14A and 14B.

That is, as illustrated in FIG. 32, transducer volts range between zero and 8.0, even though these voltages greatly exceed voltages used for controlling the conveyance 10 of FIG. 1.

Of course, the minimum and maximum transducer volts may be selectively limited by using the transducer sensitivity control 202 of FIG. 28 to apply potentials to the potentiometer 62 of FIG. 14 that is other than 0 and 8.0 volts.

Referring now to FIGS. 24 and 32, and considering only forward speeds, voltage in one of the conductors, 160A or 160B, decreases from a tilt angle 142 of zero speed of FIG. 14 in which 4.0 volts is produced, the speed of one motor, 14A or 14B, progressively increases up to a speed limit setting that is selectively determined by setting the potentiometer 328 of the signal limiting control 226.

Two speed limit settings are illustrated, one a higher speed limit 337 by a solid line, and a lower speed limit 338 by a dash line.

As shown by speed plateaus, 339 and 340 in FIG. 32, as tilt angles 142 of FIG. 14 of the transducer, such as the mercury-wiped transducer 62 increase further, speeds of the motor, 14A or 14B, remain constant. Also, as shown in the graph of FIG. 32, the speed plateau 339 of the dash line, representing a lower speed setting of the signal limiting control 226, extends over a wider range of tilt angles 142 than the speed plateau 340 of the higher speed limit that is shown by a solid line.

These speed plateaus, 339 and 340, allow the head 70 of FIGS. 4 and 5 to tilt beyond tilt angles 142 of FIG. 14 of the transducers 62 that produce limiting speeds without triggering shut-down of the system 200 by the limit switch 204.

When a tilt angle 142 of FIG. 14 is reached that produces a voltage equal to a setting of the limit switch 204, the motors, 14A and 14B, and the conveyance 10 of FIG. 1 stop.

But, by virtue of the soft-shut down provided by the resistor 312 and the capacitor 314 of FIG. 31, when a person 56 of FIG. 4 senses that the conveyance 10 of FIG. 1 is starting to shut down, he has time to correct the position of his head 70 to be within the range of tilt angles 142 of FIG. 4 that produce the speed plateau, 339 or 340, before the conveyance 10 comes to a stop.

As noted previously, shut down starts in accordance with volts in one of the conductors, 160A or 160B, of FIG. 24 reaching the setting of the limit switch 204.

If the tilt angle 142 of FIG. 14 increases still further, volts produced by the transducer, 28A, 28B, or 62, will continue to rise, raising the voltage in one of the conductors, 160A or 160B, but this increase in tilt angle 142 and volts has no effect on operation of the system 200.

Figure 33:
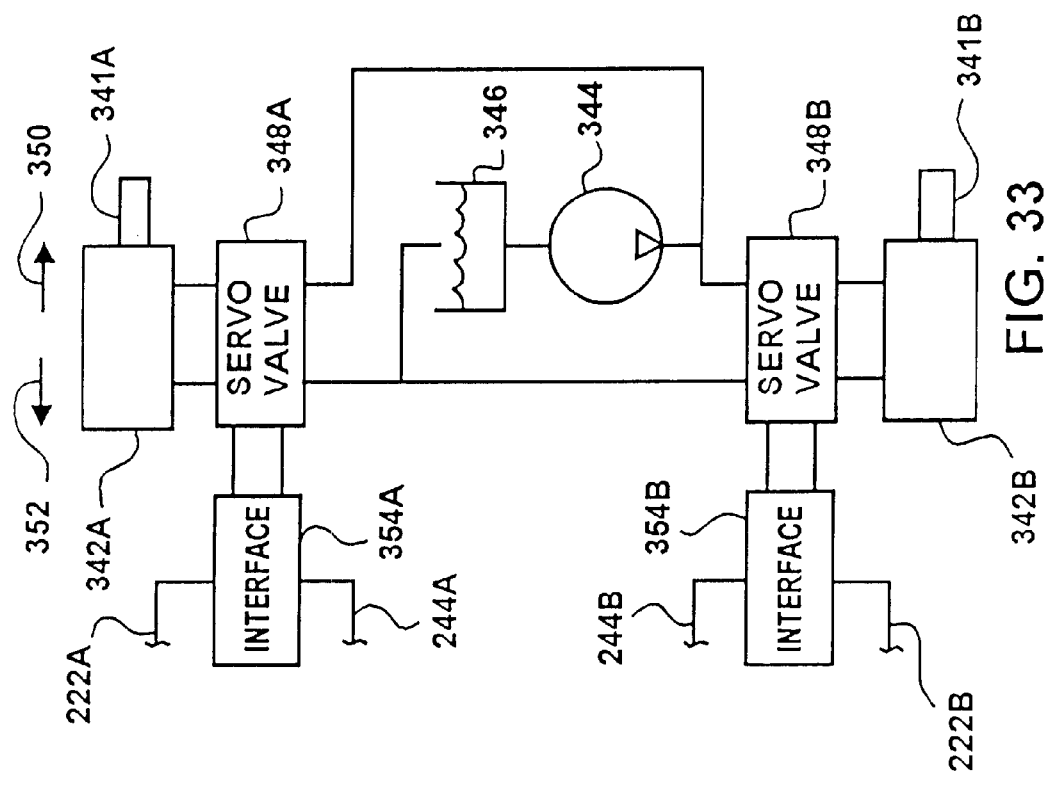
FIG. 33 is a schematic drawing of linear actuators replacing the D.C. electric motors of FIG. 24, and showing interfacing of the linear actuators with electrohydraulic servo valves.

Referring now to FIGS. 24 and 33, piston rods, 341A and 341B of linear actuators, or hydraulic cylinders, 342A and 342B, are powered by a pump 344 that receives fluid from a pump 346, and that delivers pressurized fluid to servo valves, 348A and 348B.

The linear actuators, 342A and 342B, are driven in a first direction 350 and in a second direction 352 at various speeds, and are selectively stopped by the servo valves, 348A and 348B.

The servo valves, 348A and 348B, are controlled by interfaces, 354A and 354B.

The interfaces, 354A and 354B, are connected to respective ones of the power amplifiers, 218A and 218B, by the conductors 222A and 222B to the pulse-width-modulated driving voltages, 220A and 220B. In addition, the interfaces, 354A and 354B, are connected to respective ones of the logic/amplifiers, 224A and 224B, by the conductors, 244A and 244B.

The power amplifiers, 218A and 218B, deliver the pulse-width-modulated driving voltages, 220A and 220B, to the interfaces, 354A and 354B, and the polarity of the driving voltages, 220A and 220B, as applied to each of the servo valves, 348A and 348B, is determined by signals supplied from the logic/amplifiers, 224A and 224B, to the servo valves, 348A and 348,B by the conductors, 244A and 244B.

It now becomes apparent that the interfaces, 354A and 354B, perform essentially the same function as the reversing relays, 223A and 223B. That is, they both receive two inputs.

One input is the pulse-width-modulated driving voltage, 220A or 220B, that determines speed of the actuators, 14A and 14B, or 342A and 342B.

The other input determines the direction of movement, whether the forward-rotation direction 242 or the reverse-rotation direction 243, of a rotary actuator, such as the motors, 14A and 14B, or first and second directions of reciprocating motions, such as the first 350 and second 352 directions of linear actuators, such as the hydraulic cylinders, 342A and 342B.

Since interfacing of signals is well known in the art, a detailed description is unnecessary. However, one method of interfacing can be understood by considering the method of reversing polarities taught in U.S. Pat. No. 4,906,906.

Referring now to FIG. 34, a prior-art X-Y input device 360 includes a mechanically-wiped turn-signal potentiometer, or turn-signal transducer, 362A that is oriented along an X axis and that provides outputs proportional to mechanical inputs along a Y axis; and a speed-signal potentiometer, or speed-signal transducer, 362B that is oriented along the Y axis and that provides outputs proportional to mechanical inputs along the X axis.

As shown in FIG. 38, the turn-signal potentiometer 362A includes a turn-signal wiper 364A. And, the speed-signal potentiometer 362B includes a speed-signal wiper 364B.

The X-Y input device 26 of FIG. 2 is suitable for use with the control system 380 of FIG. 36; whereas the X-Y input device 360 of FIG. 34 is suitable for use with the system of FIG. 38. Therefore, as the systems of FIGS. 36 and 38 are described, the potentiometers will be numbered in accordance with orientation of the potentiometers, 28A and 28B, or 362A and 362B, as shown in FIGS. 2 and 34, respectively.

While mechanically-wiped potentiometers 28A, 28B, 362A, and 362B will be shown and described, for purposes of describing the control systems of FIGS. 36 and 38, it should be kept in mind that other types of transducers, such as the mercury-wiped potentiometer 62 of FIG. 14, may be used.

Referring now to FIG. 35, a person 56 is shown wearing a headband X-Y input device 370 on his head 70. The headband X-Y input device 370 is suitable for use with the control system 410 of FIG. 38 and includes transducers 62 that are oriented as shown in FIG. 34.

More particularly, the headband X-Y input device 370 includes a headband 372, one mercury-wiped potentiometer 62 with a pivot axis 374 thereof disposed along a longitudinal, or X axis, and a second, identical, mercury-wiped potentiometer 62 with a pivot axis 376, as represented by a dot, disposed along a Y axis that is transverse to the paper.

Optionally, the headband X-Y input device 370 may be manufactured with the mercury-wiped potentiometers 62 at 45 degrees to the X and Y axes, as shown in FIGS. 2, 4, and 5. When manufactured in this alternate transducer orientation, the headband X-Y input device 370 is suitable for use with the control system of FIG. 36.

With either of the transducer orientations, since the mercury-wiped transducers 62 are only 0.562 inches (14.3 mm) in diameter and only 0.312 inches (8.0 mm) thick, the headband X-Y input device 370 may be concealed in a woman's hair, or disguised as a head ornament.

Referring now to FIG. 36, a control system 380 is provided for use with a pair of transducers, such as the potentiometers 28A and 28B of FIG. 2, or a pair of the mercury-wiped potentiometers 62 of FIGS. 13 and 14, oriented at 45 degrees to the X and Y axes, as shown in FIGS. 2, 4, and 5.

As taught previously herein, and as described in conjunction with FIG. 2, with this 45 degree orientation of the transducers, such as the potentiometers 28A and 28B, full forward speed in a straight line is achieved when an input on the X axis and both potentiometers, 28A and 28B, produce equal speed signals. And, as taught previously, steering is achieved when the potentiometers, 28A and 28B, produce unequal outputs.

The control system 380 of FIG. 36 includes a transducer sensitivity control 382A with a transducer sensitivity adjustment 384A. The potentiometer 28A is connected to output nodes, or output terminals, 386A and 386B of the transducer sensitivity control 382A, and the potentiometer 28B may be connected to the transducer sensitivity control 382A, or to another, identical, transducer sensitivity control which is represented by phantom lines 387.

First and second capacitors 388A are connected between the wiper 164A and respective ends 390 of the resistor 162A of the potentiometer 28A to limit the rate of change of potentials developed at the wiper 164A such as might be produced by body tremors. In like manner, third and fourth capacitors 388B are connected to the potentiometer 28B, as shown.

If the mercury-wiped potentiometers 62 of FIGS. 13 and 14 are used in the control system 380 of FIG. 36, the capacitors 388A and 388B reduce gravity and vibration-induced excursions of the mercury balls 136. In addition, a capacitor 392 is connected between the wipers 164A and 164B to limit the rate of change in the difference in the potentials developed by the two potentiometers, 28A and 28B, or the two mercury-wiped potentiometers 62.

The control system 380 also includes signal limiting controls 394 with signal limiting adjustments 396, a steering sensitivity control or turn signal conditioner 398 with a steering sensitivity adjustment 400, and a power controller 402 that are all connected to wipers 164A and 164B of the potentiometers 28A and 28B. The power controller 402 is connected to a source of electrical power, to ground, and to electric motors 14A and 14B.

Continuing to refer to FIG. 36, the transducer sensitivity control 382A is connected to a regulated power supply, preferably 12 volts dc, and to ground. Selective positioning of the transducer sensitivity adjustment 384A will lower a voltage in the node 386B from the 12 volts supplied thereto, and raise the voltage above ground in the node 386A by a substantially equal amount.

As the voltage in the node 386B is lowered and the voltage in the node 386A is raised, the average of the two voltages will stay the same. Therefore, the sensitivity of the potentiometer 28A can be selectably reduced, and the null, or center point, of the potentiometer 28A will not change.

The transducer sensitivity control 382A will selectively lower the voltage in the node 386B down from 12 volts to 7 volts, and at the same time, raise the voltage in the node 386A from zero to 5 volts. Thus, it can be seen that voltage at the midpoint in the resistor 162A does not change with selective positioning of the transducer sensitivity adjustment 384A, but instead remains at 6 volts.

By lowering the voltage in the node 386B and raising the voltage in the node 386A, the sensitivity of the potentiometer 28A will be reduced. If the mercury-wiped potentiometer 62 is used, this reduction in sensitivity will result in the requirement for an increase in inclination of the head 70 of FIG. 5 to achieve a given change in voltage at a wiper, such as the mercury ball 136 of FIGS. 13 and 14.

Figure 40:
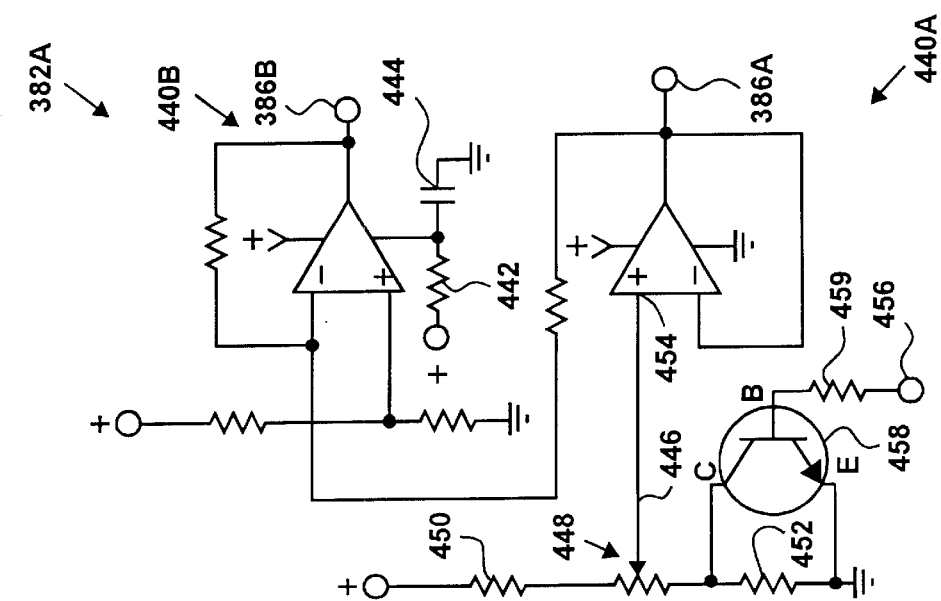
FIG. 40 is a schematic drawing of the transducer sensitivity control of FIGS. 36 and 38 in which rail-to-rail operational amplifiers replace the ganged potentiometers of the transducer sensitivity control of FIG. 28.

The transducer sensitivity control 202 of FIG. 28 may be used, however the transducer sensitivity control 382A of FIG. 40 has advantages and is preferred. The advantages of the transducer sensitivity control 382A will be discussed in conjunction with a detailed discussion of the embodiment of FIG. 40.

The signal limiting controls 394 together with the signal limiting adjustments 396 provide means for allowing the positions of the wipers, 164A and 164B of the potentiometers 28A and 28B, and inclinations of the head 70 of FIG. 5, to exceed positions that would ordinarily produce excessive speeds.

That is, the signal limiting controls 394 selectively limit the magnitude of voltages and resultant maximum conveyance speeds in accordance with selective positioning of the signal limiting adjustments 396. The signal limiting controls 394 will be discussed subsequently in conjunction with FIG. 41. One signal limiting control 394 is used for each wiper, 164A or 164B.

As taught previously, for systems with potentiometers 28A and 28B oriented as shown in FIG. 2, steering is achieved by positioning potentiometers 28A and 28B in a manner that produces an output from one potentiometer 28A that is greater than the output from the other potentiometer 28B. Therefore, a reduction in steering sensitivity is achieved by reducing differences in the two outputs.

Continuing to refer to FIG. 36, the steering sensitivity control 398, together with the steering sensitivity adjustment 400, provides inverse and nonlinear reductions in the difference in voltages between wipers 164A and 164B, thereby providing inverse and nonlinear reduction in steering sensitivity as discussed in conjunction with FIGS. 16 and 17, and as will be discussed in conjunction with FIG. 37.

The power controller 402 is a power interface that changes low energy signals to effective driving voltages, and that provides reversal of polarity, thereby providing driving voltages and motor-reversing capabilities.

The power controller 402 is not an inventive part of the present invention; therefore no detailed construction is provided. Any suitable circuit may be used.

However, it should be noted that a null position of the wipers 164A and 164B is a zero-speed position for the motors 14A and 14B, so that forward and reverse rotational directions of the motors 14A and 14B, is achieved, as well as selecting the speeds of the motors 14A and 14B, with forward speeds occurring with increases in wiper voltages, or decreases, in accordance with design selection.

Referring now to FIG. 38, a control system 410 is provided for use with a pair of transducers that are aligned with respective ones of X and Y axes, as shown in FIG. 34.

The control system 410 of FIG. 38 includes the transducer sensitivity control 382A with the transducer sensitivity adjustment 384A, and a transducer sensitivity control 382B with a transducer sensitivity adjustment 384B, which is identical to the transducer sensitivity control 382A with its transducer sensitivity adjustment 384A of FIGS. 36 and 40.

The control system 410 of FIG. 38 also includes the turn-signal potentiometer 362A, the speed-signal potentiometer 362B, the capacitors 388A and 388B, the signal limiting controls 394 with their respective signal limiting adjustments 396, a steering mixer 412, and a power controller 414 that is connected to the two electric motors, 14A and 14B.

Optionally, the headband X-Y input device 370 of FIG. 35 with a pair of the mercury-wiped potentiometers 62 of FIGS. 13 and 14 may be used. The mercury-wiped potentiometers 62 must be aligned with respective ones of X and Y axes, as shown in FIGS. 34 and 35.

A steering sensitivity control 416 of the control system 410 of FIG. 38 includes a null offset device 418, a nonlinear device 420 with a nonlinearity adjustment 422, and cooperative function of the transducer sensitivity control 382A.

Whereas the steering sensitivity control 398 of FIG. 36 reduces the difference between the outputs of the wipers 164A and 164B of the potentiometers 28A and 28B, the steering sensitivity control 416 of FIG. 38 functions differently, reducing the output at the turn-signal wiper 364A as an inverse and linear or nonlinear function of the output of the speed-signal wiper 364B.

Further, the steering sensitivity control 416 of FIG. 38 reduces the output of the turn-signal potentiometer 362A by reducing the maximum and minimum voltages that the transducer sensitivity control 382A supplies to the turn-signal potentiometer 362A as voltages are fed back to the transducer sensitivity control 382A from the speed-signal wiper 364B, via the null offset device 418 and the nonlinear device 420 to a node 456 that serves as an auxiliary input node for the transducer sensitivity control 382A, but that also serves as an output node for the nonlinear device 420.

Detailed descriptions of the functioning of the null offset device 418, the nonlinear device 420, and how they work in conjunction with the transducer sensitivity control 382A, will be provided subsequently.

With regard to the steering mixer 412, this device provides outputs that are the sum of X and Y, and the difference between X and Y. Since this summing function can be achieved by following standard textbook teaching on the use of operational amplifiers, and since the detailed construction of the mixer 412 is not an inventive part of the present invention, neither a schematic nor a detailed explanation is needed.

Referring now to FIG. 39, a microprocessor control system 430 is provided for use with a pair of transducers, such as the potentiometers 28A and 28B of FIG. 2 or the mercury-wiped potentiometers 62 of FIG. 14. The potentiometers, 28A and 28B, or 62, may be aligned at 45 degrees to the X and Y axes, as shown in FIGS. 2, 4, and 5.

Optionally, the potentiometers 362A and 362B, or a pair of the mercury-wiped transducers 62 of FIG. 14, may be used with the transducers, 362A and 362B, or 62, aligned along respective ones of X and Y axes as shown in FIGS. 34 and 35. Other types of transducers may be used, and they may be aligned along, or at some angle to, the X and Y axes.

As shown and described above, and as will be described subsequently, all functions are formed with analog, as opposed to digital components and functions. However, in the embodiment of FIG. 39, the principles of the present invention are practiced by digital components, namely one or more microprocessors, although some individual components, or even circuits can be replaced by digital components.

It is important to understand how the microprocessor control system 430 of FIG. 39 relates to the analog systems discussed herein, and how the microprocessor control system 430 of FIG. 39 is characterized.

Practicing the present invention by a microprocessor 432 includes performing a step, or providing an algorithm that achieves one or more of the analog or logic functions taught herein.

For instance, transducer sensitivity control, signal limiting, null width adjusting, and turn-signal conditioning of right/left turn signals may be conditioned as a function of forward/reverse signals, and left/right signals may be conditioned as a function of forward/reverse signals, the output of either can be conditioned by the output of the other transducer, and the difference in outputs of the transducers can be used to condition the outputs of one or both.

With an X-Y input device, such as is shown in FIG. 34, preferably outputs of one transducer, 362A or 362B, is inversely and nonlinearly reduced as a function of the other transducer, 362B or 362A. Further, preferably, the forward/reverse signal is reduced as an inverse and nonlinear function of the right/left turn signal.

Practicing the present invention with the microprocessor 432 includes systems in which one transducer, such as the transducer 362B, produces a forward/reverse speed signal and the other transducer 362A, produces a right/left turn signal, as shown in FIG. 34, and systems in which both transducers, such as the transducers 28A and 28B, produce a forward/reverse speed signal, as shown in FIG. 2.

Further, the microprocessor 432 can reduce one or both of the signals (forward/reverse, right/left) as any function of the outputs of the transducers, 362A and 362B, without departing from the basic teachings of the present invention.

More particularly, in the system 410 of FIG. 38, the output of the potentiometer 362A is reduced as an inverse and nonlinear function of the output of the potentiometer 362B, whereas in the system of FIG. 36, the outputs of the potentiometers 28A and 28B are decreased as an inverse and nonlinear function of the difference between the outputs of the potentiometers 28A and 28B.

Further, with regard to FIG. 36, since the difference in outputs of the potentiometers 28A and 28B is a function of both outputs, it is correct to say that the control system 380 decreases the output of one potentiometer, 28A or 28B, as a function of the other potentiometer, 28B or 28A.

Figure 41:
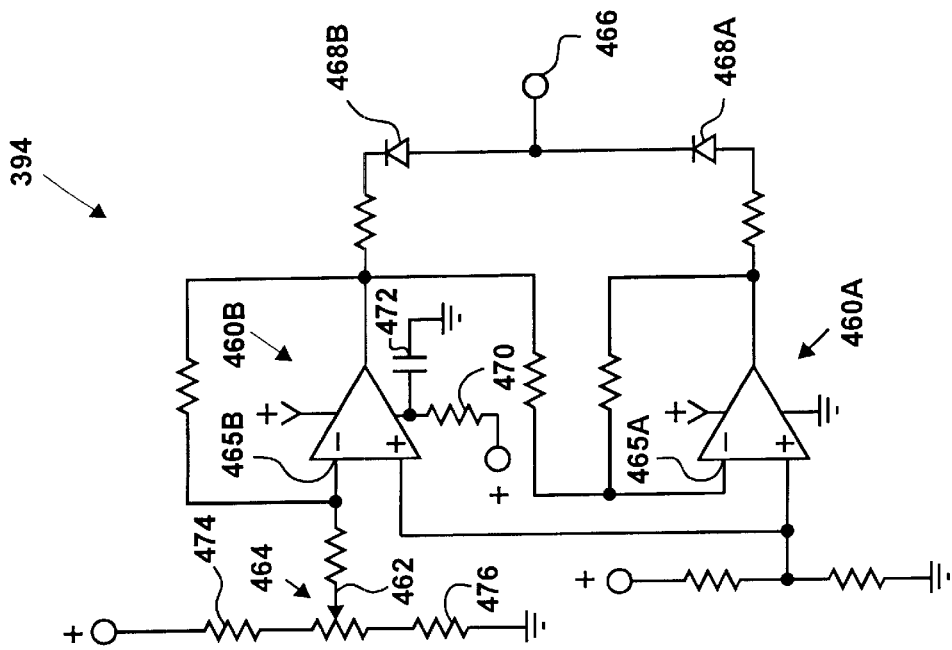
FIG. 41 is a schematic drawing of the signal limiting control of FIG. 38.
Figures 42, 43:
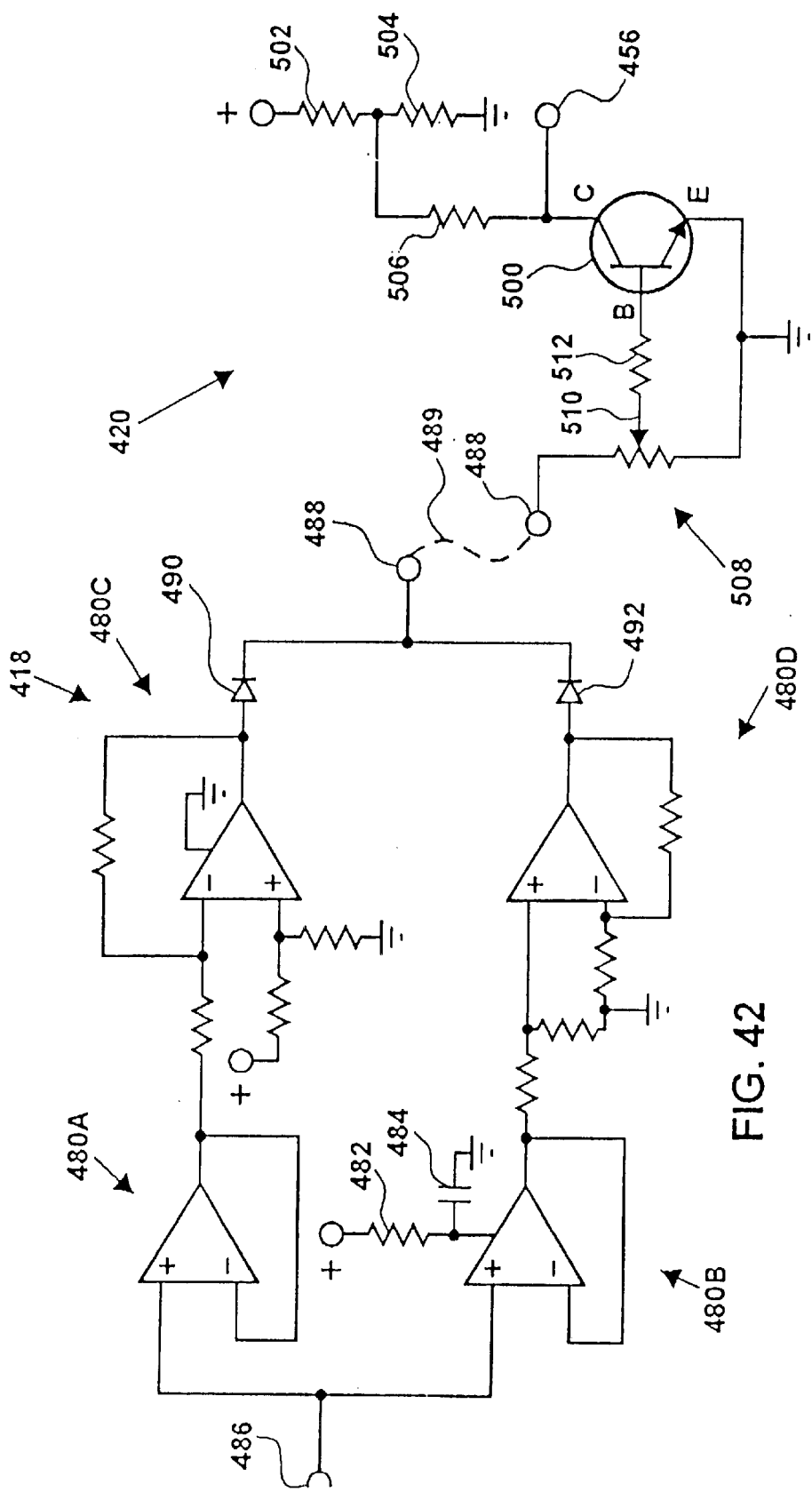
FIG. 42 is a schematic drawing of the null-offset control of FIG. 38, which cooperates with the nonlinear device of FIG. 43 and one transducer sensitivity control of FIG. 40, to provide inverse and nonlinear control of steering sensitivity.
FIG. 43 is a schematic drawing of the nonlinear device of FIG. 38.
Figure 44A:
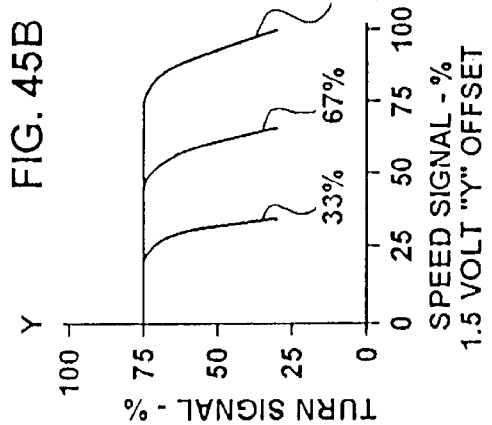
FIG. 44A is a graph showing increases above ground of the potentials that are applied to the turn-signal transducer vs. speed-signal transducer voltages when the transducer sensitivity control is set to provide maximum electrical potentials to the turn-signal transducer.
Figure 44B:
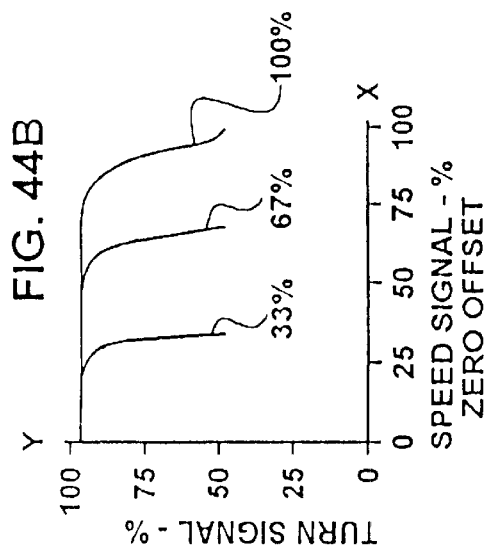
FIG. 44B is a graph showing percentages of the turn signals vs. percentages of speed signals when the transducer sensitivity control is set to provide maximum electrical potentials to the turn-signal transducer as in FIG. 44A.

Practicing of the present invention by the microprocessor 432 of FIG. 39, in addition to providing turn-signal conditioning, signal conditioning preferably includes one of the following: inverse and nonlinear proportioning of a turn signal as a function of a speed signal, as exemplified by the curves of FIG. 18 or 44B, selectible adjustment of the inverse and nonlinear proportioning, as symbolized by a steering sensitivity adjustment 434 which, in the analog embodiment of FIG. 38, is the potentiometer 508 of FIG. 43, a selectible linear sensitivity adjustment 436 which is the transducer sensitivity adjustment 384A of FIG. 38 and a potentiometer 448 of FIG. 40, and a signal limiting adjustment 438 that produces results similar to the signal limiting adjustment 396 of FIGS. 36 and 38 which is a potentiometer 464 of FIG. 41.

Since the microprocessor 432 can manipulate the output voltages of the transducers 62 in any manner prescribed, it is not necessary to selectively change the voltages applied to the transducers 62 to control transducer sensitivity. Therefore, the linear sensitivity adjustment 436 of FIG. 39 replaces the transducer sensitivity controls 382A and 382B of FIGS. 36 and 38, together with their sensitivity adjustments 384A and 384B.

Referring now to FIG. 40, the transducer sensitivity control 382A of FIGS. 36 and 38, and the transducer sensitivity control 382B of FIG. 38, which are shown as blocks in FIGS. 36 and 38, are shown in FIG. 40 in schematic form as the transducer sensitivity control 382A.

Referring to FIG. 40, the transducer sensitivity control 382A includes rail-to-rail operational amplifiers 440A and 440B which are part of a quad package of operational amplifiers. Power and ground connections for the quad package of operational amplifiers, that includes the operational amplifiers 440A and 440B, are shown in conjunction with the operational amplifier 440B. These connections include a resistor 442 and a capacitor 444. Preferably, the quad amplifier package is a rail-to-rail quad amplifier, part number LMC6484IN, manufactured by Motorola Semiconductor Products, Inc., Phoenix, Ariz.

Optionally the above-specified operational amplifiers may be used for any or all of the operational amplifiers shown in the schematic drawings included herein.

The operational amplifier 440A is configured as a noninverting buffer amplifier outputting at the output node 386A the equivalent of the voltage from a wiper 446 of the potentiometer 448. The potentiometer 448 provides the transducer sensitivity adjustments 384A and 384B of FIGS. 36 and 38. Resistors 450 and 452 are interposed between the potentiometer 448 and its connections to 12 volts and ground, thereby providing a suitable range of voltages to the positive input terminal 454 of the operational amplifier 440A, as adjusted by the potentiometer 448.

The output at the output node 386A is the lower voltage supply for the potentiometer 28A of FIG. 36 and the potentiometers 362A and 362B of FIG. 38, and for any other type of transducer, such as the mercury-wiped potentiometer 62 of FIGS. 13 and 14.

The operational amplifier 440B is configured as an inverting amplifier. The operational amplifier 440B outputs a voltage at the output node 386B that supplies the high side of potentiometers 28A and 28B of FIG. 36, and 362A and 362B of FIG. 38. The inverted output at the output node 386B is the inverse to the output of the operational amplifier 440A at the node 386A.

The range of voltage differences ranges on the high side, at the node 386B, from a maximum of 12 volts down to a minimum of 7 volts; and on the low side, at the node 386A, the voltage ranges from 0 volts up to 5 volts, so that the minimum is a 2 volt spread. However, whether the difference between the high side is 12 volts, 2 volts, or anywhere in between, the average remains 6 volts.

As previously mentioned, the potentiometer 448 provides a selectible control signal for input to the positive input terminal 454 of the operational amplifier 440A. The higher the voltage at the wiper 446, the smaller the angle per volt of change of an inclination transducer, such as the mercury-wiped potentiometer 62 of FIGS. 13 and 14. Conversely, the lower the voltage at the wiper 446, the greater the angle per volt of change.

Finally, the transducer sensitivity control 382A includes the node 456, an NPN bipolar junction transistor, or NPN transistor 458, and a resistor 459. The node 456 is the connection between the nonlinear device 420 of FIG. 38 and the transducer sensitivity control 382A.

As shown, the NPN transistor 458 is connected across the resistor 452 with the emitter E of the transistor 458 on the ground side and the collector C on the positive side. The node 456 is connected to the base B by the resistor 459. The use of the node 456 and functioning of the transistor 458 will be discussed subsequently.

However, as shown in FIG. 38, the node 456 is used in the transducer sensitivity control 382A that supplies voltages to the turn-signal transducer 362A. The node 456 is not used in the transducer sensitivity control 382B of FIG. 38 that supplies voltages to the speed-signal transducer 362B, nor is the node 456 used in the control system 380 of FIG. 36.

Referring now to FIG. 41, the signal limiting control 394 that is shown in FIGS. 36 and 38 as a block diagram, is shown in schematic detail in FIG. 41. An operational amplifier 460B is configured as an inverting amplifier, and a control signal from a wiper 462 of the potentiometer 464 is inputted to a negative input terminal 465B of the operational amplifier 460B.

Connections of an operational amplifier 460A and the operational amplifier 460B to ground and to a regulated supply voltage include a resistor 470 and a capacitor 472, and a suitable range of voltages for the negative input terminal 465B of the operational amplifier 460B is provided by resistors 474 and 476 that are interposed between the potentiometer 464 and connections to supply and to ground.

As the control voltage increases at the negative input terminal 465B of the operational amplifier 460B, the output voltage of the operational amplifier 460B selectively decreases from 12 volts to 5.4 volts. This output voltage of the operational amplifier 460B is connected to a signal limiting node, or signal limiting terminal, 466 via a diode 468B.

Thus, a control signal connected to the node 466 that is larger than 5.4 volts, plus the voltage drop of the diode 468B, will be reduced to 6.0 volts, assuming a 0.6 volt drop for the diode 468B.

The output voltage from the operational amplifier 460B is used also as an input signal to a negative input terminal 465A of an operational amplifier 460A. The operational amplifier 460A is also configured as an inverting amplifier. As the output voltage of the operational amplifier 460B decreases, pulling down a signal at the node 466 that is greater than 6 volts, the output of the operational amplifier 460A increases, pulling up a signal at the node 466 that is less than 6 volts.

As the control voltage at the negative input terminal 465B of the operational amplifier 460B increases, the output voltage of the operational amplifier 460A increases selectively from zero volts to 6.6 volts, pulling up a control signal at the node 466 to approximately 6 volts null. To pull a lower voltage up to 6 volts, it is necessary to pull up 0.6 volts above 6 volts to allow for the 0.6 volt drop across a diode 468A.

Therefore, even as the operational amplifier 460B and the diode 468B cooperate to limit maximum voltages selected by the wipers, 164A, 164B, 364A, and 364B, of FIGS. 36 and 38, the operational amplifier 460A and the diode 468A cooperate to limit the minimum voltages selected by the potentiometers, 28A, 28B, 362A, and 362B.

As shown in FIG. 36, the control system 380 includes two signal limiting controls 394, and the node 466 of each signal limiting control 394 is connected to a respective one of the wipers 164A or 164B of the potentiometers 28A and 28B. In like manner, two of the signal limiting controls 394 are used in the control system 410 of FIG. 38.

It follows that, whether the systems, 380 and 410, are designed to use voltages above null or voltages below null for forward speeds, the signal limiting controls 394 limit maximum speeds of the motors 14A and 14B in both forward and reverse directions.

Referring now to FIG. 42, the null offset device 418, which is shown as a block in the block diagram of FIG. 38, is shown in FIG. 42 as a schematic drawing.

The null offset device 418 includes operational amplifiers 480A, 480B, 480C, and 480D which preferably are purchased in a quad package. Connections of the operational amplifiers 480A, 480B, 480C, and 480D to a regulated power supply are made by a resistor 482 and a capacitor 484.

Referring now to FIGS. 38 and 42, input to the null offset device 418 is via an input node, or input terminal, 486, and output from the null offset device 418 is via a node 488. In addition to serving as an output node for the null offset device 418, the node 488 serves as an input node for the nonlinear device 420. That is, as indicated by a phantom line 489, the node 488 is the connection between the null offset device 418 and the nonlinear device 420.

Continuing to refer to FIG. 42, the operational amplifiers 480A and 480B function as buffer amplifiers to prevent distortion of signals received through the node 486 from the output of the speed-signal wiper 364B of the potentiometer 362B of FIG. 38.

The operational amplifier 480C is configured as an inverting amplifier, and the operational amplifier 480D is configured as a noninverting amplifier. The output voltage of the operational amplifier 480C will increase when a voltage supplied to the node 486 by the wiper 364B of the speed-signal potentiometer 362B of FIG. 38 decreases below the average voltage, or null voltage.

In like manner, the voltage output of the operational amplifier 480D will increase anytime the voltage at the node 486, and at the wiper 364B of the potentiometer 362B, increases above the null voltage.

That is, the null offset device 418 of FIGS. 38 and 42 provides a voltage at the node 488 that increases whenever the voltage of the wiper 364B moves away from a midpoint or null position. Thus, the potentiometer 62 of FIGS. 4, 13, 14, and 35, when oriented to a null tilt angle, will produce a null or zero output. And the null offset voltage produced by the null offset device 418 will also be zero when the potentiometer 62 is at the null tilt angle.

Diodes 490 and 492 allow the operational amplifiers 480C and 480D to operate independently as they pertain to their outputs to the node 488.

Referring now to FIG. 43, the nonlinear device 420 includes an NPN bipolar junction transistor, or NPN transistor 500. The NPN transistors, 458 of FIG. 40 and 500 of FIG. 43, preferably are part number 2N4401 manufactured by National Semiconductor of Santa Clara, Calif.

Resistors 502 and 504 are tailored to provide a suitable collector-emitter bias for the NPN transistor 500 via a resistor 506. A potentiometer 508, together with its wiper 510, operates as a voltage divider. Thus, the potentiometer 508 provides means for delivering selective percentages of the offset voltages, as received at the node 488 from the null offset device 418 of FIG. 42, to a base B of the NPN transistor 500 through a resistor 512.

When the voltage of base B of the NPN transistor 500 is zero, the NPN transistor 500 is open, or at cutoff, so that the voltage delivered to the node 456 is high, as determined by the resistors 502 and 504. As voltage in the node 456 increases, voltage supplied to the base B increases as a function of the setting of the wiper 510, and current flow from the collector C to the emitter E increases. When the voltage applied to the base B is sufficient, the NPN transistor 500 saturates with current flow maximized between the collector C and the emitter E, as limited by the resistor 506, and the node 456 is effectively connected to ground.

Referring again to FIG. 40, the NPN transistor 458 is open when the base B is low. However, the voltage delivered to the node 456 of FIG. 43 is high when the offset voltage delivered to the node 488 is low and the NPN transistor 500 is open.

Therefore, when the speed-signal potentiometer 362B of FIG. 38 is at null, a zero offset voltage is delivered to the node 488 of the nonlinear device 420 of FIG. 43, the NPN transistor 500 is open, and a voltage, as determined by the resistors 502 and 504, is delivered to the node 456 of FIGS. 43 and 40. This voltage in the node 456 of FIG. 40 causes the NPN transistor 458 to saturate, thereby shorting the resistor 452. Thus, at this time, the potentiometer 448 is effectively connected to ground.

Referring again to FIG. 38, as the wiper 364B of the speed-signal transducer 362B is moved away from null, the null offset device 418 produces a voltage that is the absolute difference between the voltage selected by the wiper 364B and the null voltage. This offset voltage is delivered to the node 488 of FIGS. 42 and 43. Then some percentage of this offset voltage is delivered to the base B of the NPN transistor 500, as determined by selective positioning of the wiper 510, causing the NPN transistor 500 to conduct. And, if the voltage delivered to the base B of the NPN transistor 500 is sufficient, the NPN transistor 500 will saturate.

When the NPN transistor 500 of FIG. 43 saturates, the voltage in the node 456 approaches zero, the voltage on the base B of the NPN transistor 458 of FIG. 40 approaches zero, and the NPN transistor 458 opens. With the opening of the NPN transistor 458, the resistor 452 is back in series with the potentiometer 448, thereby raising the voltage on both the wiper 446 and the positive input terminal 454 of the operational amplifier 440A.

As previously described, an increase in one volt at the positive input terminal 454 raises the voltage at the node 386A of FIGS. 38 and 40 by one volt. In addition, this increase of one volt at the positive input terminal 454 lowers the voltage at the node 386B of FIGS. 38 and 40 by one volt, thereby reducing sensitivity of the turn-signal potentiometer 362A.

Therefore, the sensitivity of the turn-signal potentiometer 362A is reduced as a function of selective positioning of the wiper 364B of the speed-signal potentiometer 362B. The result is inverse and nonlinear reduction of steering sensitivity as a function of speed.

Referring to FIG. 38, inverse and nonlinear control of steering sensitivity of the control system 410 is achieved as a function of the speed signal. This inverse and nonlinear control of steering sensitivity is achieved as follows: using a speed-signal voltage from the wiper 364B of the speed-signal potentiometer 362B in the null offset device 418 to provide a null offset voltage, outputting the null offset voltage to the nonlinear device 420 via the node 488, and nonlinearly processing the offset voltage in both the nonlinear device 420 and the NPN transistor 458 of FIG. 40 of the transducer sensitivity control 382A, thereby reducing sensitivity of the turn-signal potentiometer 362A as an inverse nonlinear function of the offset voltage.

More particularly, referring to FIGS. 38, 40, 42, and 43, inverse linear and nonlinear control of steering is achieved as described in the following paragraphs.

Maximum and minimum voltages applied to the turn-signal potentiometer 362A of FIG. 38 are determined by selective positioning of the transducer sensitivity adjustment 384A which is the potentiometer 448 of FIG. 40, thereby selectively determining sensitivity of the turn-signal potentiometer 362A or any other transducer used to control steering.

Selective positioning of the wiper 364A of the turn-signal potentiometer 362A of FIG. 38 provides a turn-signal voltage. Turn-signal voltages above null represent a turn in one direction, and voltages below null represent a turn in the other direction, with the magnitude of the turn signals increasing as the voltage of the wiper 364A moves farther from the null voltage.

These turn-signal voltages of the wiper 364A are limited to a predetermined maximum, and/or raised to a predetermined minimum by the one of the signal limiting controls 394 that is connected to the wiper 364A. And speed-signal voltages from the wiper 364B are limited in like manner.

The speed-signal voltages of the wiper 364B, as limited by the signal limiting control 394 connected thereto, are delivered to the node 486 of the null offset device 418. And the null offset device 418 delivers a voltage to the node 488 that equals the absolute difference, as opposed to an algebraic difference, between the null voltage of the wiper 364B and the instantaneous positioning of the wiper 364B.

This absolute difference, or: offset voltage, is delivered from the node 488 of the null offset device 418 to the same-numbered node of the nonlinear device 420. The NPN transistors 500 of FIG. 43 and 458 of FIG. 40 then cooperate to produce a nonlinear output, with a low in the node 488 of the null offset device 418 resulting in saturation of the NPN transistor 458.

Thus, with the potentiometer 362B of FIG. 38 at null, and with a zero offset voltage in the node 488, the resistor 452 of FIG. 40 is shorted, and voltage applied to the positive input terminal 454 of the operational amplifier 440A is as determined by the wiper 446 of the potentiometer 448. But, when the wiper 364B is moved away from null, the NPN transducer 458 is open, and the resistor 452 is placed in series with the potentiometer 448, thereby raising the voltage applied to the positive input terminal 454 of the operational amplifier 440A, and resulting in voltages supplied to the turn-signal potentiometer 362A being reduced.

As can be understood from the preceding description, nonlinear processing of the null offset voltage is accomplished in both the nonlinear device 420 of FIG. 43 and in the NPN transistor 458 of FIG. 40.

This nonlinear processing of the offset voltage results in nonlinearly decreasing the voltages being applied to the turn-signal potentiometer 362A, thereby nonlinearly decreasing sensitivity of the turn-signal potentiometer 362A. Therefore, steering sensitivity of the turn-signal potentiometer 362A is changed as an inverse and nonlinear function of selective positioning of the wiper 364B of the speed-signal potentiometer 362B and the null offset voltage produced therefrom.

Referring now to FIG. 44A, the 33 percent, 67 percent, and 100 percent curves show increases in voltages applied to the positive input terminal 454 of FIG. 40 as a function of volts produced by the speed-signal potentiometer 362B of FIG. 38 for three arbitrarily selected positions of the nonlinearity adjustment 422 of FIG. 38. The nonlinearity adjustment 422 of FIG. 38 is the potentiometer 508 of FIG. 43.

As discussed previously, a one volt increase at the positive input terminal 454 increases the potential at the node 386A, as applied to the turn-signal potentiometer 362B, by one volt, and at the same time, reduces the potential at the node 386B, as also applied to the turn-signal potentiometer 362B, by one volt, thereby reducing the sensitivity of the turn-signal potentiometer 362B.

Referring now to FIG. 44B, with the sensitivity of the turn-signal potentiometer 362A reduced in accordance with changes in voltages applied to the turn-signal potentiometer 362A as described above, reduction in steering sensitivity is shown as percentages of the turn signal that remain at various percentages of the maximum speed signal. Again, the 33 percent, 67 percent, and 100 percent curves show how the steering sensitivity can be tailored to the user by adjusting the nonlinearity adjustment 422 of FIG. 38, which is the potentiometer 508 of FIG. 43.

Figure 45A:
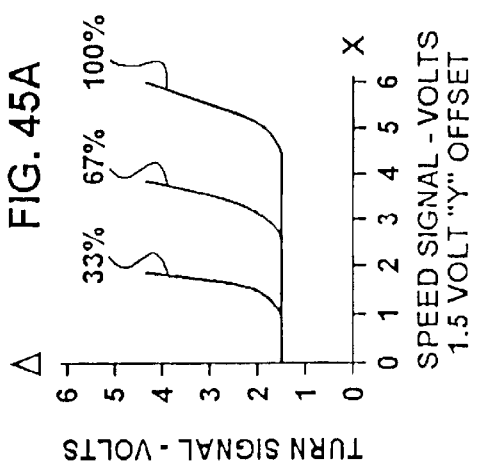
FIG. 45A is a graph showing increases above ground of the potentials that are applied to the turn-signal transducer vs. speed-signal transducer voltages when the transducer sensitivity control is set to raise the lower electrical potential above ground and reduce the higher electrical potential.
Figure 45B:
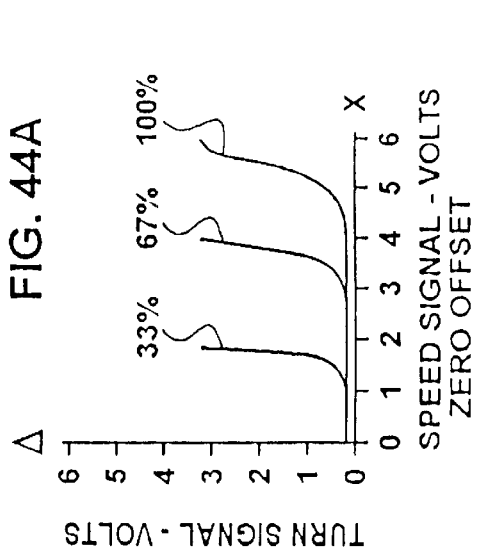
FIG. 45B is a graph showing percentages of the turn signals vs. percentages of the speed signals when the transducer sensitivity control is set to raise the lower electrical potential above ground and reduce the higher electrical potential as in FIG. 45A.

Referring now to FIGS. 45A and 45B, these curves are similar to FIGS. 44A and 44B, except that the transducer sensitivity control 382A has been arbitrarily set, by selective positioning of the sensitivity adjustment 384A, to increase the voltage at the node 386A to 1.5 volts above ground, and to simultaneously decrease the voltage at the node 386B to 1.5 volts below the 12 volt source.

Referring now to FIG. 37, attachment of the steering sensitivity control 398 is by nodes 525 of FIGS. 36 and 37. Operation of the device of FIG. 37 is as shown and described in conjunction with FIG. 17. Minor differences in construction include: the MOSFETs 168 being connected in series with their drain terminals D, rather than their source terminals S being connected together; interposing resistors 526 and 528 into the connections of the potentiometer 170 to source and ground, thereby providing better adjustment of gate voltages; and protecting the gate of the MOSFETs 168 with a Zener diode 530.

Referring now to FIG. 46, a null-width generator 540 includes: operational amplifiers, U2A, U2B, and U2D, a capacitor C4, a resister R6, and a potentiometer RV2.

The operational amplifiers U2A and U2D serve as buffers, or followers, and the operational amplifier U2A receives a voltage developed by one of the transducers, 362A or 362B of FIG. 34, that may have been conditioned previously as described herein. That is, either a propulsion-signal signal voltage or a turn-signal voltage, that may have been conditioned previously, is received in a conductor 542.

More particularly, the operational amplifier U2B is provided with the null voltage N, which may be one-half of the voltage applied across one of the transducers 362A or 362B, and the null voltage N is applied to pin by the conductor 542.

Referring now to FIGS. 46 and 46A, an output voltage 546, produced by one of the transducers 362A or 362B, is shown in FIG. 46A. One of the transducers 362A or 362B varies the output voltage 546 both above and below the null voltage N, which is shown by a like-numbered horizontal line.

Output voltages 546 that are greater than the null voltage N are often used for forward speeds, and output voltages 546 that are lower than the null voltage N are often used for reverse speeds, but sometimes output voltages 546 that decrease below the null voltage N are used for forward speeds. However, for purposes of discussion, assume that output voltages 546 that are greater than the null voltage N produce forward speeds. Output voltages above and below the null voltage N are also used as right/left turn signals.

The purpose of the null-width generator 540 is to provide a voltage deadband, or null width, 548 that includes voltages that are both greater than, and less than, the null voltage N. Thus, the transducers, 362A or 362B may be inputted within a transducer-position deadband 550 without effecting a change in a velocity of the wheel, 12A or 12B, of the wheelchair 10 of FIG. 1, thereby facilitating easy and precise control of the steering for the wheelchair 10.

The null-width generator 540 produces null widths 548 that can be selectively varied between 0.1 and 0.7 volts on each side of the null voltage N.

The null voltage 546 is selectively adjusted by the potentiometer RV2. That is, adjustment of the potentiometer RV2 provides selectable feedback from the pin 7 to the pin 6 of the operational amplifier U2B. Thus, a selectable null voltage is subtracted from a control signal that, preferably, has previously been limited by some device, such as the signal limiting control 394 of FIG. 38, and delivered to the operational amplifier U2D. The operational amplifier U2D, which is configured as a follower, delivers the remaining signal voltage to pin 14 and a conductor 560 of FIG. 46. Preferably, the potentiometer RV2 has a resistance of 100K ohms.

While the null-width generator 540 of FIG. 46 provides a valuable function, this particular embodiment has the disadvantage of reducing both maximum and minimum signal voltages, thereby reducing both maximum forward and maximum reverse speeds or turn signals of a controllable device, such as the power wheelchair 10 of FIG. 1, because the null width 548 is subtracted from the maximum limited signal voltage and added to the minimum limited signal voltage.

Referring now to FIG. 47, a null-width generator 564 not only obviates the aforementioned disadvantage of the null-width generator 540, but that also includes a significant advantage that will be described subsequently.

The null-width generator 564 includes comparators U3A and U3B; a high input-impedance operational amplifier U1A that serves as a buffer or follower, that has a high input-impedance, and that is configured as a follower; a n-channel MOSFET Q3; a normally-open mechanical relay K1 having a relay coil 566 and a pair of normally-open contacts 568; resistors R7, R8, R9, R10, R11, and R12, a potentiometer RV3, and capacitors C5, C6, and C7.

The resistors R8, R9, and R10, and the potentiometer RV3 cooperate to provide adjustable high and low limits on pins 5 and 6 of the comparators U3A and U3B. The signal voltage that has been limited, perhaps by the signal limiting control 394 of FIG. 38, that is in the conductor 542, is applied to pins 4 and 7. The resistor R11 serves as a pull-up resistor for the outputs at pins 1 and 2.

The capacitors C6 and C7 cooperate with the resistor R12 to provide a RC circuit 570. As shown, the capacitors C6 and C7 are positioned back-to-back to provide a non-polarized capacitor. Optionally, a single non-polarized capacitor may be used.

By selective adjustment of the potentiometer RV3, upper and lower voltage limits are selectively adjusted to be in the order of 0.1 to 0.7 volts above and below the null voltage N. When the limited signal voltage in the conductor 542 is either above or below a respective one of the voltage limits, one of the comparators, U3A or U3B, will output a ground. Since the comparators are of the open collector type, whenever one of the comparators, U3A or U3B, outputs a ground, its ground will pull down the high gate voltage that has been provided by the resistor R11.

However, when the signal voltage in the conductor 542 is within the upper and lower voltage limits, the outputs of both comparators, U3A and U3B, are high at pins 1 and 2, the resistor R11 applies a high gate voltage to the MOSFET Q3, and the MOSFET Q3, which is an n-channel FET, conducts, thereby energizing the relay coil 566, thereby closing normally-open contacts 568, and thereby forcing a voltage in a conductor 572 to increase or decrease to the null width 548.

Further, the signal voltage in the conductor 572 will be reproduced in a conductor 574, since the operational amplifier U1A is configured as a follower.

Continuing to refer to FIG. 47, with the contacts 568 of the relay K1 closed and the conductor 572 at the null voltage N, a voltage differential exists across the resistor R12. That is, the proportioned signal voltage in the conductor 542 will be either higher or lower than the null voltage N in the conductor 572, and that the capacitors C6 and C7 charge in response to this voltage differential.

While the contacts 568 are closed, the capacitors, C6 and C7, will hold the voltage differential that exists between the conductors 542 and 572.

However, as soon as actuation of the transducer 362A or 362B of FIG. 34 provides a signal voltage, that is outside one of the limits, upper or lower, of one of the comparators, U3A or U3B, the gate G of the MOSFET Q3 goes low, the relay K1 is unlatched, and the null voltage N is isolated from the conductor 572.

Since the operational amplifier U1A is voltage operated, rather than current operated, there is no current flow from the capacitors C6 and C7 to pin 5 of the operational amplifier U1A. Instead, the capacitors C6 and C7 are discharged by the resistor R12, that is at a rate determined by the voltage differential, the capacitance of the capacitors, C6 and C7, and the resistance of the resistor R12.

If the RC circuit 570 were not included, the voltage differential between the limited signal voltage in the conductor 542, and the null voltage N, in the conductor 572, would: be increased by the null voltage N almost instantaneously, and the power wheelchair 10, or other controllable device, would start abruptly.

But, with the RC circuit 570 included, discharge of the capacitors C6 and C7, and insertion of the null voltage N into conductor 572, changing of the control voltage is at a controlled rate of change.

It becomes evident that the capacitors, C6 and C7, the resistor R12, and the operational amplifier, U1A cooperate to provide a rateof-change controller 576 that may be included as a part of the null-width generator 564.

While only the null-width generator 564, together with its rate-of-change controller 576, has been described, it should be understood that, two null-width generators 564 would be used in a system that includes two transducers, 362A and 362B of FIG. 34, one for the Y, or forward/reverse signal, and one for the X, or right/left turn signal.

Further, for some applications it is critical that the rate of change for the X, or right/left turn signal must be lower than the rate of change for the Y, or forward/reverse signal, to prevent fish tailing of the controllable device, such as the power wheelchair 10 of FIG. 1. For the forward/reverse signal, preferably the capacitors C6 and C7 are 3.3 µfd, and the resistor R12 is 249K ohms, but for the turn signal, the resistor R12 is changed to 1.5 megohms.

Figure 48:
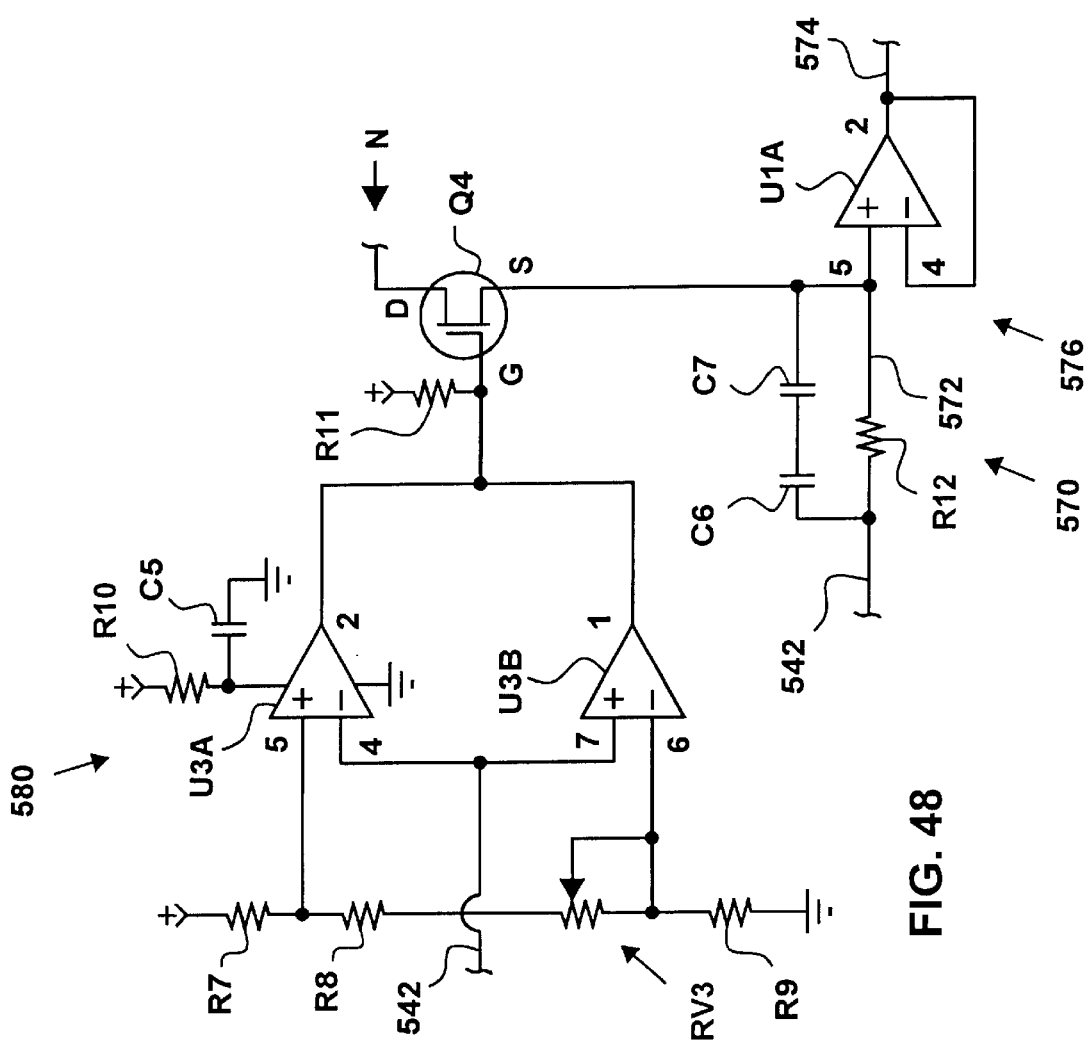
FIG. 48 is a variation of the null-width generator of FIG. 47 in which the mechanical relay is replaced by a solid-state bilateral switch.

Referring now to FIG. 48, a null-width generator 580 includes components and conductors that are named and like-numbered with those for the null-width generator 564 of FIG. 47, except as follows.

A gate G of a bilateral switch Q4 is connected to pins 1 and 2 of the comparators, U3B and U3A and to the resistor R11, that serves as a pull-up resistor. When the gate G is high, the switch closes, connecting the null voltage N with the signal voltage in the conductor 572. Operation is as described for the null-width generator 564 of FIG. 47.

Figure 49:
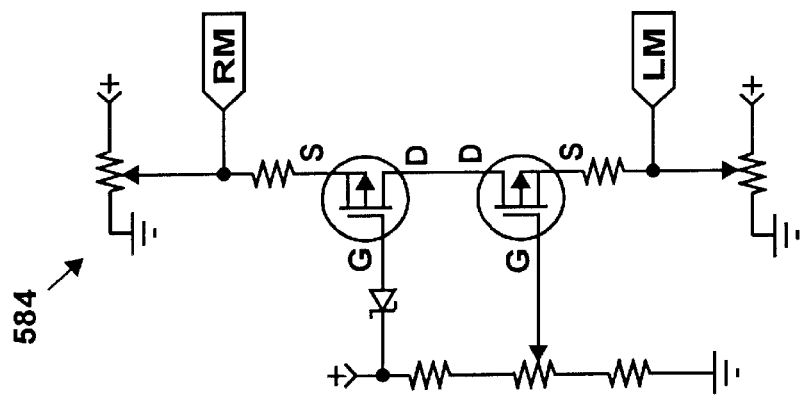
FIG. 49 is a prior-art schematic of a turn signal conditioner that is usable when transducers are disposed with respect to X and Y axes as shown in FIG. 2.

Referring now to FIG. 49, a turn signal conditioner 584 is one of several turn signal conditioners that are taught by Lautzenhiser in U.S. Pat. No. 5,635,807 for use with input devices of the type shown in FIG. 2.

The turn signal conditioner 584 is connected to two null-width generators, such as the null-width generators 540 of FIG. 46, 564 of FIG. 47, or 580 of FIG. 48, one for the forward/reverse signal, and one for the left-right turn signal.

Figure 50:
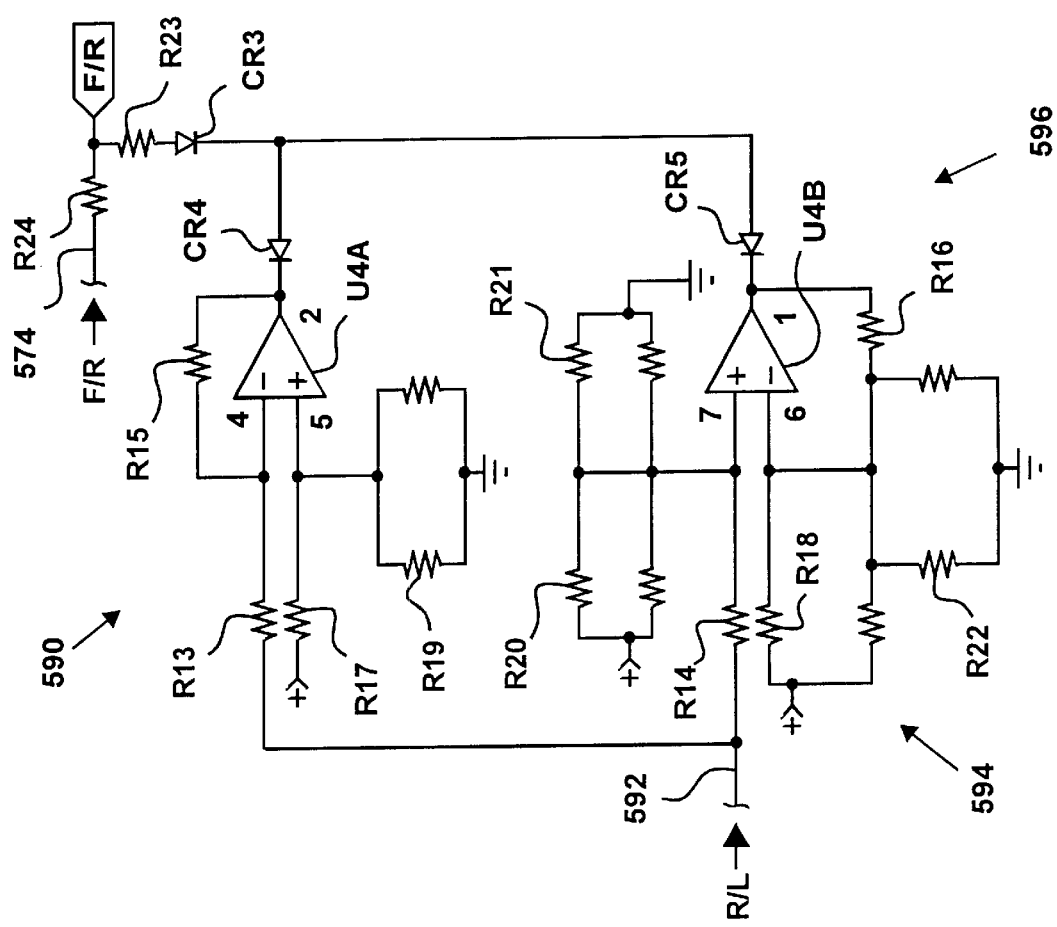
FIG. 50 is a schematic drawing of a turn signal conditioner, that is usable with transducers that are disposed as shown in FIG. 34, and that reduces forward-propulsion signals as a function of left/right turn signals.

Referring now to FIG. 50, a steering sensitivity control or turn signal conditioner 590 is one of two that are taught herein for use with transducers, 362A and 362B, disposed as shown in FIG. 34. The turn signal conditioner 590 is connected to two null-width generators, one for the forward/reverse speed signals, and one for the left/right turn signals, in like manner as described for the turn signal conditioner 584 of FIG. 49.

That is, the turn signal conditioner 590 is connected to either the conductor 560 of FIG. 46, the conductor 574 of FIG. 47, or the conductor 574 of FIG. 48.

The turn signal conditioner 590 includes paralleled resistors for the purpose of achieving precise resistances. Since each pair functions as a single resister, each paralleled pair will be named and numbered as if a single resistor were used.

The turn signal conditioner 590 includes operational amplifiers, U4A and U4B, resistors R13–R24, and diodes CR3, CR4, and CR5. The resistors R13 and R14 are input resistors, and the resistors R15 and R16 are feedback resistors, and the remaining resistors, except for the resistor R23, are used to set, or divide, voltages.

As shown in FIG. 50, the operational amplifier U4A is configured as an inverting amplifier, the operational amplifier U4B is configured as a noninverting amplifier, and pins 1 and 2 are set high.

As a R/L (right/left) turn signal voltage is applied to the turn signal conditioner 590 by a conductor 592, one of the operational amplifiers, U4A or U4B, goes low, pulling the F/R (forward/reverse) signal voltage in the conductor 574 down through the resistor R23, the diode CR3, and one of the other diodes, CR4 or CR5.

The resistor R23 and/or the diode CR3 may be omitted, in accordance with design choices.

In operation, the F/R (forward/reverse) signal is pulled down as a function of the R/L turn signal by the turn signal conditioner 590, thereby cooperating with a pair of the null-width generators 540, 564, or 580 of FIG. 46, 47, or 48 to prevent fish-tailing of power wheelchairs.

Figure 51:
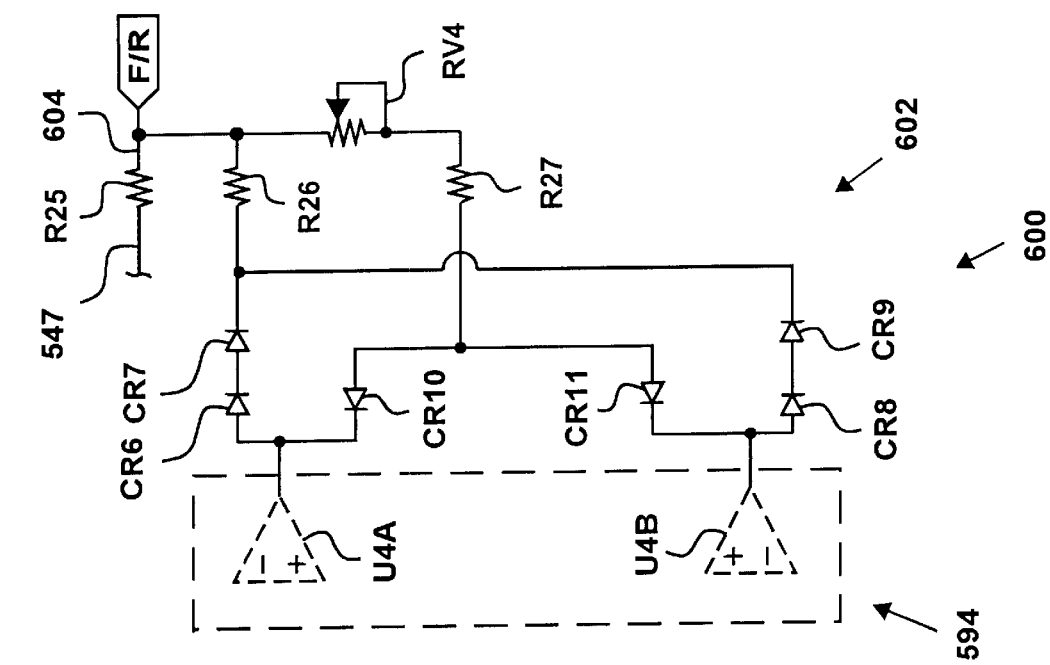
FIG. 51 is a schematic drawing of a turn signal conditioner, that is usable transducers that are disposed as shown in FIG. 34, and that reduces both forward/reverse signals as a function of right/left turn signals.

Referring now to FIGS. 50 and 51, the turn signal conditioner 590 of FIG. 50 includes a comparing circuit 594 and a conditioning circuit 596. A steering sensitivity control or turn signal conditioner 600 of FIG. 51 also includes the comparing circuit 594. However, the comparing circuit 594 of FIG. 51 is illustrated symbolically by a box in phantom lines that contains the operational amplifiers, U4A and U4B, also shown in phantom lines.

Referring now to FIG. 51, the turn signal conditioner 600, rather than including the conditioning circuit 596 of FIG. 50, includes a conditioning circuit 602. The conditioning circuit 602, includes six diodes CR6, CR7, CR8, CR9, CR10, and CR11, three resistors, R25, R26, and R27, and a potentiometer RV4.

If the turn signal conditioner 600 is used with a system in which the null voltage is 2.5 volts, and if the maximum signal voltage is 0.9 volts, then the maximum voltage for a forward signal is 3.4 volts, and the minimum voltage for a reverse signal is 1.6 volts.

The operational amplifiers U4A and U4B are configured to provide 2.8 volts on pins 1 and 2 when there is no R/L turn signal. That is, the R/L turn signal voltage, as applied to the conductor 562, is 2.5 volts.

When the maximum F/R signal voltage is 3.4 volts, with a 0.6 voltage drop across the diodes CR10 and CR11, the voltage applied to the pins 1 and 2 is 2.8 volts, which is the same voltage that the pins 1 and 2 are producing from the operational amplifiers U4A and U4B, so the turn signal conditioner 600 is not conditioning the F/R signal voltage.

However, if the R/L turn signal voltage in the conductor 592 of FIG. 50 increases for a right turn, since the operational amplifier U4A is an inverting amplifier, the pin 2 will decrease pulling the F/R signal voltage down through the resistor R25, the potentiometer RV4, the resistor R27, and the diode CR10. Conversely, if the R/L signal voltage in the conductor 592 decreases for a left turn, the output of the operational amplifier U4B will decrease, pulling the F/R signal voltage down. RV4 selectively adjusts the forward speed signal thereby selectively reducing the forward speed as a function of the right/left turn signals.

Operation described thus far for the turn signal conditioners, 590 and 600, of FIGS. 50 and 51, are essentially the same. That is they condition forward-speed voltages as a function of R/L turn signals. The turn signal conditioner 600 of FIG. 51 adds conditioning of the reverse speeds as a function of R/L turn signals.

As mentioned above, a minimum signal voltage of 1.6 volts produces a maximum reverse speed. With the pins 1 and 2 set at 2.8 volts, and with series-connected diodes CR6 and CR7 producing a maximum voltage drop of 1.2 volts, or with series-connected diodes CR8 and CR9 producing a voltage drop of 1.2 volts, the voltage delivered from pins 1 and 2, through the respective pair of diodes, CR6 and CR7, or CR8 and CR9, to a F/R conductor 604 will be 1.6 volts.

Thus, when there is no R/L turn signal, that is when the R/L turn signal voltage in the conductor 592 of FIG. 50 is 2.5 volts, the turn signal conditioner 600 of FIG. 51 will have no effect on the reverse speed.

However, assuming that the R/L turn signal increases, the noninverting operational amplifier U4B will produce an increased voltage on pin 1, and this increase above the set point of 2.8 volts, although reduced by flowing through the diodes CR8 and CR9, will cause an increase in voltage in the F/R conductor 604, thereby slowing reverse speeds as a function of R/L turn signals.

Referring again to FIGS. 50 and 51, while the use of diodes, as voltage dropping devices, has been taught herein, it should be understood that this is only one of various types of solid-state devices that could be used to provide voltage drops in place of the diodes. For instance, it is well known that other solid state devices, such as transistors and FETS also provide voltage drops.

The apparatus of the present invention includes means for electrically changing proportionality of output versus input of transducers without changing zero-speed inputs, means for electrically changing proportionality of output versus tilt angles of transducers without changing the zero-speed tilt-angles, means for decreasing the higher potential and increasing the lower potential applied to a transducer by equal amounts, means for producing an adjustable null width, means for shutting down first and second actuators whenever either of two analog outputs goes beyond an allowable output, and means for variably limiting control signals to magnitudes that variably limit speeds of the actuators up to allowable maximum speeds without limiting resistive excursions of the transducers.

The apparatus of the present invention includes means for decreasing steering sensitivity of the conveyance 10 as an inverse and nonlinear function of differences in X and Y outputs from two transducers, 28A, 28B, 62, 150A, and 150B, and means for automatically decreasing forward and/or reverse speed of the conveyance 10 as an inverse and nonlinear function of the differences. Alternately, the present invention includes means for decreasing one transducer output as an inverse and linear or nonlinear function of another transducer output, preferably decreasing forward/reverse speed signals as a function of right/left turn signals.

The importance of subcomponents should be understood. For instance, a useful subcombination includes: the transducer sensitivity control 202 of FIG. 28 or the transducer sensitivity control 382A of FIG. 40, and any suitable transducer, thereby providing a transducer with selectible sensitivity.

Another useful subcombination includes an X-Y input device of any design, and the steering sensitivity control or turn signal conditioner 156, 180, 398, 590 or 600 with or without the transducer sensitivity control 202 or 382A, and with or without the null width generator, 540, 564, or 580.

While the node 456 of the transducer sensitivity control 382A has been described in conjunction with achieving inverse linear or inverse nonlinear control of steering sensitivity, it should be apparent that other signals, either highs or lows, could be inserted into the node 456 to obtain special functions.

Further, since as described above, changes in the sensitivity of the transducer sensitivity control 382A has been achieved by interjecting a signal voltage into the node 456, it becomes apparent that sensitivity of the transducer sensitivity control 382A can be changed by interposing an auxiliary signal, either a high or a low, between the source and the wiper 446, or between the wiper 446 and ground.

Finally, the use of body-component-attached X-Y input devices is made practical by the transducer sensitivity controls, the null-width adjusters, and the steering sensitivity controls. As shown and described herein, the MOSFETS, 168, 182, and 318, and the bipolar junction transistors, 458 and 500, have been used in, or as, a nonlinear device. It now becomes apparent that various analog components, digital components, and or, a microprocessor, can be used to practice the invention presented herein.

While specific apparatus and method have been disclosed in the preceding description, it should be understood that these specifics have been given for the purpose of disclosing the: principles of the present invention and that many variations thereof will become apparent to those who are versed in the art. Therefore, the scope of the present invention is to be determined by the appended claims.

What is claimed is:

1. A method for controlling rotational speeds of first and second motors comprises:
   a) selectively inputting X and Y transducers;
   b) producing X and Y electrical outputs separately proportional to said selective inputting step;
   c) proportioning one of said electrical outputs as an inverse function of an other of said electrical outputs; and
   d) rotating one of said electrical motors as a function of said proportioning step.

2. A method as claimed in claim 1 in which said proportioning step comprises selectively adjusting.

3. A method as claimed in claim 1 in which said proportioning step comprises nonlinear proportioning.

4. A method as claimed in claim 1 in which said proportioning step comprises selectively proportioning.

5. A method as claimed in claim 1 in which said selective positioning step comprises body-member tilting.

6. A method as claimed in claim 1 in which said proportioning step comprises reducing said one electrical output.

7. A method as claimed in claim 1 in which said proportioning step comprises increasing said one electrical output.

8. A method as claimed in claim 1 in which:
   a) said method further comprises developing a null voltage; and
   b) said proportioning step comprises pulling said one electrical output toward said null voltage.

9. A method as claimed in claim 1 in which:
   a) said rotating step comprises rotating said one electric motor in a forward and reverse directions; and
   b) said proportioning step comprises pulling said one electrical output toward a null voltage when said one electrical motor is being rotated in said forward direction.

10. A method as claimed in claim 1 in which:
    a) said rotating step comprises rotating said one electric motor in a forward and reverse directions; and
    said proportioning step comprises pulling said one electrical output toward a null voltage when said one electrical motor is being rotated in either of said directions.

11. A method as claimed in claim 1 in which said method further comprises:
    a) producing a null width; and
    b) obviating said rotating step for a respective one of said electric motors when said proportioned electrical output is within said null width.

12. A method as claimed in claim 1 in which said method further comprises:
   a) producing a null width;
   b) obviating said rotating step for a respective one of said electric motors when said proportioned electrical output is within said null width; and
   c) selectively adjusting said null width.

13. A method as claimed in claim 1 in which:
   a) said rotating step comprises rotating said one electric motor in one direction when said proportioned electrical output is greater than a null voltage, and rotating said one electric motor in an opposite direction when said proportioned output is less than a null voltage; and
   b) providing a null width, that includes said null voltage, in which said proportioned output does not rotate said one electric motor.

14. A method as claimed in claim 1 in which:
   a) said rotating step comprises rotating said one electric motor in one direction when said proportioned electrical output is greater than a null voltage, and rotating said one electric motor in a opposite direction when said proportioned output is less than a null voltage;
   b) providing a null width, that includes said null voltage, wherein said proportioned output does not rotate said one electric motor; and
   c) selectively adjusting said null width.

15. A method as claimed in claim 1 in which said proportioning step comprises microprocessing.

16. A method as claimed in claim 2 in which said proportioning step comprises analog proportioning.

17. A method as claimed in claim 9 in which said proportioning step comprises microprocessing.

18. A method as claimed in claim 9 in which said proportioning step comprises analog proportioning.

19. A method as claimed in claim 10 in which said proportioning step comprises analog proportioning.

20. A method as claimed in claim 10 in which said proportioning step comprises microprocessing.

21. A method as claimed in claim 13 in which said providing step comprises comparing voltages.

22. A method as claimed in claim 13 in which said providing step comprises microprocessing.

23. A method for controlling both speeds and steering of a conveyance, which method comprises:
   a) body-component attaching first and second tilt-angle transducers;
   b) body-component actuating said transducers to selected tilt angles;
   c) producing a first electrical output from said first transducer proportional to said selected tilt angles with respect to a one tilt axis;
   d) producing a second electrical output from said second transducer proportional to said selected tilt angles with respect to an other tilt axis;
   e) conditioning said first electrical output as an inverse function of said second electrical output; and
   e) controlling rotational directions and rotational speeds of first and second motors as a function of said producing and conditioning steps.

24. A method as claimed in claim 23 in which said conditioning step comprises:
   a) conditioning said first output as a nonlinear inverse function of said second electrical output.

25. A method as claimed in claim 23 in which said conditioning step comprises selectively adjusting said nonlinear function.

26. Apparatus as claimed in claim 23 in which said conditioning step comprises analog conditioning.

27. Apparatus as claimed in claim 23 in which said conditioning step comprises microprocessing.

28. Apparatus for controlling rotational speeds of first and second motors that are connected to respective ones of left and right wheels comprises:
   means for producing a first electrical output proportional to a first mechanical input;
   means for producing a second electrical output proportional to a second mechanical input; and
   means, being operatively connected to said first and second electrical outputs, for inverse proportioning said first electrical output as a function of one of said second electrical output.

29. Apparatus as claimed in claim 28 in which said apparatus comprises means for selectively adjusting said inverse proportioning.

30. Apparatus as claimed in claim 28 in which said means for inverse proportioning comprises:
   means for nonlinear proportioning said first electrical output; and
   means for selectively adjusting said proportioning.

31. Apparatus as claimed in claim 28 in which said means for proportioning comprises an operational amplifier.

32. Apparatus as claimed in claim 28 in which said means for proportioning comprises a microprocessor.

\* \* \* \* \*

(12) INTER PARTES REEXAMINATION CERTIFICATE (1028th)
United States Patent
Lautzenhiser et al.

(10) Number: US 6,426,600 C1
(45) Certificate Issued: Jan. 13, 2015

(54) PROPORTIONAL ACTUATOR CONTROL OF APPARATUS

(75) Inventors: John L. Lautzenhiser, Hamilton, IN (US); Lloyd L. Lautzenhiser, Nobel (CA)

(73) Assignee: Lautzenhiser Technologies, LLC, Hamilton, IN (US)

Reexamination Request:
No. 95/001,471, Oct. 19, 2010

Reexamination Certificate for:
Patent No.: 6,426,600
Issued: Jul. 30, 2002
Appl. No.: 09/802,823
Filed: Mar. 10, 2001

Related U.S. Application Data

(62) Division of application No. 09/652,395, filed on Aug. 31, 2000.

(60) Provisional application No. 60/188,431, filed on Mar. 10, 2000, provisional application No. 60/166,240, filed on Nov. 18, 1999, provisional application No. 60/152,826, filed on Sep. 7, 1999.

(51) Int. Cl.
*H02P 1/54* (2006.01)

(52) U.S. Cl.
USPC ............. 318/34; 318/625; 318/68; 180/65

(58) Field of Classification Search
None
See application file for complete search history.

(56) References Cited

To view the complete listing of prior art documents cited during the proceeding for Reexamination Control Number 95/001,471, please refer to the USPTO's public Patent Application Information Retrieval (PAIR) system under the Display References tab.

*Primary Examiner* — Kenneth J Whittington

(57) ABSTRACT

Apparatus, such as a wheelchair (10) is proportionally controlled by output signals produced by an X-Y input device (26, 58, 90, 100, 110, 360, or 370), which may be attached to head (90), a hand (112) or some other body component, and which may be actuated by tilting. The output signals are conditioned prior to application to the wheelchair (10). Apparatus for conditioning the output signals includes a transistor sensitivity control (180, 382A, 382B), a transducer sensitivity adjustment (344A, 384B, or 436) a signal limiting control (226, 394, 396), a signal limiting adjustment (438), a null offset device, or null-width generator (418, 130A/#?, 150A/#?), a rate-of-change controller (144A/#?), a turn signal conditioner, or steering sensitivity control (160, 170, 398, 400, 416), a steering sensitivity adjustment (434), a nonlinear device (420) that functions as a steering sensitivity control, a nonlinearity adjustment (422) that functions as a steering sensitivity adjustment, and a microprocessor (432) that may be used to perform some, or all, of the aforesaid functions.

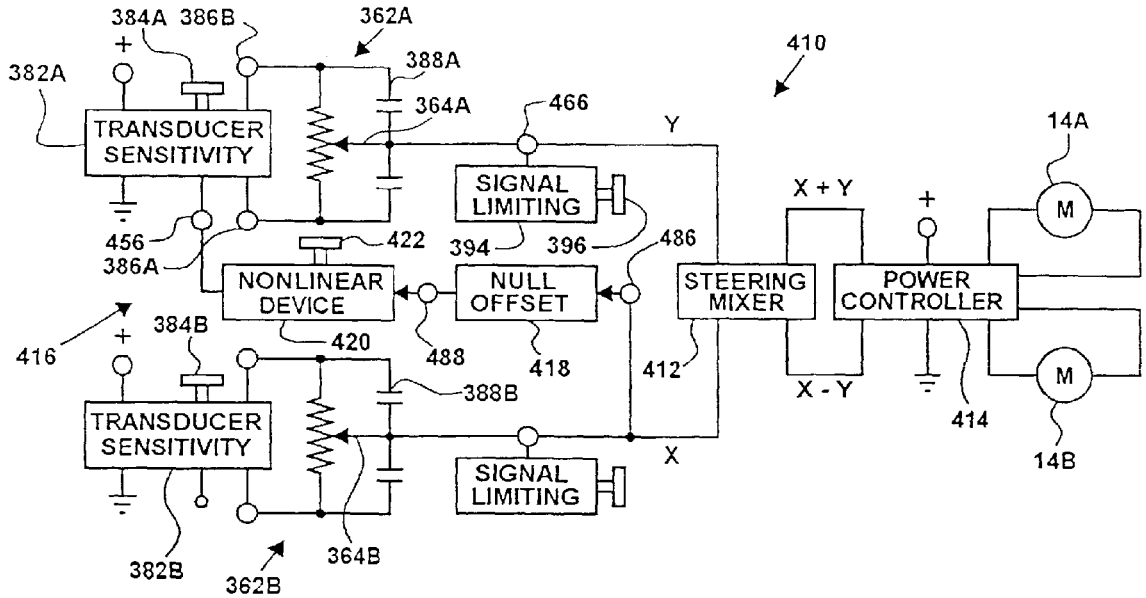

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-4, 6, 7, 11-15, 22, 28-30 and 32 are cancelled.

Claims 5, 8-10, 16-21, 23-27 and 31 were not reexamined.

\* \* \* \* \*